(12) United States Patent
Miller

(10) Patent No.: US 8,762,106 B2
(45) Date of Patent: Jun. 24, 2014

(54) ABNORMAL SITUATION PREVENTION IN A HEAT EXCHANGER

(75) Inventor: John Philip Miller, Eden Prairie, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 0 days.

(21) Appl. No.: 11/864,727

(22) Filed: Sep. 28, 2007

(65) Prior Publication Data

US 2008/0082304 A1 Apr. 3, 2008

Related U.S. Application Data

(60) Provisional application No. 60/847,750, filed on Sep. 28, 2006.

(51) Int. Cl.
*G06F 3/00* (2006.01)

(52) U.S. Cl.
USPC .................... 702/185; 702/179; 702/183

(58) Field of Classification Search
USPC ............ 702/33, 34, 35, 45, 184, 185; 700/52; 703/2
See application file for complete search history.

(56) References Cited

U.S. PATENT DOCUMENTS

| 4,050,506 A * | 9/1977 | Small .......................... 165/299 |
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |

(Continued)

FOREIGN PATENT DOCUMENTS

| EP | 0 612 039 A2 | 8/1994 |
| EP | 0 626 697 A1 | 11/1994 |

(Continued)

OTHER PUBLICATIONS

"Heat Exchangers," http://www.me.wustl.edu/ME/labs/thermal/me372b5.htm (5 pages).

(Continued)

*Primary Examiner* — Sujoy Kundu
*Assistant Examiner* — Corey Bailey
(74) *Attorney, Agent, or Firm* — Marshall, Gerstein & Borun LLP

(57) ABSTRACT

A system and method to facilitate the monitoring and diagnosis of a process control system and any elements thereof is disclosed with a specific premise of abnormal situation prevention in a heat exchanger. Monitoring and diagnosis of faults in a heat exchanger includes statistical analysis techniques, such as regression and load following. In particular, on-line process data is collected from an operating heat exchanger. A statistical analysis is used to develop a regression model of the process. The output may use a variety of parameters from the model and may include normalized process variables based on the training data, and process variable limits or model components. Each of the outputs may be used to generate visualizations for process monitoring and diagnostics and perform alarm diagnostics to detect abnormal situations in the heat exchanger.

17 Claims, 22 Drawing Sheets

(56) References Cited

U.S. PATENT DOCUMENTS

| | | | |
|---|---|---|---|
| 4,944,035 A | 7/1990 | Roger et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,189,232 A | 2/1993 | Shabtai et al. | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,311,562 A | 5/1994 | Palosamy et al. | |
| 5,325,522 A | 6/1994 | Vaughn | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,461,570 A | 10/1995 | Wang et al. | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,499,188 A | 3/1996 | Kline, Jr. et al. | |
| 5,519,647 A * | 5/1996 | DeVille | 708/276 |
| 5,521,842 A | 5/1996 | Yamada | |
| 5,533,413 A | 7/1996 | Kobayashi et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,552,984 A | 9/1996 | Crandall et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,640,491 A | 6/1997 | Bhat et al. | |
| 5,640,493 A | 6/1997 | Skeirik | |
| 5,666,297 A | 9/1997 | Britt et al. | |
| 5,680,409 A | 10/1997 | Qin et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,719,767 A | 2/1998 | Jang | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,764,891 A | 6/1998 | Warrior | |
| 5,768,119 A | 6/1998 | Havekost et al. | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,805,442 A | 9/1998 | Crater et al. | |
| 5,809,490 A | 9/1998 | Guiver et al. | |
| 5,817,958 A | 10/1998 | Uchida et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,842,189 A | 11/1998 | Keeler et al. | |
| 5,847,952 A | 12/1998 | Samad | |
| 5,859,773 A | 1/1999 | Keeler et al. | |
| 5,859,964 A | 1/1999 | Wang et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,960,214 A | 9/1999 | Sharpe, Jr. et al. | |
| 5,960,441 A | 9/1999 | Bland et al. | |
| 5,975,737 A | 11/1999 | Crater et al. | |
| 5,984,502 A | 11/1999 | Calder | |
| 5,988,847 A | 11/1999 | McLaughlin et al. | |
| 6,008,985 A | 12/1999 | Lake et al. | |
| 6,014,598 A | 1/2000 | Duyar et al. | |
| 6,017,143 A | 1/2000 | Eryurek et al. | |
| 6,026,352 A | 2/2000 | Burns et al. | |
| 6,033,257 A | 3/2000 | Lake et al. | |
| 6,041,263 A | 3/2000 | Boston et al. | |
| 6,047,220 A | 4/2000 | Eryurek | |
| 6,047,221 A | 4/2000 | Piche et al. | |
| 6,055,483 A | 4/2000 | Lu | |
| 6,061,603 A | 5/2000 | Papadopoulos et al. | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,106,785 A | 8/2000 | Havlena et al. | |
| 6,108,616 A | 8/2000 | Borchers et al. | |
| 6,110,214 A * | 8/2000 | Klimasauskas | 703/2 |
| 6,119,047 A | 9/2000 | Eryurek et al. | |
| 6,122,555 A | 9/2000 | Lu | |
| 6,128,279 A | 10/2000 | O'Neil et al. | |
| 6,144,952 A | 11/2000 | Keeler et al. | |
| 6,169,980 B1 | 1/2001 | Keeler et al. | |
| 6,246,950 B1 | 6/2001 | Bessler et al. | |
| 6,266,726 B1 | 7/2001 | Nixon et al. | |
| 6,296,193 B1 * | 10/2001 | West et al. | 236/13 |
| 6,298,377 B1 | 10/2001 | Hartikainen et al. | |
| 6,298,454 B1 | 10/2001 | Schleiss et al. | |
| 6,317,701 B1 | 11/2001 | Pyotsia et al. | |
| 6,332,110 B1 | 12/2001 | Wolfe | |
| 6,397,114 B1 | 5/2002 | Eryurek | |
| 6,421,571 B1 | 7/2002 | Spriggs et al. | |
| 6,445,963 B1 | 9/2002 | Blevins et al. | |
| 6,532,392 B1 | 3/2003 | Eryurek et al. | |
| 6,539,267 B1 | 3/2003 | Eryurek et al. | |
| 6,594,589 B1 | 7/2003 | Coss, Jr. et al. | |
| 6,609,036 B1 | 8/2003 | Bickford | |
| 6,615,090 B1 | 9/2003 | Blevins et al. | |
| 6,622,059 B1 * | 9/2003 | Toprac et al. | 700/121 |
| 6,633,782 B1 | 10/2003 | Schleiss et al. | |
| 6,795,798 B2 * | 9/2004 | Eryurek et al. | 702/188 |
| 6,901,300 B2 | 5/2005 | Blevins et al. | |
| 7,079,984 B2 * | 7/2006 | Eryurek et al. | 702/185 |
| 7,085,610 B2 | 8/2006 | Eryurek et al. | |
| 7,151,976 B2 * | 12/2006 | Lin | 700/108 |
| 7,221,988 B2 * | 5/2007 | Eryurek et al. | 700/108 |

(56) References Cited

U.S. PATENT DOCUMENTS

| | | | |
|---|---|---|---|
| 7,233,834 B2* | 6/2007 | McDonald et al. | 700/108 |
| 7,657,399 B2 | 2/2010 | Miller et al. | |
| 2002/0022894 A1 | 2/2002 | Eryurek et al. | |
| 2002/0038156 A1 | 3/2002 | Eryurek et al. | |
| 2002/0077711 A1 | 6/2002 | Nixon et al. | |
| 2002/0107858 A1 | 8/2002 | Lundahl et al. | |
| 2002/0123864 A1 | 9/2002 | Eryurek et al. | |
| 2002/0133320 A1 | 9/2002 | Wegerich et al. | |
| 2002/0147511 A1 | 10/2002 | Eryurek et al. | |
| 2002/0161940 A1 | 10/2002 | Eryurek et al. | |
| 2002/0163427 A1 | 11/2002 | Eryurek et al. | |
| 2003/0014500 A1 | 1/2003 | Schleiss et al. | |
| 2003/0074159 A1 | 4/2003 | Bechhoefer et al. | |
| 2004/0064465 A1* | 4/2004 | Yadav et al. | 707/100 |
| 2004/0078171 A1* | 4/2004 | Wegerich et al. | 702/188 |
| 2004/0112585 A1* | 6/2004 | Goodson et al. | 165/299 |
| 2005/0055175 A1* | 3/2005 | Jahns et al. | 702/182 |
| 2005/0060103 A1 | 3/2005 | Chamness | |
| 2005/0133211 A1* | 6/2005 | Osborn et al. | 165/157 |
| 2005/0143873 A1 | 6/2005 | Wilson | |
| 2005/0197792 A1 | 9/2005 | Haeuptle | |
| 2005/0210337 A1 | 9/2005 | Chester et al. | |
| 2005/0256601 A1 | 11/2005 | Lee et al. | |
| 2006/0020423 A1* | 1/2006 | Sharpe, Jr. | 702/183 |
| 2006/0052991 A1* | 3/2006 | Pflugl et al. | 703/8 |
| 2006/0067388 A1 | 3/2006 | Sedarat | |
| 2006/0074598 A1* | 4/2006 | Emigholz et al. | 702/185 |
| 2006/0144057 A1 | 7/2006 | You et al. | |
| 2006/0157029 A1 | 7/2006 | Suzuki et al. | |
| 2006/0265625 A1 | 11/2006 | Dubois et al. | |
| 2007/0005298 A1 | 1/2007 | Allen et al. | |
| 2007/0097873 A1 | 5/2007 | Ma et al. | |
| 2007/0100475 A1* | 5/2007 | Korchinski | 700/28 |
| 2007/0109301 A1 | 5/2007 | Smith | |
| 2008/0027677 A1 | 1/2008 | Miller et al. | |
| 2008/0027678 A1 | 1/2008 | Miller | |
| 2008/0052039 A1 | 2/2008 | Miller et al. | |
| 2008/0097637 A1 | 4/2008 | Nguyen et al. | |
| 2008/0125879 A1 | 5/2008 | Miller et al. | |
| 2008/0208527 A1 | 8/2008 | Kavaklioglu | |

FOREIGN PATENT DOCUMENTS

| | | |
|---|---|---|
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |
| GB | 2 360 357 A | 9/2001 |
| JP | 07-152714 | 6/1995 |
| JP | 07-324851 A | 12/1995 |
| JP | 2000-259223 A | 9/2000 |
| JP | 2004-334418 A | 11/2004 |
| JP | 2005-284982 A | 10/2005 |
| WO | WO 01/79948 A1 | 10/2001 |
| WO | WO-2005/096377 A1 | 10/2005 |
| WO | WO 2006/026340 | 3/2006 |
| WO | WO-2006/107933 | 10/2006 |

OTHER PUBLICATIONS

Upadhyay et al., "Degradation Monitoring and Fault Diagnosis of Heat Exchanger Systems," *Final Report EPMPT-07* (2004).
International Search Report and Written Opinion for International Application No. PCT/US2007/079989, dated Mar. 18, 2008.
Notice of Reasons for Rejection for Japanese Application No. 2012-189992, dated Sep. 24, 2013.
Notice of Reasons for Rejection for Japanese Patent Application No. 2009-530658 issued Apr. 17, 2012.
"Components of GE Predictor™ Services," GE Industrial Systems, available at http://www.geindustrial.com/cwc/services?id=74 on Jul. 18, 2002.
"Customer Benefits," GE Industrial Systems, available at http://www.geindustrial.com/cwc/services?id=75 on Jul. 18, 2002.
"Customer Impact," GE Industrial Systems, available at http://www.geindustrial.com/cwc/services?id=73 on Jul. 18, 2002.
"Electrical Equipment Coverage," GE Industrial Systems, available at http://www.geindustrial.com/cwc/services?id=72 on Jul. 18, 2002.
"GE Predictor™ Services: GE Predictor Services Overview," GE Industrial Systems, available at http://www.geindustrial.com/cwc/services?id=71 on Jul. 18, 2002.
"Root Cause Diagnostics: Software for Diagnosing Problems in Typical Industrial Loops," Kavaklioglu et al., presented at Maintenance and Reliability Conference (MARCON 2002), Knoxville, TN, May 2002.
"Root Cause Diagnostics™ SNAP-ON™ Application," Emerson Process Management, Dec. 2003.
Chiang et al., "Fault Detection and Diagnosis in Industrial Systems," Springer-Verlag London Berlin Heidelberg (2001).
Chinese Office Action for Application No. 200780036001.X, dated Jul. 30, 2010.
Du et al., "Automated Monitoring of Manufacturing Processes, Part 1: Monitoring Methods," *J. Engineering for Industry*, 117:121-132 (1995).
Hines et al., "Sensor Validation and Instrument Calibration Monitoring," University of Tennesse Maintenance and Reliability Center (2001).
Horch, "Oscillation Diagnosis in Control Loops—Stiction and Other Causes," Proceedings of the 2006 American Control Conference, Minneapolis, Minnesota, pp. 2086-2096 (2006).
International Preliminary Report on Patentability for Application No. PCT/US2007/074258, dated Jan. 27, 2009.
International Preliminary Report on Patentability for Application No. PCT/US2007/074259, dated Feb. 5, 2009.
International Preliminary Report on Patentability for Application No. PCT/US2007/074355, dated Feb. 5, 2009.
International Preliminary Report on Patentability for Application No. PCT/US2007/074363, dated Feb. 5, 2009.
International Search Report and Written Opinion for International Application No. PCT/US2007/074363, dated Dec. 20, 2007.
International Search Report for International Application No. PCT/US2007/074258, dated Apr. 3, 2008.
International Search Report for International Application No. PCT/US2007/074259, dated Dec. 7, 2007.
International Search Report for International Application No. PCT/US2007/074355, dated Dec. 20, 2007.
Kalkhoff, "Agent-Oriented Robot Task Transformation", Proceedings of the International Symposium on Intelligent Control, IEEE, pp. 242-247 (Aug. 27, 1995).
Mehta, et al., "Feedforward Neural Networks for Process Identification and Prediction," presented at ISA 2001, Houston, Texas, Sep. 2001.
Montgomery, "Control Charts as a Tool in SQC (Statistical Quality Control)" Control Charts as a Tool in SQC, available at http://deming.eng.clemson.edu/pub/tutorials/qctools/ccmain1.htm on May 30, 2006.
Office Action mailed Jan. 17, 2007 (U.S. Appl. No. 11/492,460).
Office Action mailed Jan. 9, 2008 (U.S. Appl. No. 11/492,460).
Office Action maled Jun. 11. 2008 (U.S. Appl. No. 11/492,460).
Office Action mailed Nov. 13, 2008 (U.S. Appl. No. 11/492,460).
Office Action mailed Apr. 27, 2009 (U.S. Appl. No. 11/492,460).
Office Action mailed Feb. 3, 2009 (U.S. Appl. No. 11/492,347).
Office Action mailed Oct. 9, 2007 (U.S. Appl. No. 11/492,467).
Office Action mailed Nov. 26, 2008 (U.S. Appl. No. 11/492,467).
Pettersson, "Execution Monitoring in Robotics: A Survey," *Robotics and Autonomous Systems*, 53:73-88 (2005).
Response to Non Final Office Action (U.S. Appl. No. 11/492,460).
Romeu, "Understanding Binomial Sequential Testing," START: Selected Topics in Assurance Related Technologies, 12(2):1-8 (2005).
Ruel, "Diagnose Loop Behavior to Find and Correct Problems with Final Control Elements, the Environment, and Upstream Systems Before You Tune the Controller," Loop Optimization, available at http://www.expertune.com/artConApr99.html on Jun. 1, 2006.

(56) References Cited

OTHER PUBLICATIONS

Schwarz et al., "Spectral Envelope Estimation and Representation for Sound Analysis-Synthesis," Spectral Envelope Estimation and Representation, available at http://recherche.ircam.fr/equipes/analyse-synthese/schwarz/publications/icmc1999/se99-poster.html> on May 31, 2006.

Tzovla et al., "Abnormal Condition Management Using Expert Systems," presented at ISA 2001, Houston, Texas, Sep. 2001.

Wald, "Sequential Tests of Statistical Hypotheses," Ann. Math. Statist., 16(2):117-186 (1945).

Written Opinion for International Application No. PCT/US2006/029986, dated Jun. 28, 2007.

Extended European Search Report for European Patent Application No. 11167526.0 issued Feb. 28, 2012.

\* cited by examiner

ABNORMAL SITUATION PREVENTION IN A HEAT EXCHANGER

RELATED APPLICATIONS

This application claims priority from U.S. Provisional Application Ser. No. 60/847,750, which was filed on Sep. 28, 2006, entitled "Abnormal Situation Prevention in a Heat Exchanger" the entire contents of which are expressly incorporated by reference herein.

TECHNICAL FIELD

This disclosure relates generally to abnormal situation prevention in process control equipment and, more particularly, to abnormal situation prevention in a heat exchanger.

DESCRIPTION OF THE RELATED ART

Process control systems, like those used in chemical, petroleum or other processes, typically include one or more centralized or decentralized process controllers communicatively coupled to at least one host or operator workstation. The process controllers are also typically coupled to one or more process control and instrumentation devices such as, for example, field devices, via analog, digital or combined analog/digital buses. Field devices, which may be valves, valve positioners, switches, transmitters, and sensors (e.g., temperature, pressure, and flow rate sensors), are located within the process plant environment and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the Highway Addressable Remote Transmitter (HART®) protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART® and Fieldbus field devices. The control modules in the process controllers send the control signals over the communication lines or signal paths to the field devices to thereby control the operation of the process.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, and diagnosing problems or hardware failures within the process plant.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially within a process plant having a large number of field devices and supporting equipment. These problems may be broken or malfunctioning devices, logic elements, such as software routines, residing in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant.

Many diagnostic tools and applications have been developed to detect and determine the cause of problems within a process plant and to assist an operator or a maintenance person to diagnose and correct the problems, once the problems have occurred and have been detected. For example, operator workstations, which are typically connected to the process controllers through communication connections such as a direct or wireless bus, Ethernet, modem, phone line, and the like, have processors and memories that are adapted to run software, such as the DeltaV™ and Ovation® control systems, sold by Emerson Process Management. These control systems have numerous control module and control loop diagnostic tools. Maintenance workstations may be communicatively connected to the process control devices via object lining and embedding (OLE) for process control (OPC) connections, handheld connections, etc. The workstations typically include one or more applications designed to view maintenance alarms and alerts generated by field devices within the process plant, to test devices within the process plant, and to perform maintenance activities on the field devices and other devices within the process plant. Similar diagnostic applications have been developed to diagnose problems within the supporting equipment within the process plant.

Commercial software such as the AMS™ Suite: Intelligent Device Manager from Emerson Process Management enables communication with and stores data pertaining to field devices to ascertain and track the operating state of the field devices. See also U.S. Pat. No. 5,960,214, entitled "Integrated Communication Network for use in a Field Device Management System." In some instances, the AMS™ Suite: Intelligent Device Manager software may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, the Machinery Health® application provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, or to calibrate field devices or other equipment.

While these various applications and tools may facilitate identification and correction of problems within a process plant, these diagnostic applications are generally configured to be used only after a problem has already occurred within a process plant and, therefore, after an abnormal situation already exists within the plant. Unfortunately, an abnormal situation may exist for some time before it is detected, identified, and corrected using these tools. Delayed abnormal situation processing may result in the suboptimal performance of the process plant for the period of time during which the problem is detected, identified and corrected. In many cases, a control operator first detects that a problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem. During this delay, the process plant may run in an abnormal situation generally associated with the suboptimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique, disclosed in U.S. patent application Ser. No. 09/972,078, now U.S. Pat. No. 7,085,610, entitled "Root Cause Diagnostics," (based in part on U.S. patent application Ser. No. 08/623,569, now U.S. Pat. No. 6,017,143), may be used to predict an abnormal situation within a process plant before the abnormal situations actually arises. The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect process variable data and determine certain statistical measures associated with the collected data, such as the mean, median, standard deviation, etc. These statistical measures may then be sent to a user and analyzed to recognize patterns suggesting the future occurrence of a known abnormal situation. Once the system predicts an abnormal situation, steps may be taken to correct the underlying problem and avoid the abnormal situation.

Other techniques have been developed to monitor and detect problems in a process plant. One such technique is referred to as Statistical Process Control (SPC). SPC has been used to monitor variables associated with a process and alert an operator when the quality variable moves from its "statistical" norm. With SPC, a small sample of a variable, such as a key quality variable, is used to generate statistical data for the small sample. The statistical data for the small sample is then compared to statistical data corresponding to a much larger sample of the variable. The variable may be generated by a laboratory or analyzer, or retrieved from a data historian. SPC alarms are generated when the small sample's average or standard deviation deviates from the large samples average or standard deviation, respectively, by some predetermined amount. An intent of SPC is to avoid making process adjustments based on normal statistical variation of the small samples. Charts of the average or standard deviation of the small samples may be displayed to the operator on a console separate from a control console.

Another technique analyzes multiple variables and is referred to as multivariable statistical process control (MSPC). This technique uses algorithms, such as principal component analysis (PCA) and partial least squares (PLS), that analyze historical data to create a statistical model of the process. In particular, samples of variables corresponding to normal operation and samples of variables corresponding to abnormal operation are analyzed to generate a model to determine when an alarm should be generated. Once the model has been defined, variables corresponding to a current process may be provided to the model, which may generate an alarm if the variables indicate an abnormal operation.

A further technique includes detecting an abnormal operation of a process in a process plant with a configurable model of the process. The technique includes multiple regression models corresponding to several discrete operations of the process plant. Regression modeling in a process plant is disclosed in U.S. patent application Ser. No. 11/492,467 entitled "Method and System for Detecting Abnormal Operation in a Process Plant," the entire disclosure of which is hereby incorporated by reference herein. The regression model determines if the observed process significantly deviates from a normal output of the model. If a significant deviation occurs, the technique alerts an operator or otherwise brings the process back into the normal operating range.

With model-based performance monitoring system techniques, a model is utilized, such as a correlation-based model, a first-principles model, or a regression model that relates process inputs to process outputs. For regression modeling, an association or function is determined between a dependent process variable and one or more independent variables. The model may be calibrated to the actual plant operation by adjusting internal tuning constants or bias terms. The model can be used to predict when the process is moving into an abnormal condition and alert the operator to take action. An alarm may be generated when there is a significant deviation in actual versus predicted behavior or when there is a notable change in a calculated efficiency parameter.

Model-based performance monitoring systems typically cover as small as a single unit operation (e.g. a pump, a compressor, a column, etc.) or a combination of operations that make up a process unit of a process plant (e.g. crude unit, fluid catalytic cracking unit (FCCU), reformer, etc.). One particular piece of process equipment is a heat exchanger. A heat exchanger takes a colder fluid on one side and a hotter fluid on the other side. When the two fluids pass through the heat exchanger, heat is transferred from the hotter fluid to the colder fluid. One common abnormal condition in heat exchangers is fouling. Fouling occurs when residual material from one or both of the fluids builds up on the inside walls of the heat exchanger. When this happens, the performance of the heat exchanger deteriorates such that with the same amount of fluid, not as much heat is transferred. Also, as fouling material builds up, there is less cross-sectional area for the fluid to flow through, and so either not as much fluid will flow, or the driving mechanism (e.g. pump) needs to work harder to force the fluid through. Because a deterioration in the heat exchanger can negatively impact the rest of the plant, it is desirable to detect fouling as early as possible, so that corrective action may be taken.

SUMMARY OF THE DISCLOSURE

A system and method to facilitate the monitoring and diagnosis of a process control system and any elements thereof is disclosed with a specific premise of abnormal situation prevention in a heat exchanger. Monitoring and diagnosis of faults in a heat exchanger may include statistical analysis techniques, such as regression and load following. In particular, on-line process data may be collected from an operating heat exchanger. The process data may be representative of a normal operation of the process when it is on-line and operating normally. A statistical analysis may be used to develop a regression model of the process based on the collected data and the regression model may be stored along with the collected process data. Alternatively, or in conjunction, monitoring of the process may be performed which uses a regression model of the process developed using statistical analysis to generate an output based on a parameter of the regression model. The output may include a statistical output based on the results of the model, normalized process variables based on training data, process variable limits or model components, and process variable ratings based on the training data and model components. Each of the outputs may be used to generate visualizations for process monitoring or process diagnostics and may perform alarm diagnostics to detect abnormal situations in the heat exchanger.

DETAILED DESCRIPTION

Figure 1:
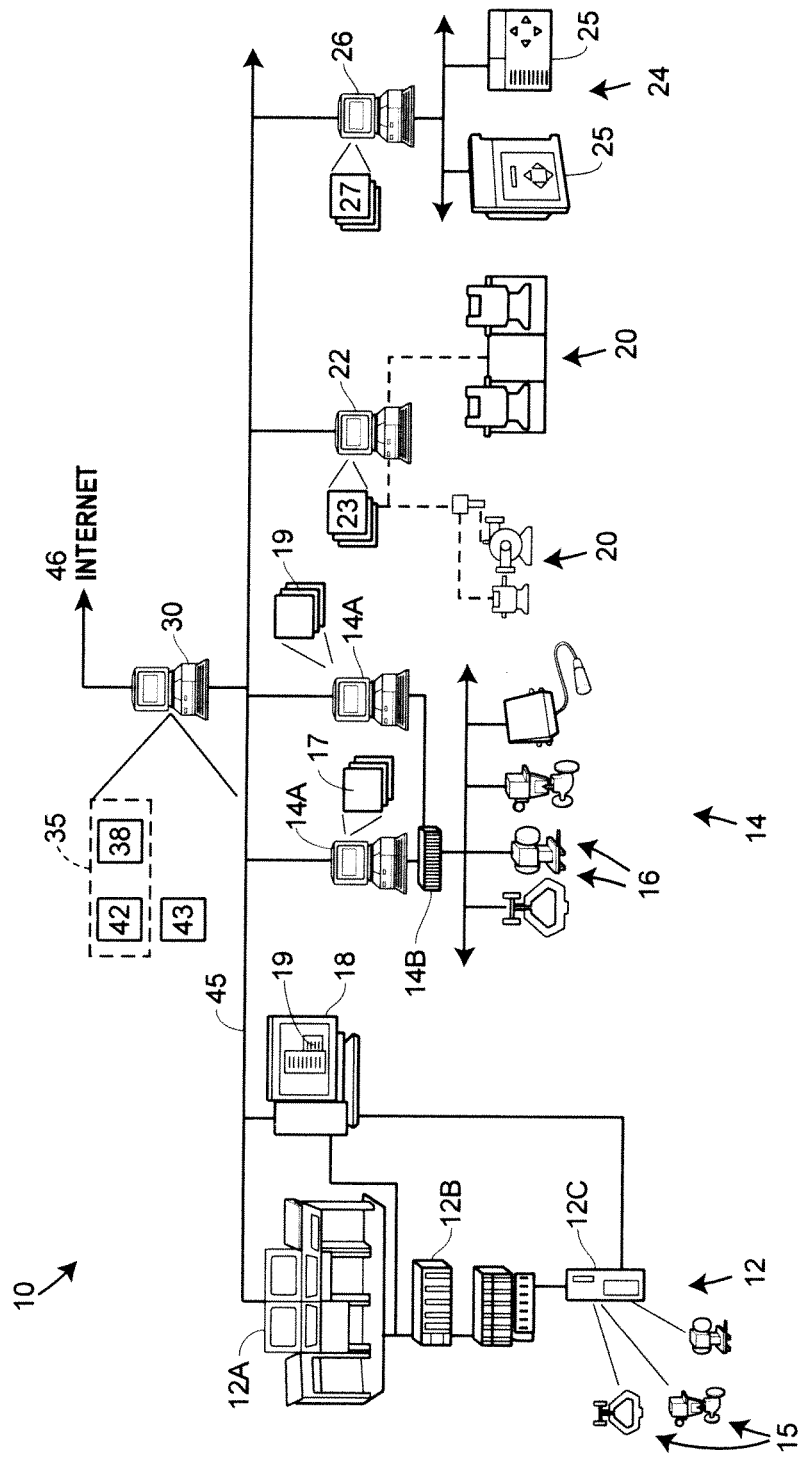
FIG. 1 is an exemplary block diagram of a process plant having a distributed process control system and network including one or more operator and maintenance workstations, controllers, field devices and supporting equipment.

Referring now to FIG. 1, an exemplary process plant 10 in which an abnormal situation prevention system may be implemented includes a number of control and maintenance systems interconnected together with supporting equipment via one or more communication networks. The process control system 12 may be a traditional process control system such as a PROVOX or RS3 system or any other control system which includes an operator interface 12A coupled to a controller 12B and to input/output (I/O) cards 12C, that, in turn, are coupled to various field devices such as analog and HART® field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART® or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ Suite: Intelligent Device Manager application described above and/or the monitoring, diagnostics and communication applications described below may be connected to the process control systems 12 and 14 or to the individual devices therein to perform maintenance, monitoring, and diagnostics activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ Suite: Intelligent Device Manager application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute any number of monitoring and diagnostic applications 23, including commercially available applications, such as those provided by CSI (an Emerson Process Management Company), as well the applications, modules, and tools described below, to diagnose, monitor and optimize the operating state of the rotating equipment 20 and other equipment in the plant. Maintenance personnel usually use the applications 23 to maintain and oversee the performance of equipment 20 in the plant 10, to determine problems with the rotating equipment 20 and to determine when and if the equipment 20 must be repaired or replaced. In some cases, outside consultants or service organizations may temporarily acquire or measure data pertaining to the rotating equipment 20 and use this data to perform analyses for the rotating equipment 20 to detect problems, poor performance, or other issues effecting the rotating equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance, or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42, a number of embodiments of which will be described in more detail below. Additionally, the computer system 30 may implement an alert/alarm application 43.

Generally speaking, the abnormal situation prevention system 35 may communicate with abnormal operation detection systems (not shown in FIG. 1) optionally located in the field devices 15, 16, the controllers 12B, 14B, the rotating equipment 20 or its supporting computer 22, the power generation equipment 25 or its supporting computer 26, and any other desired devices and equipment within the process plant 10, and/or the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each of at least some of the computers or devices within the plant 10 or, alternatively, may be connected via any other desired communication connection including, for example, wireless connections, dedicated connections which use OPC, intermittent connections, such as ones which rely on hand-held devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocol including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well.

Figure 2:
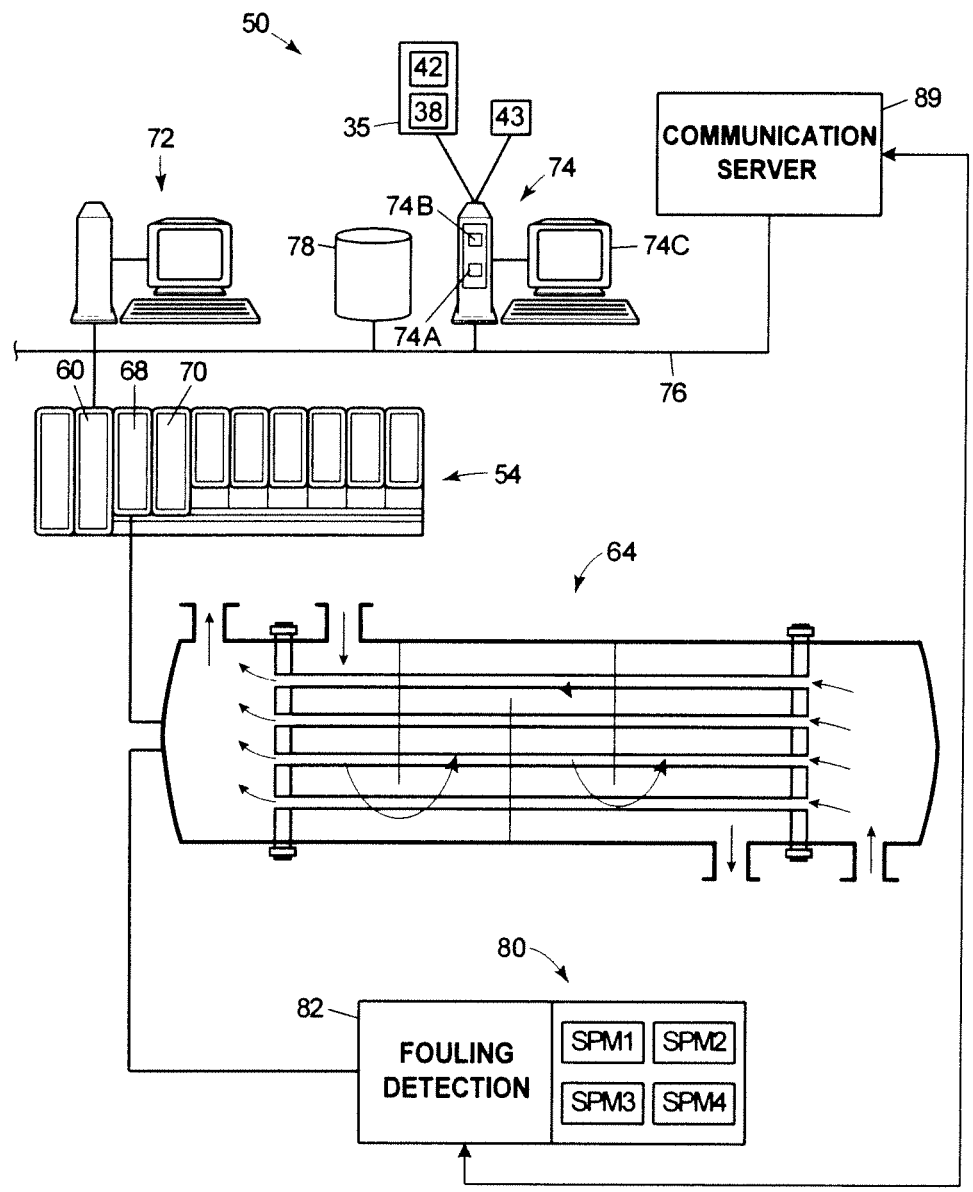
FIG. 2 is an exemplary block diagram of a portion of the process plant of FIG. 1, illustrating communication interconnections between various components of an abnormal situation prevention system located within different elements of the process plant including a heat exchanger.

FIG. 2 illustrates a portion 50 of the example process plant 10 of FIG. 1 for the purpose of describing one manner in which the abnormal situation prevention system 35 and/or the alert/alarm application 43 may communicate with a heat exchanger 64 in the portion 50 of the example process plant 10. While FIG. 2 illustrates communications between the abnormal situation prevention system 35 and one or more abnormal operation detection systems within the heat exchanger 64, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more heat exchangers 64 via input/output (I/O) cards or devices 69 and 70, which may be any desired types of I/O devices conforming to any desired communication or controller protocol. Additionally, the heat exchanger 64 may conform to any desired open, proprietary or other communication or programming protocol, it being understood that the I/O devices 69 and 70 should be compatible with the desired protocol used by the heat exchanger 64. Although not shown in detail, the heat exchanger 64 may include any number of additional devices, including, but not limited to, field devices, HART® devices, sensors, valves, transmitters, positioners, etc.

In any event, one or more user interfaces or computers 72 and 74 (which may be any type of personal computer, workstation, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and heat exchanger 64 and other field devices within the process plant 10. Thus, the database 78 may operate as a configuration database to store the current configuration, including process configuration modules, as well as control configuration information for the process control system 54 as downloaded to and stored within the process controllers 60 and the devices of the heat exchanger 64 and other field devices. Likewise, the database 78 may store historical abnormal situation prevention data, including statistical data collected by the heat exchanger 64 (or, more particularly, devices of the heat exchanger 64) and other field devices within the process plant 10 statistical data determined from process variables collected by the heat exchanger 64 (or, more particularly, devices of the heat exchanger 64) and other field devices, and other types of data that will be described below.

While the process controllers 60, I/O devices 69 and 70, and the heat exchanger 64, are typically located down within and distributed throughout the sometimes harsh plant environment, the workstations 72 and 74, and the database 78 are usually located in control rooms, maintenance rooms or other less harsh environments easily accessible by operators, maintenance personnel, etc. Although only one heat exchanger 64 is shown, it should be understood that a process plant 10 may have multiple heat exchangers 64 along with various other types of equipment such as that shown in FIG. 1. The abnormal situation prevention techniques described herein may be equally applied to any of a number of heat exchangers 64.

Generally speaking, the process controllers 60 may store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, a control function, or an output function. For example, an input function may be associated with a transmitter, a sensor or other process parameter measurement device. A control function may be associated with a control routine that performs PID, fuzzy logic, or another type of control. Also, an output function may control the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etch, and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

The heat exchanger 64 and, in particular, the devices of the heat exchanger 64, may include a memory (not shown) for storing routines such as routines for implementing statistical data collection pertaining to one or more process variables sensed by sensing devices and/or routines for abnormal operation detection, that will be described below. Each of one or more of the heat exchangers 64, and/or some or all of the devices thereof in particular, may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2, the devices of the heat exchanger 64, and/or the heat exchanger 64 itself (and potentially some or all heat exchangers in a plant 10) include(s) one or more abnormal operation detection blocks 80, that will be described in more detail below. While the block 80 of FIG. 2 is illustrated as being located in the heat exchanger 64, this or a similar block could be located in any number of heat exchangers 64 or within various other equipment and devices in the plant 10, in other devices, such as the controller 60, the I/O devices 68, 70 or any of the devices illustrated in FIG. 1. Additionally, if the plant 10 or portion of the plant 50 includes more than one heat exchanger 64, the block 80 could be in any subset of the heat exchanger 64, such as in one or more devices of the heat exchanger 64, for example (e.g., temperature sensor, temperature transmitter, etc.).

Generally speaking, the block 80 or sub-elements of the block 80, collect data, such a process variable data, from the device in which they are located and/or from other devices. For example, the block 80 may collect the temperature difference variable from devices within the heat exchanger 64, such as a temperature sensor, a temperature transmitter, or other devices, or may determine the temperature difference variable from temperature measurements from the devices. The block 80 may be included with the heat exchanger 64 and may collect data through valves, sensors, transmitters, or any other field device. Additionally, the block 80 or sub-elements of the block may process the variable data and perform an analysis on the data for any number of reasons. For example, the block 80 that is illustrated as being associated with the heat exchanger 64, may have a fouling detection routine 82 that analyzes several process variables of the heat exchanger 64 as further explained below.

The block 80 may include a set of one or more statistical process monitoring (SPM) blocks or units such as blocks SPM1-SPM4 which may collect process variable or other data within the heat exchanger 64 and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. The specific statistical data generated, and the method in which it is generated is not critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, such as the $R_{tot}$ and/or $\Delta P$ variable, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

It is to be understood that although the block 80 is shown to include SPM blocks in FIG. 2, the SPM blocks may instead be stand-alone blocks separate from the blocks 80 and 82, and may be located in the same heat exchanger 64 as another abnormal operation detection block or may be in a different device. The SPM block discussed herein may comprise known FOUNDATION™ Fieldbus SPM blocks, or SPM blocks that have different or additional capabilities as compared with known FOUNDATION™ Fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the FOUNDATION™ Fieldbus protocol, or some other protocol, such as Profibus, HART®, CAN, etc. protocols. If desired, the underlying operation of blocks 80, 82 may be performed or implemented at least partially as described in U.S. Pat. No. 6,017,143, which is hereby incorporated by reference herein.

It is to be further understood that although the block 80 is shown to include SPM blocks in FIG. 2, SPM blocks are not required. For example, abnormal operation detection routines of the block 80 could operate using process variable data not processed by an SPM block. As another example, the block 80 could receive and operate on data provided by one or more SPM blocks located in other devices. As yet another example, the process variable data could be processed in a manner that is not provided by many typical SPM blocks. As just one example, the process variable data could be filtered by a finite impulse response (FIR) or infinite impulse response (IIR)

filter such as a bandpass filter or some other type of filter. As another example, the process variable data could be trimmed so that it remained in a particular range. Of course, known SPM blocks could be modified to provide such different or additional processing capabilities. While the block 80 includes four SPM blocks, the block 80 could have any other number of SPM blocks therein for collecting and determining statistical data.

Figure 3:
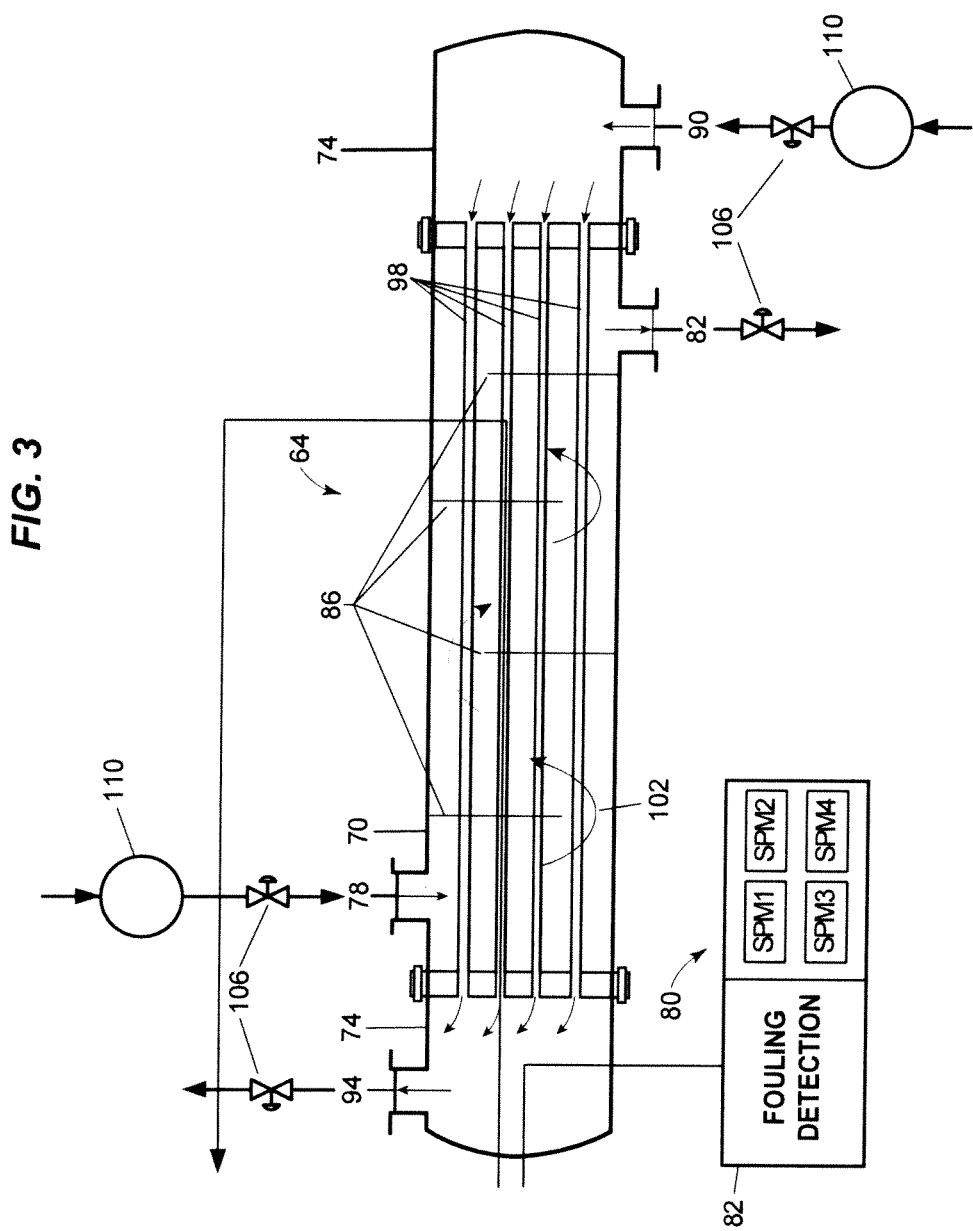
FIG. 3 is one example of a shell and tube heat exchanger.

With reference to FIG. 3, an abnormal operation detection block 80 may monitor the heat exchanger 64 to check for fouling. A shell and tube type heat exchanger 64 may include a shell portion 70 and a tube portion 74. The shell portion 70 may include an inlet 78, an outlet 82, and a number of baffles 86. The tube portion 74 may include an inlet 90, an outlet 94, and a number of tubes 98 surrounded by the shell portion 70. In operation, cold fluid enters the shell portion 70 through the inlet 78, surrounds the tubes 98, flows around the baffles 86 to create turbulence 102, a continues to the outlet 82. Simultaneously, hot fluid enters the inlet 90, flows through the tubes 98 where the turbulent cold water absorbs the heat of the fluid, and continues to the outlet 94. Thus, the heat exchanger 64 reduces the temperature of the hot fluid. Of course, the process may be reversed, whereby a cold fluid enters the inlet 90 and hot fluid enters the inlet 78. The inlets 78, 90 and outlets 82, 94 may also include any number of field devices (not shown), controllers (not shown), valves 106, pumps 110, or other devices that measure and control the fluid temperature, flow pressure, flow rate, and other metrics during operation of the heat exchanger 64.

In a typical heat exchanger application, the several measurements may be available. Some examples of heat exchanger 64 measurements are Cold Fluid Flow Rate ($F_c$), Cold Fluid Inlet Temperature ($T_{c,in}$), Cold Fluid Outlet Temperature ($T_{c,out}$), Cold Fluid Inlet Pressure ($P_{c,in}$), Cold Fluid Outlet Pressure ($P_{c,out}$), Hot Fluid Flow Rate ($F_h$), Hot Fluid Inlet Temperature ($T_{h,in}$), Hot Fluid Outlet Temperature ($T_{h,out}$), Hot Fluid Inlet Pressure ($P_{h,in}$), and Hot Fluid Outlet Pressure ($P_{h,out}$). Some heat exchangers 64 may capture only a few of these measures, while others may modify the measurements. One example of a modified measurement may be to only include a single measurement of differential pressure instead of separate inlet and outlet pressures.

Detecting a fouling abnormal situation in a heat exchanger 64 may include some or all of the measurements described above. One method of fouling detection may include monitoring a differential pressure. Differential pressure may be measured by 1) a differential pressure transmitter across the heat exchanger to measure the differential pressure ($\Delta P$) directly, or 2) absolute pressure transmitters to measure the inlet pressure $P_{in}$ and outlet pressure $P_{out}$ on the heat exchanger. Thus, $$\Delta P = P_{in} - P_{out} \quad\text{(Equ. 1)}$$

differential pressure ($\Delta P$) is dependent upon the flow rate of the fluid through the heat exchanger. Therefore, an algorithm to detect fouling based on $\Delta P$ includes changes in flow rate, as well. Further, $\Delta P$ may permit a fouling detection block 80 at both the hot and cold sides of the heat exchanger 64 to measure and detect the $P_{in}$ and $P_{out}$ values.

Another method of fouling detection may include monitoring overall thermal resistance ($R_{tot}$). The heat transfer rate ($\dot{Q}$) in heat exchanger may be calculated using measurements on either the hot side or the cold side:

$$\dot{Q} = \dot{m}_c \cdot C_c \cdot \Delta T_c = \dot{m}_h \cdot C_h \cdot \Delta T_h \quad\text{(Equ. 2)}$$

where $\dot{m}_c$ and $\dot{m}_h$ are mass-flow rates of the cold and hot fluids, $C_c$ and $C_h$ are the specific-heat of the cold and hot fluids, $\Delta T_c$ and $\Delta T_h$ are the temperature differences of the cold and hot fluids with $\Delta T_c = T_{c,out} - T_{c,in}$ and $\Delta T_h = T_{h,in} - T_{h,out}$.

The total heat transfer may also calculated using the Log-Mean-Temperature Difference (LMTD) and properties of the heat exchanger.

$$\dot{Q} = U \cdot A \cdot \text{LMTD} \quad\text{(Equ. 3)}$$

where U is the average heat transfer coefficient, A is the heat transfer surface area of the heat exchanger, LMTD is the Log-Mean-Temperature-Difference, defined as:

$$\text{LMTD} = \frac{\Delta t_1 - \Delta t_2}{\ln(\Delta t_1 / \Delta t_2)} \quad\text{(Equ. 4)}$$

where, for a parallel, or concurrent flow heat exchanger:

$$\Delta t_1 = t_{h,in} - t_{c,in},\ \Delta t_2 = t_{h,out} - t_{c,out} \quad\text{(Equ. 5)}$$

and for a counter-flow heat exchanger:

$$\Delta t_1 = t_{h,in} - t_{c,out},\ \Delta t_2 = t_{h,out} - t_{c,in} \quad\text{(Equ. 6)}$$

Although A of Equ. 3 may be obtained from product literature, U may be difficult to determine analytically. However, U and A may be taken together as a single variable, the overall total heat transfer rate. The reciprocal of UA is the total thermal resistance, $R_{tot}$.

$$R_{tot} = \frac{1}{UA} \quad\text{(Equ. 7)}$$

Combining the two different equations for $\dot{Q}$:

$$UA \cdot \text{LMTD} = \dot{Q} = \dot{m}_c \cdot C_c \cdot \Delta T_c \text{ or} \quad\text{(Equ. 8)}$$

$$R_{tot,c} = \frac{1}{UA} = \frac{\text{LMTD}}{F_c \cdot C_c \cdot \Delta T_c} \quad\text{(Equ. 9)}$$

For the hot-side flow rate:

$$R_{tot,h} = \frac{1}{UA} = \frac{\text{LMTD}}{F_h \cdot C_h \cdot \Delta T_h} \quad\text{(Equ. 10)}$$

An increase in the total thermal resistance using either Equ. or Equ. 10 may indicate fouling in the heat exchanger.

For a given application, the terms $C_c$ and $C_h$ may be constant. Because a fouling detection algorithm may not actually include the value of thermal resistance, but rather, may only detect when the value changes, Equ. 9 and Equ. 10 may be reduced to:

$$R_{tot} \propto \frac{\text{LMTD}}{F_h \cdot \Delta T_h} \propto \frac{\text{LMTD}}{F_c \cdot \Delta T_c} \quad\text{(Equ. 11)}$$

In order to monitor for fouling based on thermal resistance, the heat exchanger 64 may be monitored for some or all of the following process variables: Flow Rate (Flow) of either hot or cold fluid ($F_c$ or $F_h$), Inlet Temperature of Hot Fluid ($T_{h,in}$), Outlet Temperature of Hot Fluid ($T_{h,out}$), Inlet Temperature of Cold Fluid ($T_{c,in}$), and Outlet Temperature of Cold Fluid ($T_{c,out}$). An abnormal operation of the heat exchanger 64 may be detected using a variety of methods. In one implementation, abnormal operation of a heat exchanger may be detected using extensible regression. In a further implementation, abnormal operation of a heat exchanger may be detected using a simplified algorithm for abnormal situation prevention in load-following applications.

Overview of an Abnormal Situation Prevention Module in a Heat Exchanger

Under normal operating conditions in a heat exchanger, both $R_{tot}$ and $\Delta P$ may change based upon the load variable (Flow). A regression algorithm, which models either or both of $R_{tot}$ or $\Delta P$ as a function of the flow through the heat exchanger 64 may be used to detect an abnormal situation.

Figure 4:
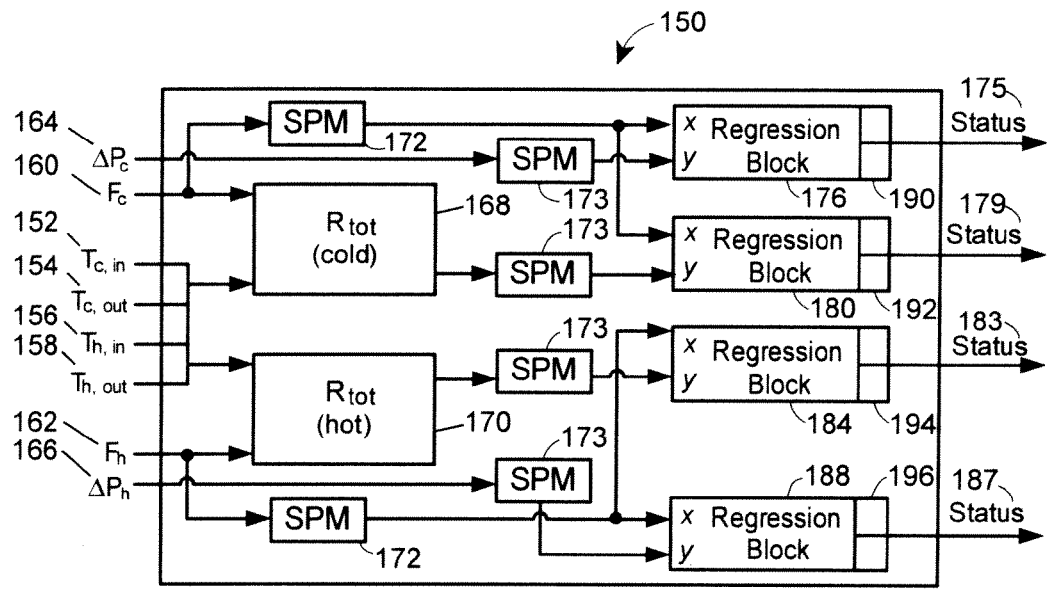
FIG. 4 is a diagram of an Heat Exchanger Abnormal Situation Prevention Module employing an extensible regression algorithm for use with a heat exchanger.

FIG. 4 is a block diagram of an example abnormal situation prevention module 150 that could be utilized in the abnormal operation detection block 80 or as the abnormal operation detection system 42 of FIG. 2 for a heat exchanger abnormal situation prevention module. The abnormal situation prevention module 150 may be used to detect abnormal operations, also referred to throughout this application as abnormal situations or abnormal conditions, that have occurred or are occurring in the heat exchanger 64, such as fouling conditions indicated by increasing $\Delta P$ and/or $R_{tot}$. Hereinafter, the abnormal situation prevention module 150 will be referred to as a Heat Exchanger Abnormal Situation Prevention Module 150. The Heat Exchanger Abnormal Situation Prevention Module 150 may be used to predict the occurrence of abnormal operations within the heat exchanger 64 before these abnormal operations actually arise, with the purpose of taking steps to prevent the predicted abnormal operation before any significant loss within the heat exchanger 64, or the process plant 10 takes place, for example, by operating in conjunction with the abnormal situation prevention system 35. In one example, a heat exchanger 64 may have a corresponding Heat Exchanger Abnormal Situation Prevention Module 150, though it should be understood that a common Heat Exchanger Abnormal Situation Prevention Module 150 may be used for multiple heat exchangers 64. Because it is possible that $\Delta P$ and/or $R_{tot}$ could change during normal operating conditions as a function of some load variable, such as Flow, the Heat Exchanger Abnormal Situation Prevention Module 150 learns the normal or baseline $\Delta P$ and/or $R_{tot}$ values for a range of values for the load variable (Flow).

With reference to FIG. 4, the Heat Exchanger Abnormal Situation Prevention Module 150 may take, as input, a plurality of process variables, as described above. For example, the Heat Exchanger Abnormal Situation Prevention Module 150 inputs may be Cold Fluid Inlet Temperature ($T_{c,in}$) 152, Cold Fluid Outlet Temperature ($T_{c,out}$) 154, Hot Fluid Inlet Temperature ($T_{h,in}$) 156, Hot Fluid Outlet Temperature ($T_{h,out}$) 158, Cold Fluid Flow Rate ($F_c$), Hot Fluid Flow Rate ($F_h$) 162, Cold Fluid Differential Pressure ($\Delta P_c$) 164, and Hot Fluid Differential Pressure ($\Delta P_h$) 166. Further, the Heat Exchanger Abnormal Situation Prevention Module could replace the $\Delta P$ inputs with absolute pressure measurements, Cold Fluid Inlet Pressure ($P_{c,in}$), Cold Fluid Outlet Pressure ($P_{c,out}$), Hot Fluid Inlet Pressure ($P_{h,in}$), and Hot Fluid Outlet Pressure ($P_{h,out}$). The Heat Exchanger Abnormal Situation Prevention Module 150 may then use the absolute pressure measurements to calculate the $\Delta P$ inputs. In accordance with Equation 11, the Heat Exchanger Abnormal Situation Prevention Module 150 may calculate $R_{tot,c}$ at block 168 and calculate $R_{tot,h}$ at block 170.

The load variables 160, 162 may pass to a corresponding load variable SPM block 172 while the monitored variable values 152, 154, 156, and 158 may be used in conjunction with load variable 160, 162 to calculate the monitored variables $R_{tot}$ 168, 170, which may then pass to a number of monitored variable SPM blocks 173 along with monitored variable values 164, 166. SPM blocks 172, 173 may be used to calculate statistical signatures of each of the monitored inputs, as well as the flow rates. In one implementation, the means ($\mu$) calculated in the SPM blocks 172 are the inputs (both x and y) to the regression blocks. The statistical signatures may also be any of various kinds of statistical data such as mean data, median data, standard deviation data, rate of change data, range data, etc., calculated from the inputs. Such data could be calculated based on a sliding window of the input or based on non-overlapping windows of the input. As one example, a load variable SPM block 172 may generate mean and standard deviation data over a user-specified sample window size, such as a most recent load variable sample and preceding samples of the load variable or any number of samples or amount of data that may be statistically useful. In this example, a mean load variable value and a standard deviation load variable value may be generated for each new load variable sample received by the load variable SPM block 172. As another example, the load variable SPM blocks 172 may generate mean and standard deviation data using non-overlapping time periods. In this example, a window of five minutes (or some other suitable time period) could be used, and a mean and/or standard deviation load variable value would thus be generated every five minutes. In a similar manner, the monitored variable SPM blocks 173 receive the monitored variables 164, 166, 168, and 170 to generate second statistical data in a manner similar to the load variable SPM blocks 172, such as mean and standard deviation data over a specified sample window. These statistical signatures may also be calculated in either a field device or a host system. In a further embodiment, for the calculation $R_{tot}$, the means of the temperatures and flow rates may be calculated in the field device with the previously-described equations applied afterwards. From the SPM blocks 172, 173 the Heat Exchanger Abnormal Situation Prevention Module 150 passes the values to a plurality of regression blocks 176, 180, 184, 188.

During a learning phase, the regression blocks 176, 180, 184, 188 each model the value of a monitored variable ($R_{tot}$ and/or $\Delta P$) as a function of the load variable (Flow). During a monitoring phase, the regression blocks 176, 180, 184, 188 calculate a predicted value of the monitored value and compare the monitored variable to the predicted value. In one embodiment, the regression block 176 predicts the value of $\Delta P_c$ as a function of $F_c$, the regression block 180 predicts the value of $R_{tot,c}$ as a function of $F_c$, the regression block 184 predicts the value of $R_{tot,h}$ as a function of $F_h$, and the regression block 188 predicts the value of $\Delta P_h$ as a function of $F_h$. For example, during the learning phase, which is described in more detail below, the regression blocks 176, 180, 184, 188 create a regression model to predict data generated from the monitored variables $R_{tot}$, $\Delta P$ as a function of data generated from the load variables ($F_h$, $F_c$, collectively referred to as "Flow"). The data generated from the monitored variables $R_{tot}$, $\Delta P$ and data generated from the load variables may include monitored data and load variable data, monitored data and load variable data that has been filtered or otherwise processed, statistical data generated from monitored data and load variable data, etc. During the monitoring phase, which is also described in more detail below, the regression model predicts a value for data generated from $R_{tot}$ and/or $\Delta P$ during operation of the heat exchanger 64. The regression blocks 176, 180, 184, 188 output a corresponding status 175, 179, 183, 187 based upon a deviation, if any, between the predicted value of data generated from $R_{tot}$ and/or $\Delta P$ and a monitored value for data generated from $R_{tot}$ and/or $\Delta P$. For example, if the monitored value of either or both of $R_{tot}$ and $\Delta P$ significantly deviates from their predicted values, the regression block 176, 180, 184, 188 may output a status of "Up", which may be an indication that fouling conditions are present in the heat exchanger. Otherwise, the regression block 176, 180, 184, 188 may output the status as "Normal."

The regression blocks 176, 180, 184, 188 include a load variable input, which is an independent variable input (x), from an SPM 172 and a monitored variable input, that is at least one dependent variable input (y), from an SPM 173. As discussed above, the monitored variables 152, 154, 156, 158, 160, and 162 are used to calculate $R_{tot}$ in the heat exchanger 64. As will be described in more detail below, the regression blocks 176, 180, 184, 188 may be trained using a plurality of data sets to model the monitored variables $R_{tot}$ or $\Delta P$ as a function of the load variable $F_c$ 160 or $F_h$ 162. The regression blocks 176, 180, 184, 188 may use the mean, standard deviation or other statistical measure of the load variable and the monitored variables from the SPMs 172, 173 as the independent and dependent variable inputs (x, y) for regression modeling. For example, the means of the load variable and the monitored variables may be used as (x, y) points in the regression modeling, and the standard deviation may be modeled as a function of the load variable and used to determine the threshold at which an abnormal situation is detected during the monitoring phase. As such, it should be understood that while the Heat Exchanger Abnormal Situation Prevention Module 150 is described as modeling the differential pressure and/or thermal resistance variables as a function of the load variable, the Heat Exchanger Abnormal Situation Prevention Module 150 may model various data generated from the differential pressure and/or thermal resistance variables as a function of various data generated from the load variable based on the independent and dependent inputs provided to the regression model, including, but not limited to, differential pressure and/or thermal resistance data and load variable data, statistical data generated from the differential pressure and/or thermal resistance data and load variable data, and differential pressure and/or thermal resistance data and load variable data that has been filtered or otherwise processed. Further, while the Heat Exchanger Abnormal Situation Prevention Module 150 is described as predicting values of the differential pressure and/or thermal resistance variables and comparing the predicted values to monitored values of the differential pressure and/or thermal resistance variables, the predicted and monitored values may include various predicted and monitored values generated from the differential pressure and/or thermal resistance variables, such as predicted and monitored differential pressure and/or thermal resistance data, predicted and monitored statistical data generated from the differential pressure and/or thermal resistance data, and predicted and monitored differential pressure and/or thermal resistance data that has been filtered or otherwise processed.

As will also be described in more detail below, the regression blocks 176, 180, 184, 188 may include one or more regression models, with each regression model provided for a different operating region. Each regression model may utilize a function to model the dependent $R_{tot}$ and/or $\Delta P$ values as a function of the independent load variable (Flow) over some range of the load variable. The regression model may comprise a linear regression model, for example, or some other regression model. Generally, a linear regression model comprises some linear combination of functions f(X), g(X), h(X), . . . . For modeling an industrial process, a typically adequate linear regression model may comprise a first order function of X (e.g., Y=m*X+b) or a second order function of X (e.g., Y=a*X²+b*X+c), however, other functions may also be suitable.

In the example shown in FIG. 4, the (x, y) points are stored during the learning phase. At the end of the learning phase, the regression coefficients are calculated to develop a regression model to predict the $R_{tot}$ and/or $\Delta P$ values as a function of the load variable. The maximum and minimum values of the load variable used to develop the regression model are also stored. In one example, the regression fits a polynomial of order p, such that predicted values ($y_p$) for the $R_{tot}$ and/or $\Delta P$ may be calculated based on the load variable values (x) (e.g., $y_{p_x}=a_0+a_1+\ldots+a_p x^p$). Generally, the order of the polynomial p would be a user input, though other algorithms may be provided that automate the determination of the order of the polynomial. Of course, other types of functions may be utilized as well such as higher order polynomials, sinusoidal functions, logarithmic functions, exponential functions, power functions, etc.

After the Heat Exchanger Abnormal Situation Prevention Module 150 has been trained, the regression models may be utilized by corresponding deviation detectors 190, 192, 194, 196 to generate at least one predicted value (y) of the dependent $R_{tot}$ and/or $\Delta P$ variables Y based on a given independent load variable (Flow) input (x) during a monitoring phase. The deviation detectors 190, 192, 194, 196 further utilize a monitored $R_{tot}$ and/or $\Delta P$ input (y) and the independent load variable (Flow) input (x) to the regression models. Generally speaking, the deviation detectors 190, 192, 194, 196 calculate the predicted values (y) for a particular load variable value and uses the predicted value as the "normal" or "baseline" $R_{tot}$ and/or $\Delta P$. Each deviation detector 190, 192, 194, 196 compares the corresponding monitored $R_{tot}$ and/or $\Delta P$ value (y) to predicted $R_{tot}$ and/or $\Delta P$ value ($y_p$), respectively, that are generated by the regression blocks 176, 180, 184, 188 to determine if either or both of the $R_{tot}$ and $\Delta P$(y) is significantly deviating from the predicted value(s) ($y_p$) (e.g., $\Delta y=y-y_p$). If the monitored value (y) is significantly deviating from the predicted value ($y_p$), this may indicate that an abnormal situation has occurred, is occurring, or may occur in the near future, and thus the deviation detectors 190, 192, 194, 196 may generate an indicator of the deviation. For example, if the monitored $R_{tot}$ value (y) is higher than the predicted $R_{tot}$ value ($y_p$) and the difference exceeds a threshold, an indication of an abnormal situation (e.g., "Up") may be generated. If not, the status is "Normal". In some implementations, the indicator of an abnormal situation may comprise an alert or alarm.

In a further embodiment, the Heat Exchanger Abnormal Situation Prevention Module 150 may be reduced when fewer than all of the variables described in relation to FIG. 4 are available. For example, if the only available measured variables available are $\Delta P_c$ 164, $F_c$ 160, $T_{c,in}$ 152, $T_{c,out}$ 154, $T_{h,in}$ 156, and $T_{h,out}$ 158, then the Heat Exchanger Abnormal Situation Prevention Module 150 may monitor for fouling using only $R_{tot}$ 168 and $\Delta P$ 164 on the Cold Side. Similarly, if the only available measured variables available are $\Delta P_h$ 166, $F_h$ 162, $T_{c,in}$ 152, $T_{c,out}$ 154, $T_{h,in}$ 156, and $T_{h,out}$ 158, then the Heat Exchanger Abnormal Situation Prevention Module 150 may monitor for fouling using only $R_{tot}$ 170 and $\Delta P$ 166 on the Hot Side.

In addition to monitoring the heat exchanger 64 for abnormal situations, the deviation detectors may also check to see if the load variable is within the limits seen during the development and training of the model. For example, during the monitoring phase the deviation detectors monitor whether a given value for the load variable is within the operating range of the regression model as determined by the minimum and maximum values of the load variable used during the learning phase of the model. If the load variable value is outside of the limits, the deviation detector may output a status of "Out of Range" or other indication that the load variable is outside of the operating region for the regression model. The regression blocks may either await an input from a user to develop and train a new regression model for the new operating region or automatically develop and train a new regression model for the new operating region, examples of which are provided further below.

One of ordinary skill in the art will recognize that the Heat Exchanger Abnormal Situation Prevention Module 150 and the regression blocks 176, 180, 184, 188 can be modified in various ways. For example, the SPM blocks 172, 173 could be omitted, and the raw values of the load variable and the monitored variables may be provided directly to the blocks as the (x, y) points used for regression modeling and provided directly to the deviation detectors for monitoring. As another example, other types of processing in addition to or instead of the SPM blocks 172, 173 could be utilized. For example, the process variable data could be filtered, trimmed, etc., prior to the SPM blocks 172, 173 or in place of utilizing the SPM blocks 172, 173.

Additionally, although the regression blocks 176, 180, 184, 188 are illustrated as having a single independent load variable input (x), a single dependent variable (y), and a single predicted value ($y_p$), the blocks could include a regression model that models one or more monitored variables as a function of multiple load variables. For example, the blocks could comprise a multiple linear regression (MLR) model, a principal component regression (PCR) model, a partial least squares (PLS) model, a ridge regression (RR) model, a variable subset selection (VSS) model, a support vector machine (SVM) model, etc.

The Heat Exchanger Abnormal Situation Prevention Module 150 could be implemented wholly or partially in a heat exchanger 64 or a device of the heat exchanger 64. As just one example, the SPM blocks 172, 173 could be implemented in a temperature sensor or temperature transmitter of the heat exchanger 64 and the regression blocks 176, 180, 184, 188 and/or the deviation detectors 190, 192, 194, 196 could be implemented in the controller 60 (FIG. 2) or some other device. In one particular implementation, the Heat Exchanger Abnormal Situation Prevention Module 150 could be implemented as a function block, such as a function block to be used in system that implements a Fieldbus protocol. Such a function block may or may not include the SPM blocks 172, 173. In another implementation, each of at least some of the Heat Exchanger Abnormal Situation Prevention Module 150 may be implemented as a function block. For example, the blocks 170, 172, 173 may be implemented as function blocks of a regression function block 188. However, the functions of each block may be distributed in a variety of manners. For example, the regression blocks 176, 180, 184, 188 may provide the output (y) to the deviation detectors 190, 192, 194, 196, rather than the deviation detectors executing the corresponding regression models to provide the prediction of the monitored variables ($y_p$). In this implementation, after it has been trained, the regression blocks 176, 180, 184, 188 may be used to generate a predicted value ($y_p$) of the monitored $R_{tot}$ and/or $\Delta P$ value (y) based on a given independent load variable (Flow) input (x). The output ($y_p$) of the blocks is provided to the deviation detectors. The deviation detectors receive the output ($y_p$) of the regression blocks as well as the dependent variable input (x) to the corresponding regression blocks. As above, the deviation detectors compare the monitored values (y) to the predicted values ($y_p$) generated by the corresponding regression block to determine if the dependent value (y) is significantly deviating from the predicted values ($y_p$).

The Heat Exchanger Abnormal Situation Prevention Module 150 may be in communication with the abnormal situation prevention system 35 (FIGS. 1 and 2). For example, the Heat Exchanger Abnormal Situation Prevention Module 150 may be in communication with the configuration application 38 to permit a user to configure the Heat Exchanger Abnormal Situation Prevention Module 150. For instance, one or more of the SPM blocks 172, 173, the regression blocks 176, 180, 184, 188, and the deviation detectors 190, 192, 194, 196 may have user configurable parameters that may be modified via the configuration application 38.

Additionally, the Heat Exchanger Abnormal Situation Prevention Module 150 may provide information to the abnormal situation prevention system 35 and/or other systems in the process plant. For example, the deviation indicator generated by the deviation detectors could be provided to the abnormal situation prevention system 35 and/or the alert/alarm application 43 to notify an operator of the abnormal condition. As another example, after the regression blocks have been trained, parameters of the regression blocks could be provided to the abnormal situation prevention system 35 and/or other systems in the process plant so that an operator can examine the regression blocks and/or so that the regression block parameters can be stored in a database. As yet another example, the Heat Exchanger Abnormal Situation Prevention Module 150 may provide (x), (y), and/or ($y_p$) values to the abnormal situation prevention system 35 so that an operator can view the values, for instance, when a deviation has been detected.

Figure 5:
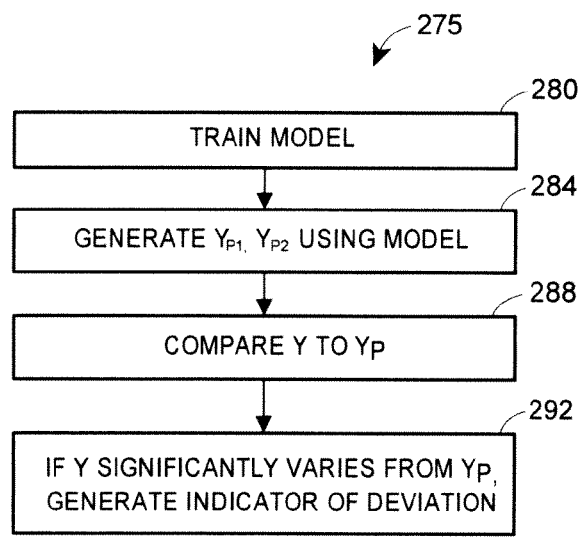
FIG. 5 is one example of a flow diagram for abnormal situation prevention in a heat exchanger using the Heat Exchanger Abnormal Situation Prevention Module.

FIG. 5 is a flow diagram of an example method 275 for detecting an abnormal operation in a heat exchanger 64 of a process plant 10. The method 275 could be implemented using the example Heat Exchanger Abnormal Situation Prevention Module 150 as described above. However, one of ordinary skill in the art will recognize that the method 275 could be implemented by another system. At a block 280, a model, such as a model provided by the regression blocks 176, 180, 184, 188, is trained. For example, the model could be trained using the independent load variable (Flow) and the dependent $R_{tot}$ and/or $\Delta P$ variable Y data sets to configure it to model the $R_{tot}$ and/or $\Delta P$ as a function of the load variable (Flow). The model could include multiple regression models that each model the $R_{tot}$ and/or $\Delta P$ variable as a function of the load variable (Flow) for a different range of the load variable.

At a block 284, the trained model generates predicted values ($y_p$) of the dependent $R_{tot}$ and/or $\Delta P$ values using values (x) of the independent load variable, Flow ($F_{c,h}$), that it receives. Next, at a block 284, the monitored values (y) of the $R_{tot}$ and/or $\Delta P$ variables are compared to the corresponding predicted values ($y_p$) to determine if the $R_{tot}$ and/or $\Delta P$ is significantly deviating from the predicted values. For example, each corresponding deviation detector 190, 192, 194, 196 generates or receives the output ($y_p$) of the regression blocks and compares it to the respective values (y) of $R_{tot}$ and/or $\Delta P$. If it is determined that the monitored value of $R_{tot}$ and/or $\Delta P$ has significantly deviated from the predicted value ($y_p$), an indicator of the deviation may be generated at a block 292. In the Heat Exchanger Abnormal Situation Prevention Module 150, for example, the deviation detectors may generate the indicator. The indicator may be an alert or alarm, for example, or any other type of signal, flag, message, etc., indicating that a significant deviation has been detected (e.g., status="Up").

As will be discussed in more detail below, the block 280 may be repeated after the model has been initially trained and after it has generated predicted values ($y_p$) of the dependent $R_{tot}$ and/or $\Delta P$ variables. For example, the model could be retrained if a set point in the process has been changed or if a value of the independent load variable falls outside of the range $x_{MIN}$, $x_{MAX}$.

Overview of the Regression Model

Figure 6:
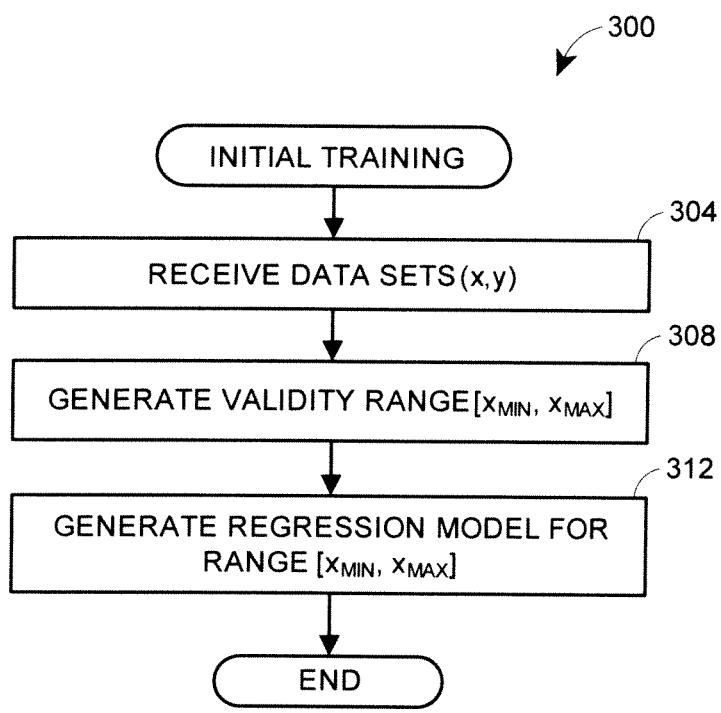
FIG. 6 is a flow diagram of an example of initially training the Heat Exchanger Abnormal Situation Prevention Module.
Figure 7A:
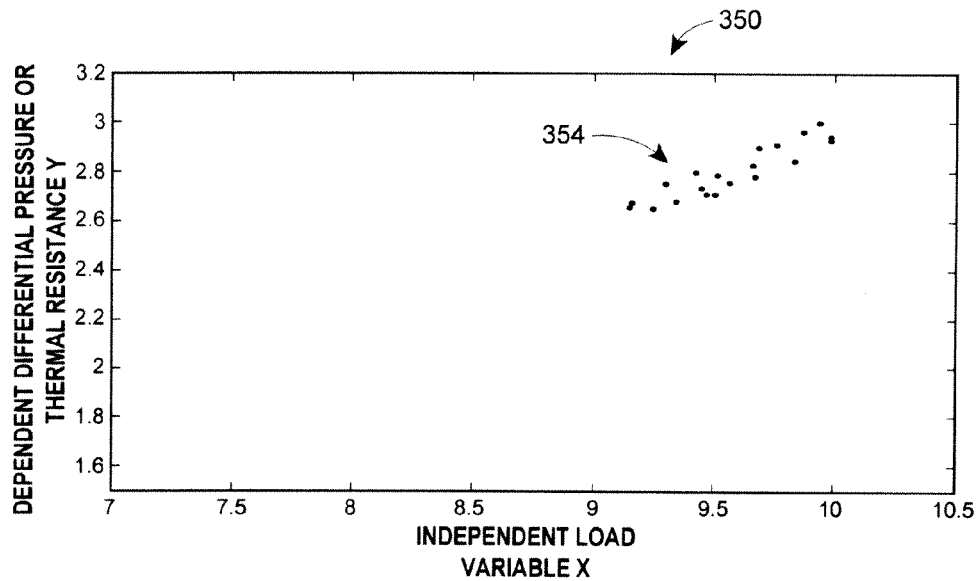
FIG. 7A is one example of a graph depicting a normal operating range for a process variable within a heat exchanger.

FIG. 6 is a flow diagram of an example method 300 for initially training a model such as the model provided by the regression blocks 176, 180, 184, 188 of FIG. 4. The training of the model may be referred to as a LEARNING state, as described further below. At a block 304, at least an adequate number of data sets (x, y) for the independent load variable X (Flow) and the dependent $R_{tot}$ and/or $\Delta P$ variable Y may be received in order to train a model. As described above, the data sets (x, y) may comprise monitored variable ($R_{tot}$ and/or $\Delta P$) and load variable ($F_{c, h}$) data, monitored and load variable data that has been filtered or otherwise processed, statistical data generated from the monitored variable and load variable data, etc. In the Heat Exchanger Abnormal Situation Prevention Module 150 of FIG. 4, the model may receive data sets (x, y) from the SPM blocks 172, 173. In one implementation, the regression model takes a single independent variable X (Flow) and a single independent variable Y ($R_{tot}$ or $\Delta P$) as inputs. In a further embodiment, the regression model takes a single X (Flow) and multiple Y ($R_{tot}$ and $\Delta P$) values as inputs. In either embodiment, the regression block may perform abnormal situation prevention diagnostics on either or both of the cold or hot side. A regression block implemented on one side of the heat exchanger may include fewer function blocks than a regression block incorporating both the hot and cold sides. Referring now to FIG. 7A, a graph 350 shows an example of a plurality of data sets (x, y) received by a model, and illustrating the Heat Exchanger Abnormal Situation Prevention Module 150 in the LEARNING state while the model is being initially trained. In particular, the graph 350 of FIG. 7A includes a group 354 of data sets that have been collected.

Referring again to FIG. 6, at a block 308, a validity range [$x_{MIN}$, $x_{MAX}$] for the model may be generated. The validity range may indicate a range of the independent load variable X for which the model is valid. For instance, the validity range may indicate that the model is valid only for load variable X values in which (x) is greater than or equal to $x_{MIN}$ and less than or equal to $x_{MAX}$. As just one example, $x_{MIN}$ could be set as the smallest value of the load variable in the data sets (x, y) received at the block 304, and $x_{MAX}$ could be set as the largest value of the load variable in the data sets (x, y) received at the block 304. Referring again to FIG. 7A, $x_{MIN}$ could be set to the load variable value of the leftmost data set, and $x_{MAX}$ could be set as the load variable value of the rightmost data set, for example. Of course, the determination of validity range could be implemented in other ways as well. In the Heat Exchanger Abnormal Situation Prevention Module 150 of FIG. 4, the regression blocks 176, 180, 184, 188 could generate the validity range.

Figure 7B:
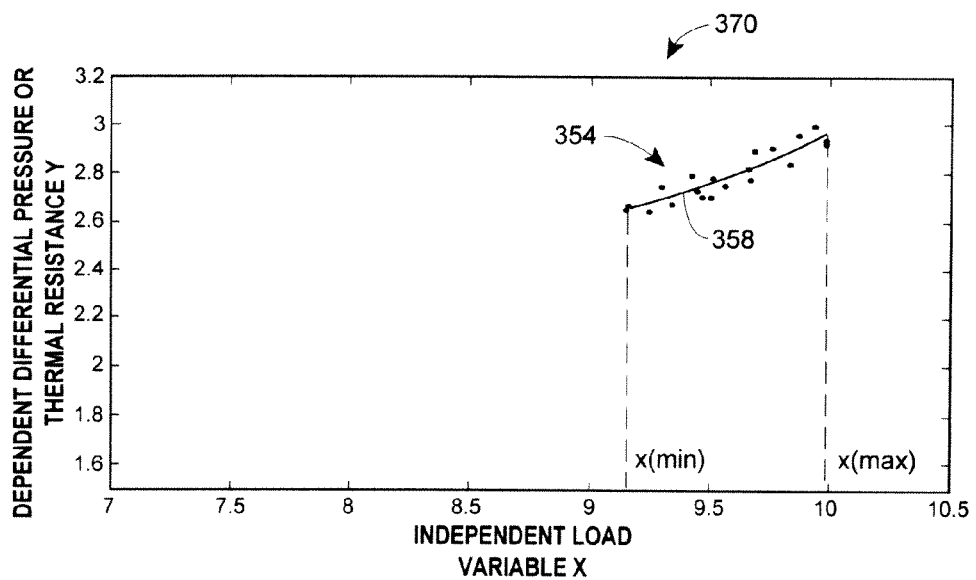
FIG. 7B is one example of a graph depicting a model for a normal operating range for a process variable within a heat exchanger.

At a block 312, a regression model for the range [$x_{MIN}$, $x_{MAX}$] may be generated based on the data sets (x, y) received at the block 304. In an example described further below, after a MONITOR command is issued, or it a maximum number of data sets has been collected, a regression model corresponding to the group 354 of data sets may be generated. Any of a variety of techniques, including known techniques, may be used to generate the regression model, and any of a variety of functions could be used as the model. For example, the model of could comprise a linear equation, a quadratic equation, a higher order equation, etc. The graph 370 of FIG. 7B includes a curve 358 superimposed on the data sets (x, y) received at the block 304 illustrates a regression model corresponding to the group 354 of data sets to model the data sets (x, y). The regression model corresponding to the curve 354 is valid in the range [$x_{MIN}$, $x_{MAX}$]. In the Heat Exchanger Abnormal Situation Prevention Module 150 of FIG. 4, the regression blocks 176, 180, 184, 188 could generate the regression model for the range [$x_{MIN}$, $x_{MAX}$].

Utilizing the Model Through Operating Region Changes

Figure 8:
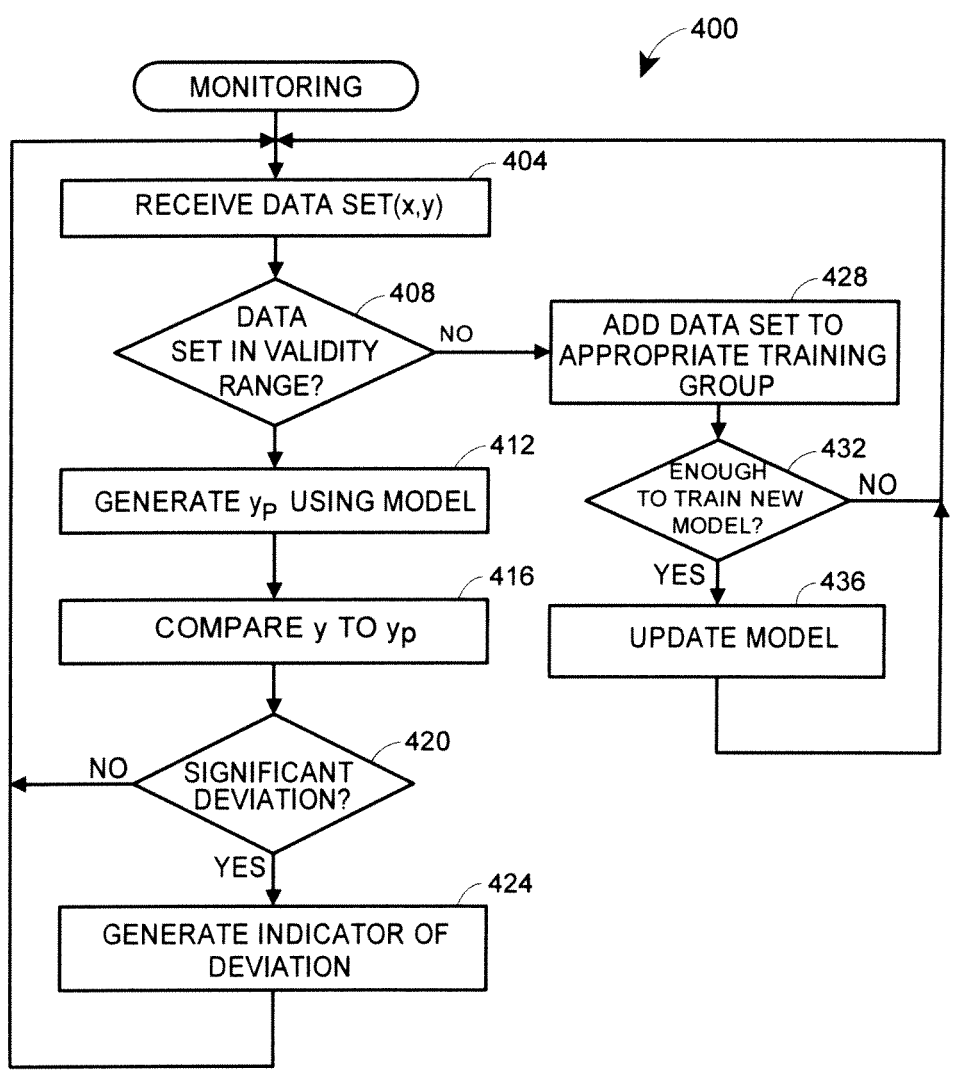
FIG. 8 is a flow diagram of an example method that may be implemented using the example Heat Exchanger Abnormal Situation Prevention Module of FIG. 4.

It may be that, after the model has been initially trained, the system that it models may move into a different, but normal operating region. For example, a set point may be changed. FIG. 8 is a flow diagram of an example method 400 for using a model to determine whether abnormal operation is occurring, has occurred, or may occur, wherein the model may be updated if the modeled process moves into a different operating region. The method 400 may be implemented by an abnormal situation prevention such as the Heat Exchanger Abnormal Situation Prevention Module 150 of FIG. 4. Of course, the method 400 could be implemented by other types of modules as well. The method 400 may be implemented after an initial model has been generated. The method 300 of FIG. 6, for example, could be used to generate the initial model.

At a block 404, a data set (x, y) is received. In the Heat Exchanger Abnormal Situation Prevention Module 150 of FIG. 4, the regression blocks could receive a data set (x, y) from the SPM blocks 172, 173 for example. Then, at a block 408, it may be determined whether the data set (x, y) received at the block 404 is in a validity range. The validity range may indicate a range in which the model is valid. In the Heat Exchanger Abnormal Situation Prevention Module 150 of FIG. 4, the regression blocks 176, 180, 184, 188 could examine the load variable value (x) received at block 404 to determine if it is within the validity range [$x_{MIN}$, $x_{MAX}$]. If it is determined that the data set (x, y) received at block 404 is in the validity range, the flow may proceed to block 412.

At the block 412, a predicted value of either or both of $R_{tot}$, and/or $\Delta P$ ($y_p$) of the dependent monitored variable Y may be generated using the model. In particular, the model generates the predicted $R_{tot}$ and/or $\Delta P$ ($y_p$) values from the total Flow ($F_{c, h}$) load variable value (x) received at the block 404. In the Heat Exchanger Abnormal Situation Prevention Module 150 of FIG. 4, the regression blocks 176, 180, 184, 188 generate the predicted values ($y_p$) from the load variable value (x) received from the SPM blocks 172, 173.

Figure 9A:
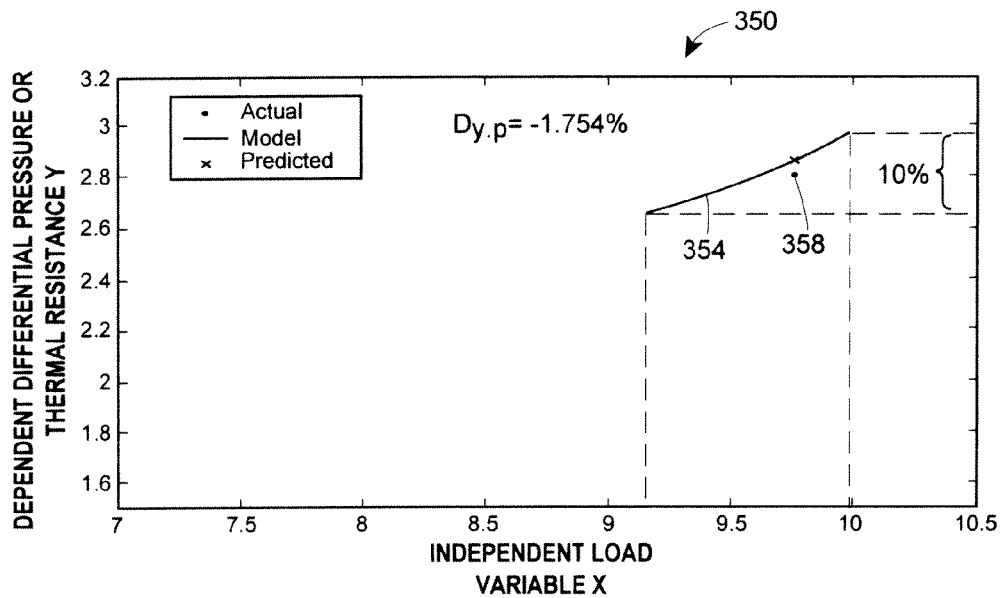
FIG. 9A is a graph showing a received data set and a corresponding predicted value generated during a MONITORING state of a Heat Exchanger Abnormal Situation Prevention Module.
Figure 9B:
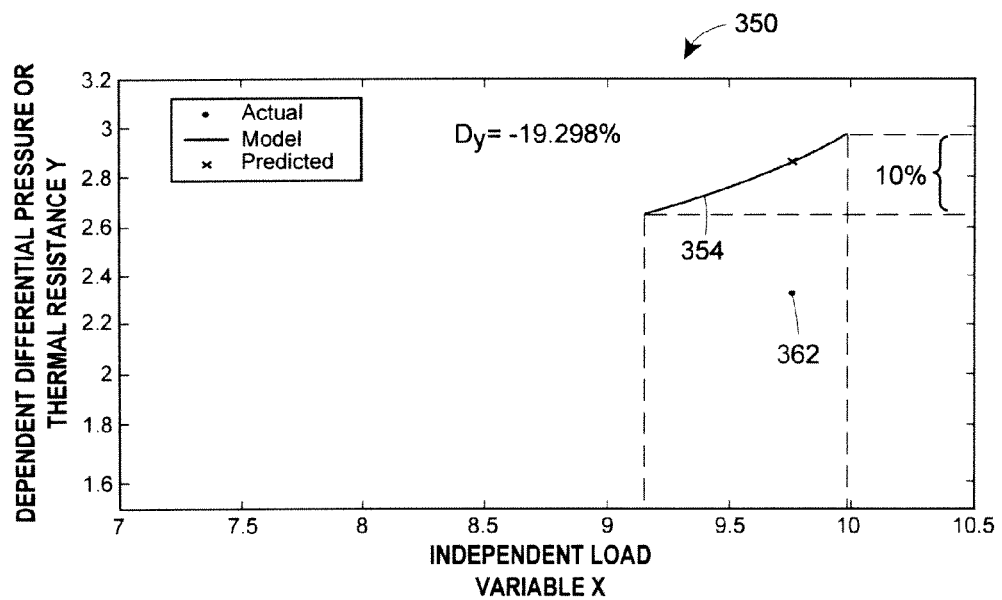
FIG. 9B is a graph showing another received data set and another corresponding predicted value generated by the Heat Exchanger Abnormal Situation Prevention Module.

Then, at a block 416, the monitored $R_{tot}$ and/or $\Delta P$ values (y) received at the block 404 may be compared with the predicted $R_{tot}$ and/or $\Delta P$ values ($y_p$). The comparison may be implemented in a variety of ways. For example, a difference or a percentage difference could be generated. Other types of comparisons could be used as well. Referring now to FIG. 9A, an example received data set is illustrated in the graph 350 as a dot 358, and the corresponding predicted value, ($y_p$), is illustrated as an "x". The graph 350 of FIG. 9A illustrates operation of the Heat Exchanger Abnormal Situation Prevention Module 150 in the MONITORING state. The model generates the prediction ($y_p$) using the regression model indicated by the curve 354. As illustrated in FIG. 9A, it has been calculated that the difference between the monitored $R_{tot}$ and/or $\Delta P$ value (y) received at the block 404 and the predicted $R_{tot}$ and/or $\Delta P$ value ($y_p$) is −1.754%. Referring now to FIG. 9B, another example received data set is illustrated in the graph 350 as a dot 362, and the corresponding predicted $R_{tot}$ and/or $\Delta P$ value, ($y_p$), is illustrated as an "x". As illustrated in FIG. 9B, it has been calculated that the difference between the monitored $R_{tot}$ and/or $\Delta P$ value (y) received at the block 404 and the predicted value ($y_p$) is −19.298%. In the Heat Exchanger Abnormal Situation Prevention Module 150 of FIG. 4, corresponding deviation detector 190, 192, 194, 196 for $R_{tot,c}$, $R_{tot,h}$, $\Delta P_c$, $\Delta P_h$ may perform the comparison.

Referring again to FIG. 8, at a block 420, it may be determined whether the $R_{tot}$ and/or $\Delta P$ value (y) received at the block 404 significantly deviates from the predicted $R_{tot}$ and/or $\Delta P$ value ($y_p$) based on the comparison of the block 416. The determination at the block 420 may be implemented in a variety of ways and may depend upon how the comparison of the block 416 was implemented. For example, if a $R_{tot}$ and/or $\Delta P$ value was generated at the block 412, it may be determined whether this difference value exceeds some threshold. The threshold may be a predetermined or configurable value. Also, the threshold may be constant or may vary. For example, the threshold may vary depending upon the value of the independent load variable (Flow) value (x) received at the block 404. As another example, if a percentage difference value was generated at the block 412, it may be determined whether this percentage value exceeds some threshold percentage, such as by more than a certain percentage of the predicted $R_{tot}$ and/or $\Delta P$ value ($y_p$). As yet another example, a significant deviation may be determined only if two or some other number of consecutive comparisons exceed a threshold. As still another example, a significant deviation may be determined only if the monitored value (y) exceeds the predicted value ($y_p$) by more than a certain number of standard deviations of the predicted variable value ($y_p$). The standard deviation(s) may be modeled as a function of the load variable X or calculated from the variable of the residuals of the training data. A common or a different threshold may be used for each of the $R_{tot}$ and/or $\Delta P$ values.

Referring again to FIG. 9A, the difference between the monitored $R_{tot}$ and/or $\Delta P$ value (y) received at the block 404 and the predicted value ($y_p$) is −1.754%. If, for example, a threshold of 10% is to be used to determine whether a deviation is significant the absolute value of the difference illustrated in FIG. 9A is below that threshold. Referring again to FIG. 9B on the other hand, the difference between the monitored $R_{tot}$ and/or $\Delta P$ value (y) received at the block 404 and the predicted $R_{tot}$ and/or $\Delta P$ value ($y_p$) is −19.298%. The absolute value of the difference illustrated in FIG. 9B is above the threshold value 10%, so an abnormal condition indicator may be generated as will be discussed below. In the Heat Exchanger Abnormal Situation Prevention Module 150 of FIG. 4, the deviation detectors 190, 192, 194, 196 may implement the block 420.

In general, determining if the monitored $R_{tot}$ and/or $\Delta P$ value (y) significantly deviates from the predicted gain $R_{tot}$ and/or $\Delta P$ value ($y_p$) may be implemented using a variety of techniques, including known techniques. In one implementation, determining if the monitored $R_{tot}$ and/or $\Delta P$ value (y) significantly deviates from the predicted $R_{tot}$ and/or $\Delta P$ value ($y_p$) may include analyzing the present values of (y) and ($y_p$). For example, the monitored $R_{tot}$ and/or $\Delta P$ value (y) could be subtracted from the predicted $R_{tot}$ and/or $\Delta P$ value ($y_p$), or vice versa, and the result may be compared to a threshold to see if it exceeds the threshold. It may optionally comprise also analyzing past values of (y) and ($y_p$). Further, it may comprise comparing (y) or a difference between (y) and ($y_p$) to one or more thresholds. Each of the one or more thresholds may be fixed or may change. For example, a threshold may change depending on the value of the load variable X or some other variable. Different thresholds may be used for different $R_{tot}$ and/or $\Delta P$ values. U.S. patent application Ser. No. 11/492,347, entitled "Methods And Systems For Detecting Deviation Of A Process Variable From Expected Values," filed on Jul. 25, 2006, and which was incorporated by reference above, describes example systems and methods for detecting whether a process variable significantly deviates from an expected value, and any of these systems and methods may optionally be utilized. One of ordinary skill in the art will recognize many other ways of determining if the monitored $R_{tot}$ and/or $\Delta P$ value (y) significantly deviates from the predicted value ($y_p$). Further, blocks 416 and 420 may be combined.

Some or all of criteria to be used in the comparing (y) to ($y_p$) (block 416) and/or the criteria to be used in determining if (y) significantly deviates from ($y_p$) (block 420) may be configurable by a user via the configuration application 38 (FIGS. 1 and 2). For instance, the type of comparison (e.g., generate difference, generate absolute value of difference, generate percentage difference, etc.) may be configurable. Also, the threshold or thresholds to be used in determining whether the deviation is significant may be configurable by an operator or by another algorithm. Alternatively, such criteria may not be readily configurable.

Referring again to FIG. 8, if it is determined that the monitored $R_{tot}$ and/or $\Delta P$ value (y) received at the block 404 does not significantly deviate from the predicted value ($y_p$), the flow may return to the block 404 to receive the next data set (x, y). If, however, it is determined that the $R_{tot}$ and/or $\Delta P$ value (y) does significantly deviate from the predicted value ($y_p$), the flow may proceed to the block 424. At the block 424, an indicator of a deviation may be generated. The indicator may be an alert or alarm, for example. The generated indicator may include additional information such as whether the value (y) received at the block 404 was higher than expected or lower than expected, for example. Referring to FIG. 9A, because the difference between the $R_{tot}$ and/or $\Delta P$ value (y) received at the block 404 and the predicted value ($y_p$) is −1.754%, which is below the threshold 10%, no indicator is generated. On the other hand, referring to FIG. 9B, the difference between (y) received at the block 404 and the predicted value ($y_p$) is −19.298%, which is above the threshold 10%. Therefore, an indicator is generated. In the Heat Exchanger Abnormal Situation Prevention Module 150 of FIG. 4, the deviation detector 190, 192, 194, 196 corresponding to the significantly deviating variable $R_{tot,c}$, $R_{tot,h}$ $\Delta P_c$, or $\Delta P_h$ may generate the indicator.

Referring again to the block 408 of FIG. 8, if it is determined that the data set (x, y) received at the block 404 is not in the validity range, the flow may proceed to a block 428. However, the models developed by the Heat Exchanger Abnormal Situation Prevention Module 150 are generally valid for the range of data for which the model was trained. If the load variable X goes outside of the limits for the model as illustrated by the curve 354, the status is out of range, and the Heat Exchanger Abnormal Situation Prevention Module 150 would be unable to detect the abnormal condition. For example, in FIG. 9C, the Heat Exchanger Abnormal Situation Prevention Module 150 receives a data set illustrated as a dot 370 that is not within the validity range. This may cause the Heat Exchanger Abnormal Situation Prevention Module 150 to transition to an OUT OF RANGE state, in which case, the Heat Exchanger Abnormal Situation Prevention Module 150 may transition again to the LEARNING state, either in response to an operator command or automatically. As such, after the initial learning period, if the process moves to a different operating region, it remains possible for the Heat Exchanger Abnormal Situation Prevention Module 150 to learn a new model for the new operating region while keeping the model for the original operating range.

Figure 10A:
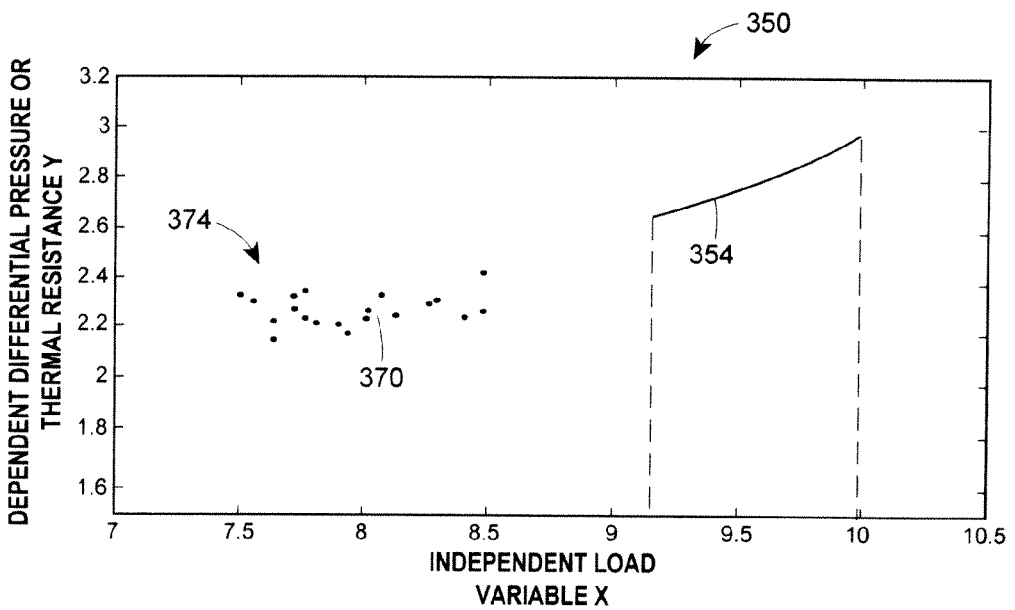
FIG. 10A is a graph showing a plurality of data sets in a different operating region collected during a LEARNING state of a Heat Exchanger Abnormal Situation Prevention Module and that may be used by the Heat Exchanger Abnormal Situation Prevention Module to develop a second regression model in a different operating region.

Referring now to FIG. 10A, it shows a graph further illustrating received data sets 370 that are not in the validity range when the Heat Exchanger Abnormal Situation Prevention Module 150 transitions back to a LEARNING state. In particular, the graph of FIG. 10A includes a group 374 of data sets that have been collected. Referring again to FIG. 8, at the block 428, the data set (x, y) received at the block 404 may be added to an appropriate group of data sets that may be used to train the model at a subsequent time. Referring to FIG. 10A, the data set 370 has been added to the group of data sets 374 corresponding to data sets in which the value of X is less than $x_{MIN}$. For example, if the value of the load variable X received at the block 404 is less than $x_{MIN}$, the data set (x, y) received at the block 404 may be added to a data group corresponding to other received data sets in which the value of the load variable X is less than $x_{MIN}$. Similarly, if the value of the load variable value X received at the block 404 is greater than $x_{MAX}$, the data set (x, y) received at the block 404 may be added to a data group corresponding to other received data sets in which the value of the load variable value is greater than $x_{MAX}$. In the Heat Exchanger Abnormal Situation Prevention Module 150 of FIG. 4, any of the regression blocks 176, 180, 184, 188 may implement the block 428.

Then, at a block 432, it may be determined if enough data sets are in the data group to which the data set was added at the block 428 in order to generate a regression model corresponding to the group 374 of data sets. This determination may be implemented using a variety of techniques. For example, the number of data sets in the group may be compared to a minimum number, and if the number of data sets in the group is at least this minimum number, it may be determined that there are enough data sets in order to generate a regression model. The minimum number may be selected using a variety of techniques, including techniques known to those of ordinary skill in the art. If it is determined that there are enough data sets in order to generate a regression model, the model may be updated at a block 436, as will be described below with reference to FIG. 14. If it is determined, however, that there are not enough data sets in order to generate a regression model, the flow may return to the block 404 to receive the next data set (x, y). In another example, an operator may cause a MONITOR command to be issued in order to cause the regression model to be generated.

Figure 11:
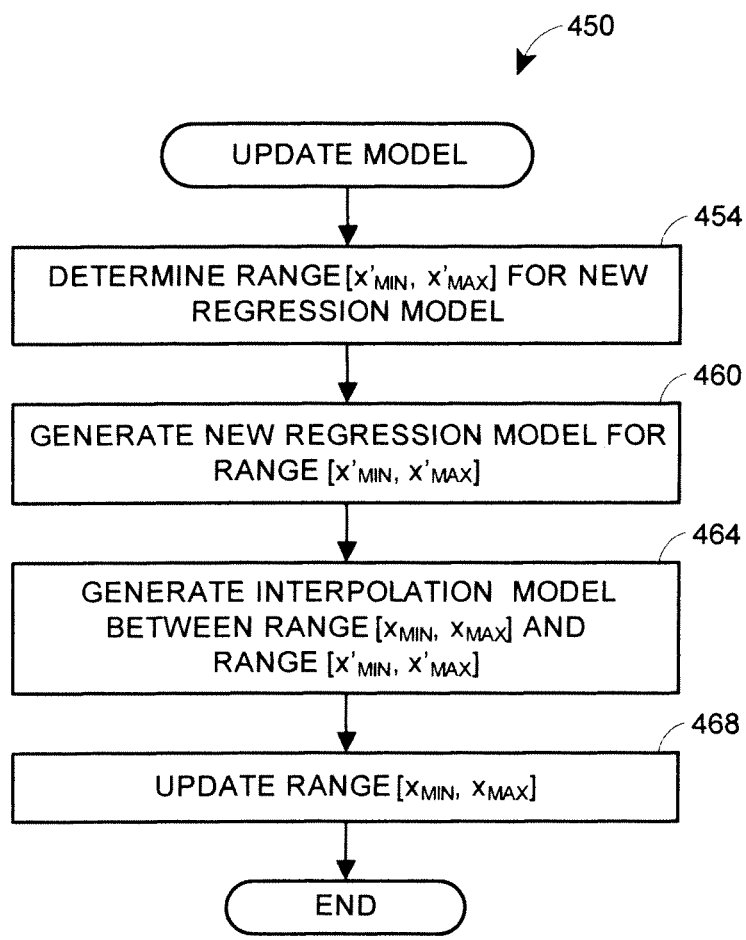
FIG. 11 is a flow diagram of an example method for updating a model of a Heat Exchanger Abnormal Situation Prevention Module.

FIG. 11 is a flow diagram of an example method 450 for updating the model after it is determined that there are enough data sets in a group in order to generate a regression model for data sets outside the current validity range $[x_{MIN}, x_{MAX}]$. At a block 454, a range $[x'_{MIN}, x'_{MAX}]$ for a new regression model may be determined. The validity range may indicate a range of the independent load variable X for which the new regression model will be valid. For instance, the validity range may indicate that the model is valid only for load variable values (x) in which (x) is greater than or equal to $x'_{MIN}$ and less than or equal to $x'_{MAX}$. As just one example, $x'_{MIN}$ could be set as the smallest value of load variable X in the group of data sets (x, y), and $x'_{MAX}$ could be set as the largest value of load variable X in the group of data sets (x, y). Referring again to FIG. 10A, $x'_{MIN}$ could be set to the load variable value (x) of the leftmost data set in the group 374, and $x'_{MAX}$ could be set as the load variable value (x) of the rightmost data set in the group 374, for example. In the Heat Exchanger Abnormal Situation Prevention Module 150 of FIG. 4, the regression blocks 176, 180, 184, 188 could generate the validity range.

Figure 10B:
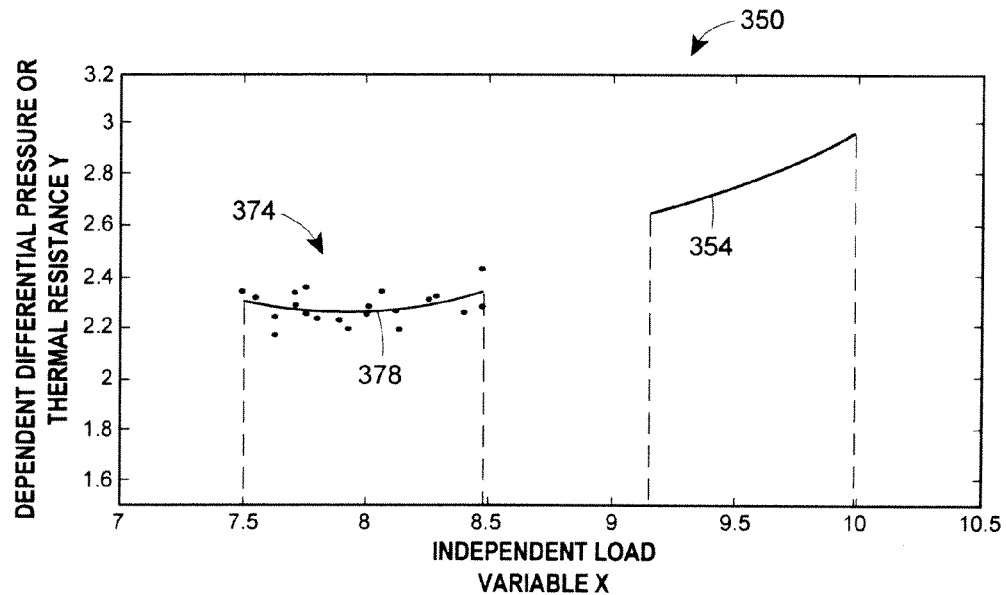
FIG. 10B is a graph showing a second regression model developed using the plurality of data sets of FIG. 10A.

At a block 460, a regression model for the range $[x'_{MIN}, x'_{MAX}]$ may be generated based on the data sets (x, y) in the group. Any of a variety of techniques, including known techniques, may be used to generate the regression model, and any of a variety of functions could be used as the model. For example, the model could comprise a linear equation, a quadratic equation, etc. In FIG. 10B, a curve 378 superimposed on the group 374 illustrates a regression model that has been generated to model the data sets in the group 374. The regression model corresponding to the curve 378 is valid in the range $[x'_{MIN}, x'_{MAX}]$, and the regression model corresponding to the curve 354 is valid in the range $[x_{MIN}, x_{MAX}]$. In the Heat Exchanger Abnormal Situation Prevention Module 150 of FIG. 4, the regression blocks 176, 180, 184, 188 could generate the regression model for the range $[x'_{MIN}, x'_{MAX}]$.

For ease of explanation, the range $[x_{MIN}, x_{MAX}]$ will now be referred to as $[x_{MIN\_1}, x_{MAX\_1}]$, and the range $[x'_{MIN}, x'_{MAX}]$ will now be referred to as $[x_{MIN\_2}, x_{MAX\_2}]$. Additionally, the regression model corresponding to the range $[x_{MIN\_1}, x_{MAX\_1}]$ will be referred to as $f_1(x)$, and regression model corresponding to the range $[x_{MIN\_2}, x_{MAX\_2}]$ will be referred to as $f_2(x)$. Thus, the model may now be represented as:

$$f(x) = \begin{cases} f_1(x) & \text{for } x_{MIN\_1} \le x \le x_{MAX\_1} \\ f_2(x) & \text{for } x_{MIN\_2} \le x \le x_{MAX\_2} \end{cases} \quad \text{(Equ. 12)}$$

Referring again to FIG. 11, at a block 464, an interpolation model may be generated between the regression models corresponding to the ranges $[x_{MIN\_1}, x_{MAX\_1}]$ and $[x_{MIN\_2}, x_{MAX\_2}]$ for the operating region between the curves 354 and 378. The interpolation model described below comprises a linear function, but in other implementations, other types of functions, such as a quadratic function, can be used. If $x_{MAX\_1}$ is less than $x_{MIN\_2}$, then the interpolation model may be calculated as:

$$\left( \frac{f_2(x_{MIN\_2}) - f_1(x_{MAX\_1})}{x_{MIN\_2} - x_{MAX\_1}} \right)(x - x_{MIN\_2}) + f_2(x_{MIN\_2}) \quad \text{(Equ. 13)}$$

Similarly, if $x_{MAX\_2}$ is less than $x_{MIN\_1}$ then the interpolation model may be calculated as:

$$\left( \frac{f_1(x_{MIN\_1}) - f_2(x_{MAX\_2})}{x_{MIN\_1} - x_{MAX\_2}} \right)(x - x_{MIN\_1}) + f_1(x_{MIN\_1}) \quad \text{(Equ. 14)}$$

Thus, the model may now be represented as:

(Equ. 15)

$$f(x) = \begin{cases} f_1(x) & \text{for } x_{MIN\_1} \le x \le x_{MAX\_1} \\ \left( \frac{f_2(x_{MIN\_2}) - f_1(x_{MAX\_1})}{x_{MIN\_2} - x_{MAX\_1}} \right)(x - x_{MIN\_2}) + & \\ \quad f_2(x_{MIN\_2}) & \text{for } x_{MAX\_1} < x < x_{MIN\_2} \\ f_2(x) & \text{for } x_{MIN\_2} \le x \le x_{MAX\_2} \end{cases}$$

if $x_{MAX\_1}$ is less than $x_{MIN\_2}$. And, if $x_{MAX\_2}$ is less than $x_{MIN\_1}$, the model may be represented as:

$$f(x) = \begin{cases} f_2(x) & \text{for } x_{MIN\_2} \le x \le x_{MAX\_2} \\ \left(\dfrac{f_1(x_{MIN\_1}) - f_2(x_{MAX\_2})}{x_{MIN\_1} - x_{MAX\_2}}\right)(x - x_{MIN\_1}) + \\ \quad f_1(x_{MIN\_1}) & \text{for } x_{MAX\_2} < x < x_{MIN\_1} \\ f_1(x) & \text{for } x_{MIN\_1} \le x \le x_{MAX\_1} \end{cases}$$ (Equ. 16)

As can be seen from equations 12, 15, and 16, the model may comprise a plurality of regression models. In particular, a first regression model (i.e., $f_1(x)$) may be used to model the dependent $R_{tot}$ and/or $\Delta P$ variable Y in a first operating region (i.e., $x_{MIN\_1} \le x \le x_{MAX\_1}$) and a second regression model (i.e., $f_2(x)$) may be used to model the dependent $R_{tot}$ and/or $\Delta P$ variable Y in a second operating region (i.e., $x_{MIN\_2} \le x \le x_{MAX\_2}$). Additionally, as can be seen from equations 15 and 16, the model may also comprise an interpolation model to model the dependent $R_{tot}$ and/or $\Delta P$ variable Y in between operating regions corresponding to the regression models.

Figure 10C:
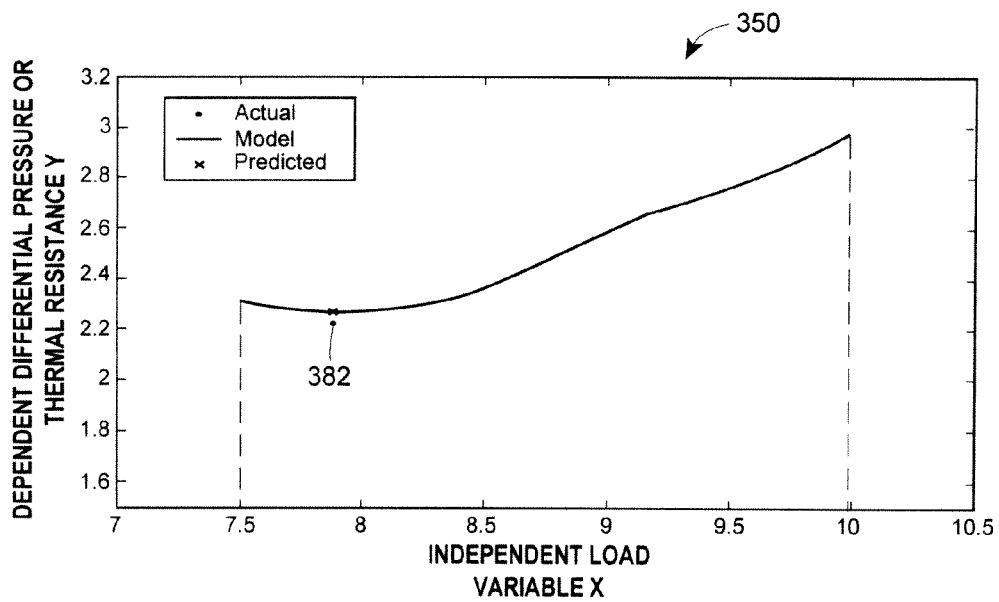
FIG. 10C is a graph showing an updated model and its range of validity, and also showing a received data set and a corresponding predicted value generated during a MONITORING state of a Heat Exchanger Abnormal Situation Prevention Module.

Referring again to FIG. 11, at a block 468, the validity range may be updated. For example, if $x_{MAX\_1}$ is less than $x_{MIN\_2}$, then $x_{MIN}$ may be set to $x_{MIN\_1}$ and $x_{MAX}$ may be set to $x_{MAX\_2}$. Similarly, if $x_{MAX\_2}$ is less than $x_{MIN\_1}$, then $x_{MIN}$ may be set to $x_{MIN\_2}$ and $x_{MAX}$ may be set to $x_{MAX\_1}$. FIG. 10C illustrates the new model with the new validity range. Referring to FIGS. 8 and 11, the model may be updated a plurality of times using a method such as the method 450. As seen from FIG. 10C, the original model is retained for the original operating range, because the original model represents the "normal" value for the $R_{tot}$ and/or $\Delta P$ variable Y. Otherwise, if the original model were continually updated, there is a possibility that the model would be updated to a faulty condition and an abnormal situation would not be detected. When the process moves into a new operation region, it may be assumed that the process is still in a normal condition in order to develop a new model, and the new model may be used to detect further abnormal situations in the system that occur in the new operating region. As such, the model for the heat exchanger 64 may be extended indefinitely as the process model to different operating regions.

The abnormal situation prevention system 35 (FIGS. 1 and 2) may cause, for example, graphs similar to some or all of the graphs illustrated in FIGS. 7A, 7B, 9A, 9B, 9C, 10A, 10B, and 10C to be displayed on a display device. For instance, if the Heat Exchanger Abnormal Situation Prevention Module 150 provides model criteria data to the abnormal situation prevention system 35 or a database, for example, the abnormal situation prevention system 35 may use this data to generate a display illustrating how the regression blocks 176, 180, 184, 188 are modeling the dependent $R_{tot}$ and/or $\Delta P$ variable Y as a function of the independent Flow ($F_{c,h}$) load variable X. For example, the display may include a graph similar to one or more of the graphs of FIGS. 7A, 7B and 10C. Optionally, the Heat Exchanger Abnormal Situation Prevention Module 150 may also provide the abnormal situation prevention system 35 or a database, for example, with some or all of the data sets used to generate the regression blocks 176, 180, 184, 188. In this case, the abnormal situation prevention system 35 may use this data to generate a display having a graph similar to one or more of the graphs of FIGS. 7A, 7B, 10A, 10B. Optionally, the Heat Exchanger Abnormal Situation Prevention Module 150 may also provide the abnormal situation prevention system 35 or a database, for example, with some or all of the data sets that the Heat Exchanger Abnormal Situation Prevention Module 150 is evaluating during its monitoring phase. Additionally, the Heat Exchanger Abnormal Situation Prevention Module 150 may also provide the abnormal situation prevention system 35 or a database, for example, with the comparison data for some or all of the data sets. In this case, as just one example, the abnormal situation prevention system 35 may use this data to generate a display having a graph similar to one or more of the graphs of FIGS. 7A and 7B.

Manual Control of the Heat Exchanger Abnormal Situation Prevention Module

In the abnormal situation prevention modules described with respect to FIGS. 6, 8, and 11, the models may automatically update itself when enough data sets have been obtained in a particular operating region. However, it may be desired that such updates do not occur unless a human operator permits it. Additionally, it may be desired to allow a human operator to cause the model to update even when received data sets are in the validity region.

Figure 12:
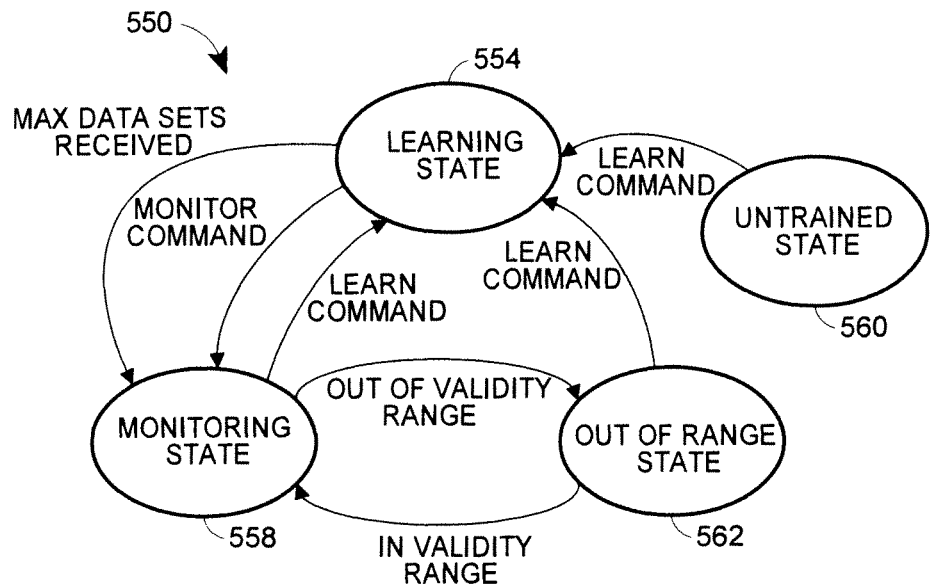
FIG. 12 is an example state transition diagram corresponding to an alternative operation of a Heat Exchanger Abnormal Situation Prevention Module such as the Heat Exchanger Abnormal Situation Prevention Module of FIG. 4.

FIG. 12 is an example state transition diagram 550 corresponding to an alternative operation of an abnormal situation prevention module such as the Heat Exchanger Abnormal Situation Prevention Module 150 of FIG. 4. The operation corresponding to the state diagram 550 allows a human operator more control over the Heat Exchanger Abnormal Situation Prevention Module 150. For example, as will be described in more detail below, an operator may cause a LEARN command to be sent to the Heat Exchanger Abnormal Situation Prevention Module 150 when the operator desires that the model of the Heat Exchanger Abnormal Situation Prevention Module 150 be forced into a LEARNING state 554. Generally speaking, in the LEARNING state 554, which will be described in more detail below, the Heat Exchanger Abnormal Situation Prevention Module 150 obtains data sets for generating a regression model. Similarly, when the operator desires that the Heat Exchanger Abnormal Situation Prevention Module 150 create a regression model and begin monitoring incoming data sets, the operator may cause a MONITOR command to be sent to the Heat Exchanger Abnormal Situation Prevention Module 150. Generally speaking, in response to the MONITOR command, the Heat Exchanger Abnormal Situation Prevention Module 150 may transition to a MONITORING state 558.

An initial state of the Heat Exchanger Abnormal Situation Prevention Module 150 may be an UNTRAINED state 560, for example. The Heat Exchanger Abnormal Situation Prevention Module 150 may transition from the UNTRAINED state 560 to the LEARNING state 554 when a LEARN command is received. If a MONITOR command is received, the Heat Exchanger Abnormal Situation Prevention Module 150 may remain in the UNTRAINED state 560. Optionally, an indication may be displayed on a display device to notify the operator that the Heat Exchanger Abnormal Situation Prevention Module 150 has not yet been trained.

In an OUT OF RANGE state 562, each received data set may be analyzed to determine if it is in the validity range. If the received data set is not in the validity range, the Heat Exchanger Abnormal Situation Prevention Module may remain in the OUT OF RANGE state 562. If, however, a received data set is within the validity range, the Heat Exchanger Abnormal Situation Prevention Module 150 may transition to the MONITORING state 558. Additionally, if a LEARN command is received, the Heat Exchanger Abnormal Situation Prevention Module 150 may transition to the LEARNING state 554.

In the LEARNING state 554, the Heat Exchanger Abnormal Situation Prevention Module 150 may collect data sets so that a regression model may be generated in one or more operating regions corresponding to the collected data sets. Additionally, the Heat Exchanger Abnormal Situation Prevention Module 150 optionally may check to see if a maximum number of data sets has been received. The maximum number may be governed by storage available to the Heat Exchanger Abnormal Situation Prevention Module 150, for example. Thus, if the maximum number of data sets has been received, this may indicate that the Heat Exchanger Abnormal Situation Prevention Module 150 is, or is in danger of, running low on available memory for storing data sets, for example. In general, if it is determined that the maximum number of data sets has been received, or if a MONITOR command is received, the model of the Heat Exchanger Abnormal Situation Prevention Module 150 may be updated and the Heat Exchanger Abnormal Situation Prevention Module 150 may transition to the MONITORING state 558.

Figure 13:
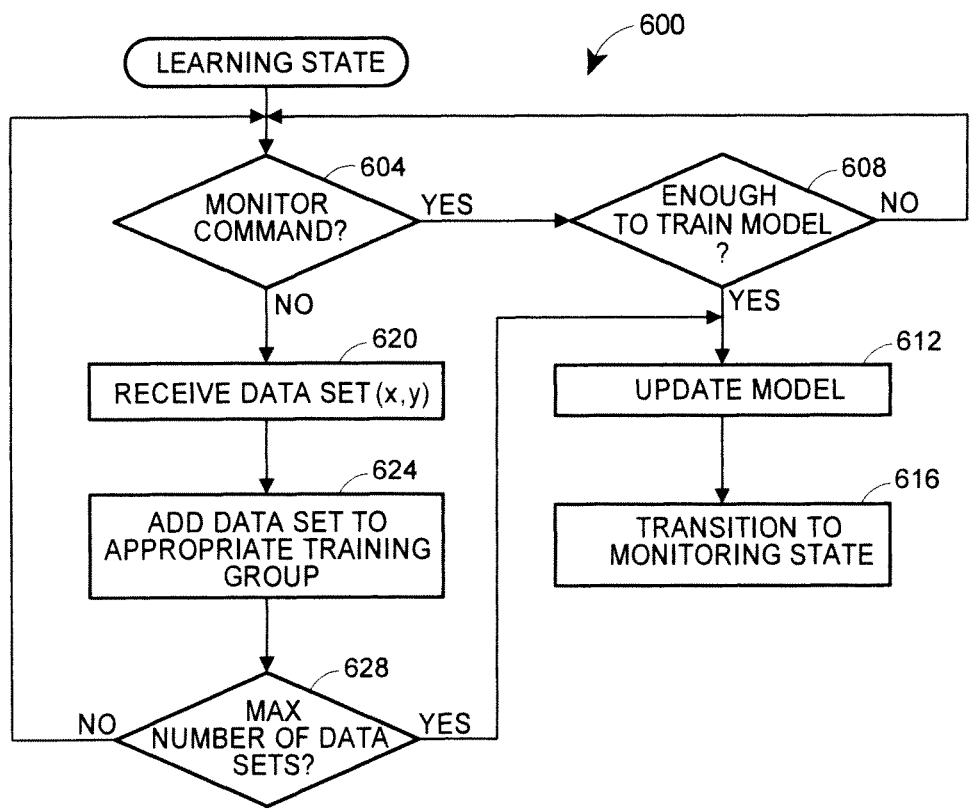
FIG. 13 is a flow diagram of an example method of operation in a LEARNING state of a Heat Exchanger Abnormal Situation Prevention Module.

FIG. 13 is a flow diagram of an example method 600 of operation in the LEARNING state 554. At a block 604, it may be determined if a MONITOR command was received. If a MONITOR command was received, the flow may proceed to a block 608. At the block 608, it may be determined if a minimum number of data sets has been collected in order to generate a regression model. If the minimum number of data sets has not been collected, the Heat Exchanger Abnormal Situation Prevention Module 150 may remain in the LEARNING state 554. Optionally, an indication may be displayed on a display device to notify the operator that the Heat Exchanger Abnormal Situation Prevention Module 150 is still in the LEARNING state because the minimum number of data sets has not yet been collected.

If, on the other hand, the minimum number of data sets has been collected, the flow may proceed to a block 612. At the block 612, the model of the Heat Exchanger Abnormal Situation Prevention Module 150 may be updated as will be described in more detail with reference to FIG. 14. Next, at a block 616, the Heat Exchanger Abnormal Situation Prevention Module 150 may transition to the MONITORING state 558.

If, at the block 604 it has been determined that a MONITOR command was not received, the flow may proceed to a block 620, at which a new data set may be received. Next, at a block 624, the received data set may be added to an appropriate training group. An appropriate training group may be determined based on the load variable value of the data set, for instance. As an illustrative example, if the load variable value is less than $x_{MIN}$ of the model's validity range, the data set could be added to a first training group. And, if the load variable value is greater than $x_{MAX}$ of the model's validity range, the data set could be added to a second training group.

At a block 628, it may be determined if a maximum number of data sets has been received. If the maximum number has been received, the flow may proceed to the block 612, and the Heat Exchanger Abnormal Situation Prevention Module 150 will eventually transition to the MONITORING state 558 as described above. On the other hand, if the maximum number has not been received, the Heat Exchanger Abnormal Situation Prevention Module 150 will remain in the LEARNING state 554. One of ordinary skill in the art will recognize that the method 600 can be modified in various ways. As just one example, if it is determined that the maximum number of data sets has been received at the block 628, the Heat Exchanger Abnormal Situation Prevention Module 150 could merely stop adding data sets to a training group. Additionally or alternatively, the Heat Exchanger Abnormal Situation Prevention Module 150 could cause a user to be prompted to give authorization to update the model. In this implementation, the model would not be updated, even if the maximum number of data sets had been obtained, unless a user authorized the update.

Figure 14:
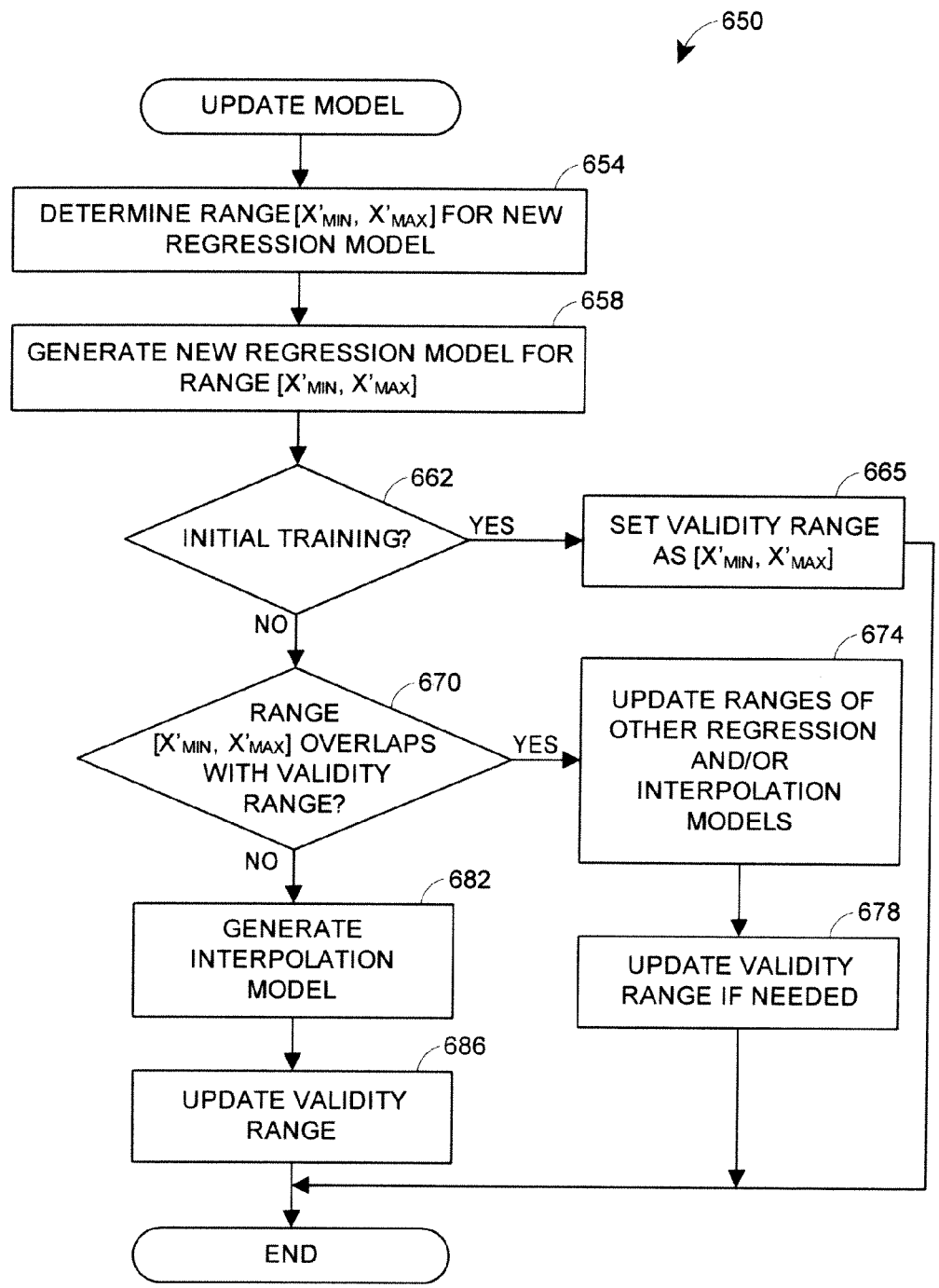
FIG. 14 is a flow diagram of an example method for updating a model of a Heat Exchanger Abnormal Situation Prevention Module.

FIG. 14 is a flow diagram of an example method 650 that may be used to implement the block 612 of FIG. 13. At a block 654, a range $[x'_{MIN}, x'_{MAX}]$ may be determined for the regression model to be generated using the newly collected data sets. The range $[x'_{MIN}, x'_{MAX}]$ may be implemented using a variety of techniques, including known techniques. At a block 658, the regression model corresponding to the range $[x'_{MIN}, x'_{MAX}]$ may be generated using some or all of the data sets collected and added to the training group as described with reference to FIG. 13. The regression model may be generated using a variety of techniques, including known techniques.

At a block 662, it may be determined if this is the initial training of the model. As just one example, it may be determined if the validity range $[x_{MIN}, x_{MAX}]$ is some predetermined range that indicates that the model has not yet been trained. If it is the initial training of the model, the flow may proceed to a block 665, at which the validity range $[x_{MIN}, x_{MAX}]$ will be set to the range determined at the block 654.

If at the block 662 it is determined that this is not the initial training of the model, the flow may proceed to a block 670. At the block 670, it may be determined whether the range $[x'_{MIN}, x'_{MAX}]$ overlaps with the validity range $[x_{MIN}, x_{MAX}]$. If there is overlap, the flow may proceed to a block 674, at which the ranges of one or more other regression models or interpolation models may be updated in light of the overlap. Optionally, if a range of one of the other regression models or interpolation models is completely within the range $[x'_{MIN}, x'_{MAX}]$, the other regression model or interpolation model may be discarded. This may help to conserve memory resources, for example. At a block 678, the validity range may be updated, if needed. For example, if $x'_{MIN}$ is less than $x_{MIN}$ of the validity range, $x_{MIN}$ of the validity range may be set to the $x'_{MIN}$.

If at the block 670 it is determined that the range $[x'_{MIN}, x'_{MAX}]$ does not overlap with the validity range $[x_{MIN}, x_{MAX}]$, the flow may proceed to a block 682. At the block 682, an interpolation model may be generated, if needed. At the block 686, the validity range may be updated. The blocks 682 and 686 may be implemented in a manner similar to that described with respect to blocks 464 and 468 of FIG. 11.

One of ordinary skill in the art will recognize that the method 650 can be modified in various ways. As just one example, if it is determined that the range $[x'_{MIN}, x'_{MAX}]$ overlaps with the validity range $[x_{MIN}, x_{MAX}]$, one or more of the range $[x'_{MIN}, x'_{MAX}]$ and the operating ranges for the other regression models and interpolation models could be modified so that none of these ranges overlap.

Figure 15:
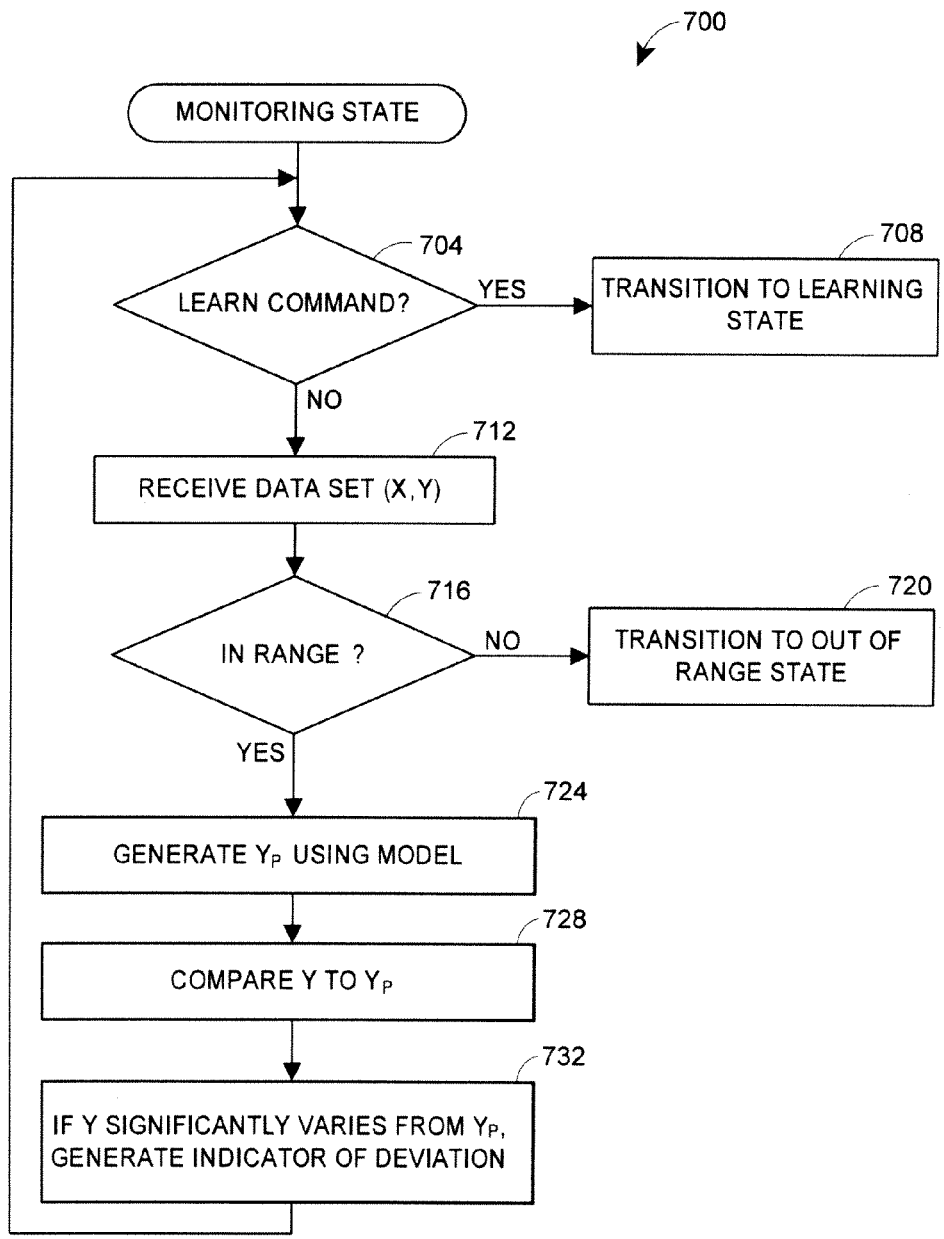
FIG. 15 is a flow diagram of an example method of operation in a MONITORING state of a Heat Exchanger Abnormal Situation Prevention Module.

FIG. 15 is a flow diagram of an example method 700 of operation in the MONITORING state 558. At a block 704, it may be determined if a LEARN command was received. If a LEARN command was received, the flow may proceed to a block 708. At the block 708, the Heat Exchanger Abnormal Situation Prevention Module 150 may transition to the LEARNING state 554. If a LEARN command was not received, the flow may proceed to a block 712.

At the block 712, a data set (x, y) may be received as described previously. Then, at a block 716, it may be determined whether the received data set (x, y) is within the validity range $[x_{MIN}, x_{MAX}]$. If the data set is outside of the validity range $[x_{MIN}, x_{MAX}]$, the flow may proceed to a block 720, at which the Heat Exchanger Abnormal Situation Prevention Module 150 may transition to the OUT OF RANGE state 562.

But if it is determined at the block 716 that the data set is within the validity range [$x_{MIN}$, $x_{MAX}$], the flow may proceed to blocks 724, 728 and 732. The blocks 724, 728 and 732 may be implemented similarly to the blocks 284, 288 and 292, respectively, as described with reference to FIG. 5.

To help further explain state transition diagram 550 of FIG. 12, the flow diagram 600 of FIG. 13, the flow diagram 650 of FIG. 14, and the flow diagram 700 of FIG. 15, reference is again made to FIGS. 7A, 7B, 9A, 9B, 9C, 10A, 10B, 10C. FIG. 7A shows the graph 350 illustrating the Heat Exchanger Abnormal Situation Prevention Module 150 in the LEARNING state 554 while its model is being initially trained. In particular, the graph 350 of FIG. 7A includes the group 354 of data sets that have been collected. After an operator has caused a MONITOR command to be issued, or it a maximum number of data sets has been collected, a regression model corresponding to the group 354 of data sets may be generated. The graph 350 of FIG. 7B includes a curve 358 indicative of the regression model corresponding to the group 354 of data sets. Then, the Heat Exchanger Abnormal Situation Prevention Module 150 may transition to the MONITORING state 558.

Figure 9C:
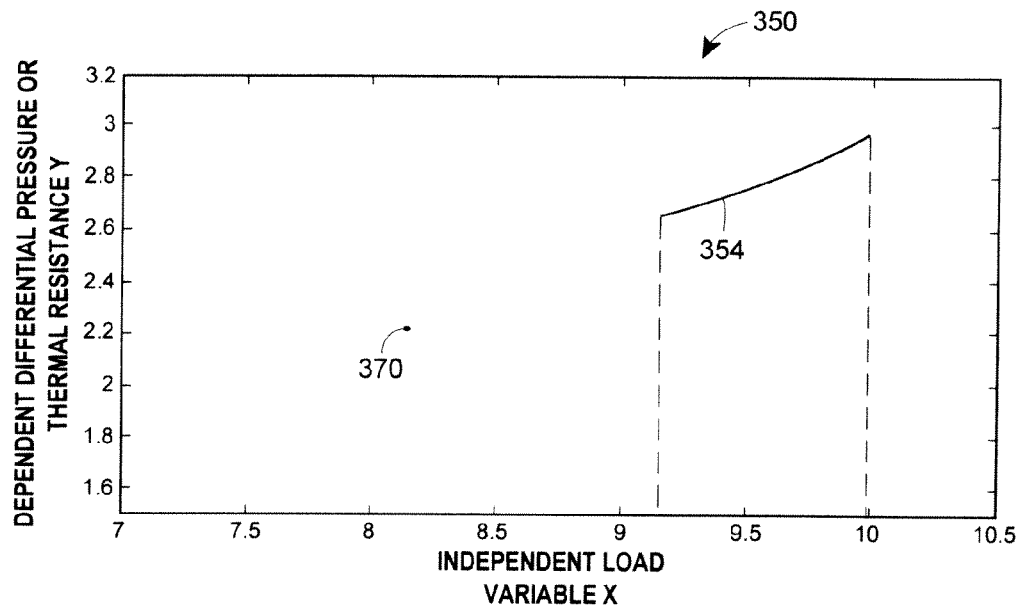
FIG. 9C is a graph showing a received data set that is out of a validity range of the Heat Exchanger Abnormal Situation Prevention Module.

The graph 350 of FIG. 9A illustrates operation of the Heat Exchanger Abnormal Situation Prevention Module 150 in the MONITORING state 558. In particular, the Heat Exchanger Abnormal Situation Prevention Module 150 receives the data set 358 that is within the validity range. The model generates a prediction $y_p$ (indicated by the "x" in the graph of FIG. 9A) using the regression model indicated by the curve 354. In FIG. 9C, the Heat Exchanger Abnormal Situation Prevention Module 150 receives the data set 370 that is not within the validity range. This may cause the Heat Exchanger Abnormal Situation Prevention Module 150 to transition to the OUT OF RANGE state 562.

If the operator subsequently causes a LEARN command to be issued, the Heat Exchanger Abnormal Situation Prevention Module 150 will transition again to the LEARNING state 554. The graph 220 of FIG. 10A illustrates operation of the Heat Exchanger Abnormal Situation Prevention Module 150 after it has transitioned back to the LEARNING state 554. In particular, the graph of FIG. 10A includes the group 374 of data sets that have been collected. After an operator has caused a MONITOR command to be issued, or if a maximum number of data sets has been collected, a regression model corresponding to the group 374 of data sets may be generated. The graph 350 of FIG. 10B includes the curve 378 indicative of the regression model corresponding to the group 374 of data sets. Next, an interpolation model may be generated for the operating region between the curves 354 and 378.

Then, the Heat Exchanger Abnormal Situation Prevention Module 150 may transition back to the MONITORING state 558. The graph 350 of FIG. 13C illustrates the Heat Exchanger Abnormal Situation Prevention Module 150 again operating in the MONITORING state 558. In particular, the Heat Exchanger Abnormal Situation Prevention Module 150 receives the data set 382 that is within the validity range. The model generates a prediction $y_p$ (indicated by the "x" in the graph of FIG. 13C) using the regression model indicated by the curve 378 of FIG. 10B.

If the operator again causes a LEARN command to be issued, the Heat Exchanger Abnormal Situation Prevention Module 150 will again transition to the LEARNING state 554, during which a further group of data sets are collected. After an operator has caused a MONITOR command to be issued, or if a maximum number of data sets has been collected, a regression model corresponding to the group of data sets may be generated. Ranges of the other regression models may be updated. For example, the ranges of the regression models corresponding to the curves 354 and 378 may be lengthened or shortened as a result of adding a regression model between the two. Additionally, the interpolation model for the operating region between the regression models corresponding to the curves 354 and 378 are overridden by a new regression model corresponding to a curve between curves 354, 378. Thus, the interpolation model may be deleted from a memory associated with the Heat Exchanger Abnormal Situation Prevention Module 150, if desired. After transitioning to the MONITORING state 558, the Heat Exchanger Abnormal Situation Prevention Module 150 may operate as described previously.

Heat Exchanger Abnormal Operation Detection Using a Simplified Algorithm for Abnormal Situation Prevention in Load Following Applications The Heat Exchanger Abnormal Situation Prevention Module 150 described above in relation to FIG. 4 may be suited for situations in which an abnormal condition builds up slowly over time. For example, when fluids with a low fouling capability (e.g., water) are employed in a heat exchanger 64, residual material from one or both of the fluids may gradually build up in the inside walls of the heat exchanger over the course of days or weeks. Measurement values that may be used to detect the residual material build up may be available for example, every 1 to 10 seconds. In this case, a sample window of 5 minutes may contain 30-300 samples from which to calculate the appropriate statistical signatures, such as the load variable mean $\mu_L$, the monitored variable mean $\mu_M$, or the monitored variable standard deviation $\sigma_M$. With a sample window of 5 minutes it would take six hours to calculate a regression curve based on just 72 mean values (72 samples×5 minutes/sample×1 hr/60 minutes=6 hr). A six-hour training period for developing the regression model is not a problem when the abnormal situation takes much longer than six hours to develop. In other circumstances, however, an abnormal situation may develop in a much shorter time frame. For example, when the fluids employed in a heat exchanger 64 are particularly susceptible to quick residual material build up. In these situations a six-hour or other comparably long training period may be entirely unsuitable.

Figure 16:
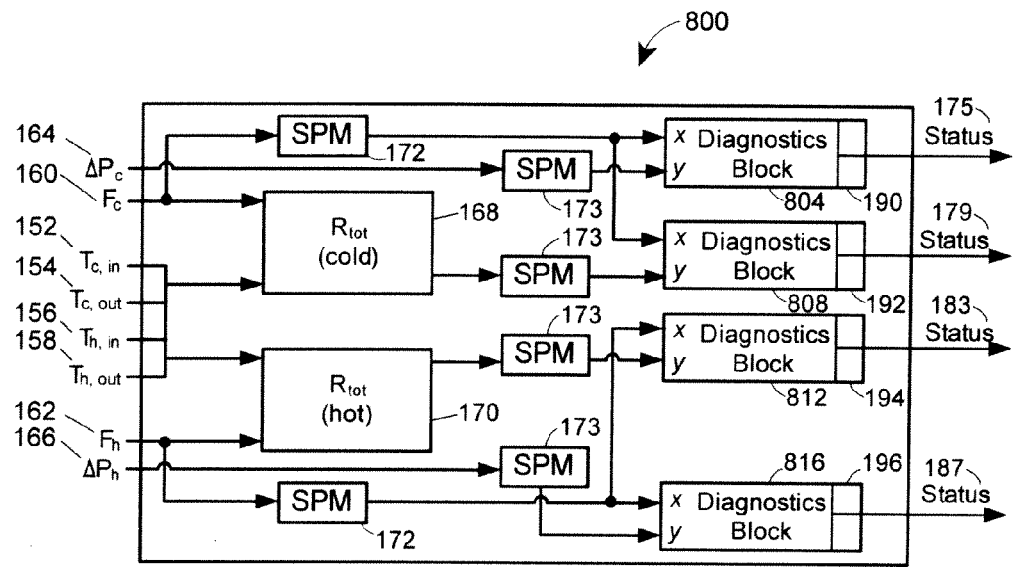
FIG. 16 is a diagram of an alternative Heat Exchanger Abnormal Situation Prevention Module employing a load following algorithm for use with a heat exchanger.

An alternative Heat Exchanger Abnormal Situation Prevention Module 800 having a much shorter training period is shown in FIG. 16. The alternative Heat Exchanger Abnormal Situation Prevention Module 800 is described in detail in U.S. patent application Ser. No. 11/906,353, entitled "SIMPLIFIED ALGORITHM FOR ABNORMAL SITUATION PREVENTION IN LOAD FOLLOWING APPLICATIONS INCLUDING PLUGGED LINE DIAGNOSTICS IN A DYNAMIC PROCESS," filed on the same day as the present application. The above-referenced patent application is hereby incorporated by reference herein, in its entirety. The alternative Heat Exchanger Abnormal Situation Prevention Module 800 includes many of the features of the Heat Exchanger Abnormal Situation Prevention Module 150 described above, with the exception of the diagnostics blocks 804, 808, 812, 816. As with the Heat Exchanger Abnormal Situation Prevention Module 150, in the alternative Heat Exchanger Abnormal Situation Prevention Module 800, a load variable 160, 162 may be input to a load variable SPM block 172. The load variable SPM block 172 may calculate the mean $\mu L$, the standard deviation $\sigma L$, or some other statistical signature of the load variable values received over a specified sample window. A plurality of monitored variables 152, 154, 156, 158, 160, and 162, may be used to calculate Rtot,c and Rtot,h, which, with monitored variables 164 and 166, may be input to a monitored variable SPM block 173.

The monitored variable SPM block 173 may calculate the mean μM, the standard deviation σM, or some other statistical signature of the monitored variable values received over the specified sample window. The statistical signature values output from the load variable SPM block 172 are input to the diagnostic blocks 804, 808, 812, 816 as the independent variable x. The statistical signature values output from the monitored variable SPM block 173 may be input to the diagnostics blocks 804, 808, 812, 816 as the dependent variable y. The diagnostics blocks 804, 808, 812, 816 may calculate the difference Δy between an actual measured value of the dependent variable y and a predicted value of the dependent variable yP. The diagnostics blocks 804, 808, 812, 816 may determine whether an abnormal situation exists and generate an appropriate status signal 175, 179, 183, 187 that may be transmitted to a controller or other process control device.

Figure 17:
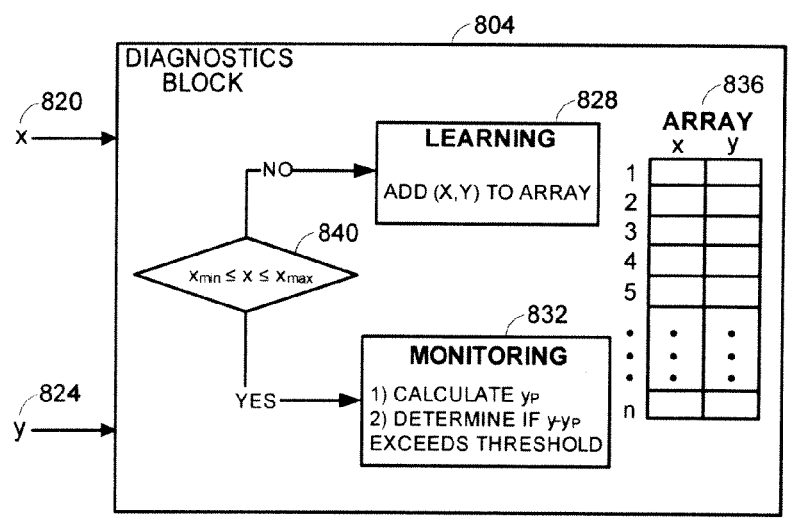
FIG. 17 is a detailed block diagram of the diagnostic block shown in FIG. 16.
Figure 18:
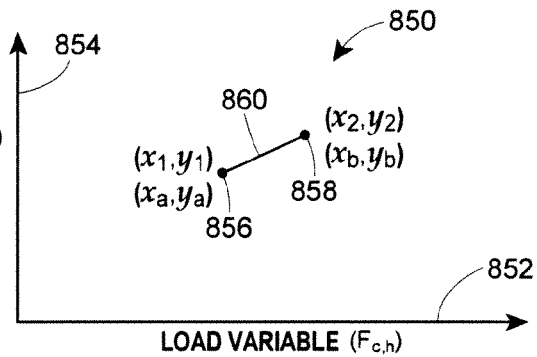
FIG. 18 is a table showing an array of data points and a corresponding plot of a function defined by the data points in the array when the array includes two data points.

A detailed block diagram of an example of a diagnostics block 804, 808, 812, 816 is shown in FIG. 17. While only one diagnostics block 804 is shown, the following description is equally applicable to diagnostics blocks 808, 812, and 816, as well. The output of the load variable SPM block 172 may be input to the diagnostics block 804 as the independent variable x 820, and the output of the second SPM block 173 may be input to the diagnostics block 804 as the dependent variable y 824. The SPM blocks 172, 173 may operate on common sample windows so that corresponding (x, y) values may be received by the diagnostics block 804 at substantially the same time. The diagnostics block 804 may implement a learning function 828 and a monitoring function 832. The diagnostics block 804 also may maintain an array of selected (x, y) data points 836. When a new set of (x, y) values is received from the SPM blocks 172, 173, a determination may be made in decision block 840 whether to implement the learning function 828 or the monitoring function 832. At decision block 840 the value of the independent variable x of the new data set may be compared to the values of the independent variable x of the data stored in the array 836. If the value of the independent variable x in the new (x, y) data set is outside the range of independent variable values that have already been received and stored in the array, in other words, if $x<x_{min}$ or $x>x_{max}$, where $x_{min}$ is the smallest value of the independent variable x stored in the array 836 and $x_{max}$ is the highest value of the independent variable x stored in the array 836, then the learning function 172 may be executed. If the value of the independent variable x in a new (x, y) data set is within the range of independent variable x values that have already been received and stored in the array, in other words if $x_{min} \leq x \leq x_{max}$ then the monitoring function 832 may be executed. When the learning function 832 is executed, the new (x, y) data set may be added to the array 836. If $x<x_{min}$, the new data set may be added to the top or front of the array 836 and the index values of the existing data sets stored in the array 836 may be incremented by 1. If $x>x_{max}$, the new data set may be added to the bottom or back of the array 836 and the index values of the existing data sets are left unchanged.

The array 836 may define a function that models the dependent variable y as a function of received values of the independent variable x. The function defined by the array may comprise a plurality of linear segments extending between data points defined by the (x, y) data sets stored in the array 836. For a given value of x, a corresponding value of y may be predicted using the function as follows. If the received value of x equals one of the values $x_i$ stored in the array 836, then the predicted value of the dependent variable $y_p$ is simply equal to the corresponding value $y_i$ stored in the array 836. However, if the value of the independent variable x does not exactly match one of the values $x_i$ stored in the array 836, the predicted value of the dependent variable $y_p$ may be calculated by performing a linear interpolation between the pair of (x, y) data sets in the array 836 having independent variable x values that are nearest to the received value of the independent variable x, and which are greater than and less than the received value of the independent variable x, respectively. Specifically, if $x_i \leq x \leq x_{i+1}$, $y_p$ may be calculated by performing a linear interpolation between the data points $(x_i, y_i)$ and $(x_{i+1}, y_{i+1})$, according to the formula:

$$y_p = \frac{y_{i+1} - y_i}{x_{i+1} - x_i}(x - x_i) + y_i \qquad \text{(Equ. 17)}$$

Once a predicted value $y_p$ has been calculated, the diagnostics block 804 may calculate the difference between the actual value of the dependent variable y of the new (x, y) data set and the predicted value of the dependent variable $y_p$ according to the formula $\Delta y = y - y_p$. The diagnostics block 804 may then determine whether Δy exceeds an established threshold value. If Δy exceeds the threshold value, the diagnostics block may detect an abnormal situation and generate the appropriate status signal status signal 175, 179, 183, 187.

FIGS. 18-21 illustrate the process of building a model of a monitored variable as a function of a corresponding load variable according to the alternative Heat Exchanger Abnormal Situation Prevention Module of FIGS. 16 and 17. Each of FIGS. 18-21 show the contents of the array 836 as new data sets are received. The data sets stored in the array are also shown plotted on a coordinate system 850. The horizontal axis 852 represents load variable values (Flow) and the vertical axis 854 represents monitored variable values ($R_{tot}$ and/or ΔP).

Initially there are no data sets stored in the array 836. A first set of values $(x_a, y_a)$ is received from the SPM blocks 172, 173. The value $x_a$ is compared to the minimum and maximum values of the $F_{c,h}$ load variable $(x_{min}, x_{max})$ of the data sets stored in the array 836. Since there are initially no data sets stored in the array, no values for $x_{min}$ and $x_{max}$ have been established and the value $x_a$ cannot fall within the range $x_{min} \leq x_a \leq x_{max}$. Therefore, the teaming function 828 is implemented and the data set $(x_a, y_a)$ is added to the array 836. Since there are no other data sets stored in the array 836 at the time that the data set $(x_a, y_a)$ is added to the array, the dataset $(x_a, y_a)$ is added to the first position in the array and is accorded the index value "1". Thus, when the array 836 is plotted on the coordinate system 850, the point $(x_1, y_1)$ 856 corresponds to the values $(x_a, y_a)$ of the first data set received from the SPM blocks 172, 173.

A second set of load ($F_{c,h}$) and monitored ($R_{tot}$ and/or ΔP) variable values $(x_b, y_b)$ is received from the SPM blocks 172, 173. Again the received value of the load variable $x_b$ is compared to the load variable values stored in the array 836. Since there is only one data set $(x_a, y_a)$ stored in the array 836 the received load variable value $x_b$ cannot fall within the range between $x_{min} \leq x_a \leq x_{max}$ unless $x_b$ is exactly equal to $x_a$. In this example, it is assumed that $x_b > x_a$. The learning function 828 is implemented once again and the data set $(x_b, y_b)$ is added to the end of the array 836. Since the data set $(x_b, y_b)$ is the second data set stored in the array 836 it is accorded in the index value "2". When the array 836 is plotted on the coordinate system 850, the point $(x_2, y_2)$ 858 corresponds to the received load and monitored variable values $(x_b, y_b)$ received from the SPM blocks 172, 173. At this point, the model of the monitored variable ($R_{tot}$ and/or $\Delta P$) comprises the line segment 860 extending between and including the data points ($x_1,y_1$) 856 and ($x_2,y_2$) 858.

Figure 19:
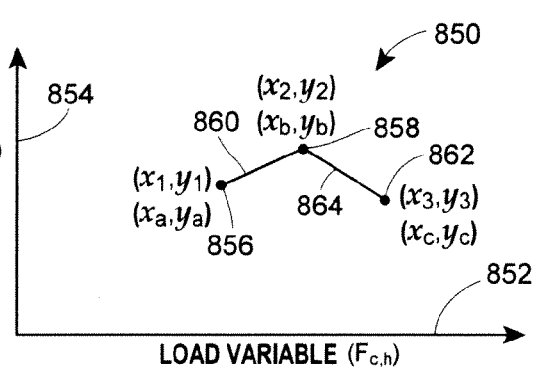
FIG. 19 is a table showing an array of data points and a corresponding plot of a function defined by the data points in the array when the array includes three data points.

In FIG. 19, a third data set comprising load ($F_{c,\,h}$) and monitored ($R_{tot}$ and/or $\Delta P$) variable values ($x_c$, $y_c$) is received from the SPM blocks 172, 173. In this case, it is assumed that $x_c > x_b$. At this point, $x_{min} = x_a$ (the lowest value of the monitored variable stored in the array 836) and $x_{max} = x_b$ (the highest value of the monitored variable store in the array 836). Since $x_c$ is greater than $x_b$, it does not fall within the range $x_{min} \leq x_c \leq x_{max}$ and the earning function 828 is implemented again. The data set ($x_c$, $y_c$) is added to the array 836. Since $x_c > x_{max}$ ($x_b$), the data set ($x_c$, $y_c$) is added to the end of the array 836 and is accorded the index value "3". When the array 836 is plotted on the coordinate system 850 as shown in FIG. 19, the point ($x_3$, $y_3$) 862 corresponds to the received load and monitored variable values ($x_c$, $y_c$) received from the SPM blocks 172, 173. Now the model of the monitored variable comprises the linear segment 860 extending between and including the data points ($x_1,y_1$) and ($x_2,y_2$) and the linear segment 864 extending between and including the data points ($x_2$, $y_2$) and ($x_3$, $y_3$).

Next, a fourth data set ($x_d, y_d$) is received from the SPM blocks 172, 173. In this case, it is assumed that $x_b < x_d < x_c$. At this stage, the smallest value of the monitored variable stored in the array 836 is $x_a$ and the largest value of the monitored variable stored in the array 836 is $x_c$. In other words $x_{min} = x_a$ and $x_{max} = x_c$. This time, the received value of the monitored variable $x_d$ is within the range $x_{min} < x_d < x_{max}$. Therefore, the monitoring function 832 is implemented with regard to the data set ($x_d, y_d$) rather than the learning function 828, and the data set ($x_d, y_d$) is not added to the array 836.

In implementing the monitoring function 832 with regard to the data set ($x_d, y_d$) the algorithm calculates a predicted value of the monitored variable $y_d$ based on the existing model and the received value of the load variable $x_d$. As mentioned above, it is assumed that the received value of the load variable $x_d$ falls within the range of $x_b < x_d < x_c$, since $x_d$ is between the values $x_b$ and $x_c$ the predicted value of the monitored variable may be calculated based on the portion of the model 850 represented by the linear segment 864 extending between and including ($x_2$ $y_2$) 858 and ($x_3$, $y_3$) 862 (i.e. ($x_b$, $y_b$) and ($x_c$, $y_c$)). Recalling Equ. 17, the formula for calculating the predicted value of the monitored variable $y_p$ is $$y_p = \frac{y_3 - y_2}{x_3 - x_2} \cdot (x_d - x_2) + y_2$$

or $$y_p = \frac{y_c - y_b}{x_c - x_b} \cdot (x_d - x_b) + y_b.$$

In alternative embodiments, the function modeling the monitored variable may be generated by methods other than performing a linear interpolation between the points in the array. For example, a spline may be generated for connecting the points in the array with a smooth curve. In a second order, or quadratic spline, a second order polynomial may be defined for connecting each pair of adjacent points. Curves may be selected in which the first derivatives of the curves are equal at the points where the curves meet (i.e. at the points defined in the array).

In a third order or cubic spline, a third order polynomial may be defined for connecting each pair of adjacent points. In this case, adjacent curves having equal first and second derivatives at the points where the curves meet may be selected.

Once the predicted value of the monitored variable has been determined, the difference between the predicted value of the monitored variable $y_p$ and the received value of the monitored variable $y_d$ is compared to a threshold value. If $y_d - y_p$ is greater than the threshold value an abnormal situation is detected. If $y_d - y_p$ is not greater than the threshold, the process is operating within acceptable limits, and the monitoring of the monitored variable continues with the receipt of the next data set. In one example, the threshold value is provided as an absolute value.

Figure 20:
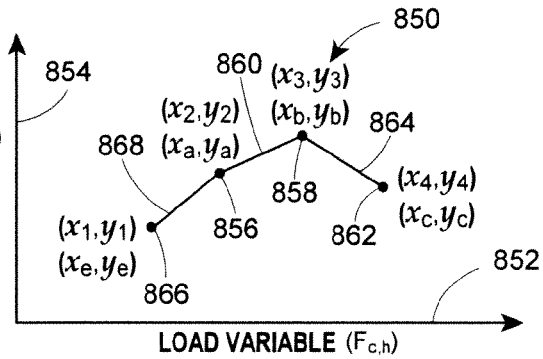
FIG. 20 is a table showing an array of data points and a corresponding plot of a function defined by the data points in the array when the array includes four data points.

Continuing with FIG. 20, a fifth data set ($x_e$, $y_e$) is received from the SPM blocks 172, 173. In this case, it is assumed that $x_e < x_a$. When the data set ($x_e$, $y_e$) is received, the smallest value of the load variable stored in the array 836 is $x_a$ and the largest value of the load variable stored in the array 836 is $x_c$. In other words, $x_{min} = x_a$ and $x_{max} = x_c$. In this case $x_e < x_a$, and the received value of the load variable $x_e$ is not within the range of load variable values already stored in the array 836. Accordingly, the learning function 828 is implemented with regard to the data set ($x_e$, $y_e$), and the new data set is added to the array 836. However, this time, since $x_e < x_{min}$ ($x_a$) the new data set is added to the front of the array 836. The new data set ($x_e$, $y_e$) is accorded the index value "1" and the index values accorded to each of the data sets already stored in the array 836 are incremented by 1. Thus, when the array is plotted on the coordinate system 850 the point ($x_1$, $y_1$) 866 corresponds to the data set ($x_e$, $y_e$) the point ($x_2$, $y_2$) 856 corresponds to the data set ($x_a$, $y_a$), the point ($x_3$, $y_3$) 858 corresponds to the data set ($x_b$, $y_b$), and the point ($x_4$, $y_4$) 862 corresponds to the data set ($x_c$, $y_c$). The model of the monitored variable now comprises the linear segment 868 extending between and including the data points ($x_1$, $y_1$) 866 and ($x_2$, $y_2$) 856, the linear segment 860 extending between and including the data points ($x_2$, $y_2$) 856 and ($x_3$, $y_3$) 858, and the linear segment 864 extending between and including the points ($x_3$, $y_3$) 858 and ($x_4$, $y_4$) 862.

Figure 21:
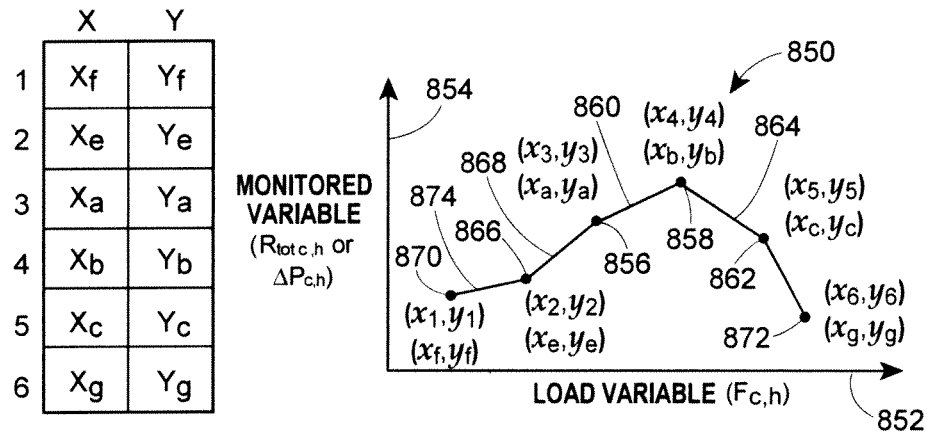
FIG. 21 is a table showing an array of data points and a corresponding plot of a function defined by the data points in the array when the array includes six data points.

FIG. 21 shows the addition of two more data points to the model. A data set ($x_f, y_f$) is received from the SPM blocks 172, 173. In this case, $x_f$ is less than the smallest value of the load variable stored in the array 836 ($x_f < x_e$). Accordingly, the new data set ($x_f, y_f$) is added to the front of the array 836, and is accorded the index value "1". The index values of all the other data sets stored in the array are incremented by 1. Next the data set ($x_g$, $y_g$) is received from the SPM blocks 172, 173. In this case, $x_g$ is greater than the largest value of the load variable stored in the array 836 ($x_g > x_c$). Accordingly, the new data set ($x_g$, $y_g$) is added to the end of the array 836 and is accorded the next available index number, which in this case is the index value "6". The full array 836 is plotted on the coordinate system 850 in FIG. 21. The first point ($x_1$, $y_1$) 870 corresponds to the data set ($x_f, y_f$), the second point ($x_2$, $y_2$) 866 corresponds to the data set ($x_e$, $y_e$), the third point ($x_3$, $y_3$) 856 corresponds to the data set ($x_a$, $y_a$), the fourth point ($x_4$, $y_4$) 858 corresponds to the data set ($x_b$, $y_b$), the fifth point ($x_5$, $y_5$) 862 corresponds to the data set ($x_c$, $y_c$) and the sixth point ($x_6$, $y_6$) 872 corresponds to the data set ($x_g$, $y_g$). The model of the monitored variable comprises the linear segment 874 extending between and including data points ($x_1$, $y_1$) 870 and ($x_2$, $y_2$) 866, the linear segment 868 extending between and including points ($x_2$, $y_2$) 866 and ($x_3$, $y_3$) 856, the linear segment 860 extending between and including points ($x_3$, $y_3$) 856 and ($x_4$, $y_4$) 858, the linear segment 864 extending between and including points ($x_4$, $y_4$) 858 and ($x_5$, $y_5$) 862, and the linear segment 876 extending between and including data points $(x_5, y_5)$ 862 and $(x_6, y_6)$ 872.

In theory there is no limit to the number of points that may be added to the array 836 for creating an extensible model such as the extensible model developed in FIGS. 18-21. In practice, however, processing constraints may force an upper limit on the number of points that may be included in a particular model. In this case the question arises, which point in an established extensible model may be removed when a new point to be added to the model will exceed the upper processing limit on the number of points in the array without unduly changing the accuracy of the model. For example, if abnormal situation prevention algorithm that generated the extensible model of FIG. 21 has a processing limit of five points, it may be determined which of the data points 870, 866, 856, 858, 862, 872, may be removed from the array 836 while having the least impact on the accuracy of the model.

Figure 22:
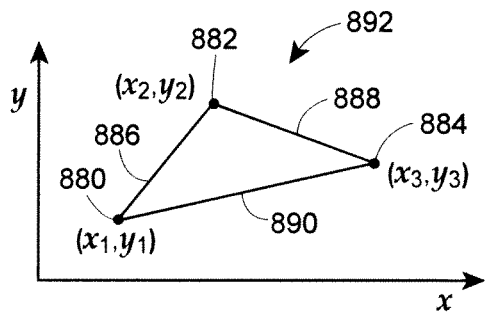
FIG. 22 is a plot illustrating a triangle formed by three adjacent data points and the amount of error created by removing a data point from an array modeling a monitored variable as a function of a load variable.

Referring to FIG. 22, a sequence of three points $(x_1, y_1)$ 880, $(x_2, y_2)$ 882 and $(x_3, y_3)$ 884 is shown. The three points 880, 882, 884 define a triangle having sides defined by the line segments $(x_1, y_1)$–$(x_2, y_2)$ 886, $(x_2, y_2)$–$(x_3, y_3)$ 888, and $(x_1, y_1)$–$(x_3, y_3)$ 890. The line segments $(x_1, y_1)$–$(x_2, y_2)$ 886 and $(x_2, y_2)$–$(x_3, y_3)$ 888 form original portions of an extensible model in the range $[x_1, x_3]$. However, if the point $(x_2, y_2)$ 882 is removed from the model, the line segment $(x_1, y_1)$–$(x_3, y_3)$ 890 replaces the line segments $(x_1, y_1)$–$(x_2, y_2)$ 886 and $(x_2, y_2)$–$(x_3, y_3)$ 888. The amount of error between the original function containing all three points $(x_1, y_1)$ 880, $(x_2, y_2)$ 882, and $(x_3, y_3)$ 884 and the simplified function containing just the two points $(x_1, y_1)$ 880 and $(x_3, y_3)$ 884 is simply the area of the triangle 892 formed by all three points 880, 882, 884. The area of the triangle 892 may be calculated by the formula:

$$A = \frac{1}{2}|x_1 y_2 - x_1 y_3 - x_2 y_1 + x_2 y_3 + x_3 y_1 - x_3 y_2| \quad \text{(Equ. 18)}$$

If a point is removed from an extensible model, such as that shown in FIG. 21, the point to remove may be the one that will leave the modified extensible model as close to the original extensible model as possible. One way to determine this is to determine which point, when removed from the original extensible model, will result in the least amount of error between the original extensible model and the modified extensible regression model. The error introduced by removing any particular point may be determined by calculating the area of the triangle formed by the point itself and each adjacent point on either side of the point using the formula set forth in equation (18). This process may be carried out for every point in the original extensible model except for the two points at either end. The triangle having the smallest area will define the least amount of change between the original extensible model and the modified extensible model. Thus, the point that forms the smallest triangle along with its two adjacent neighbors is the best candidate to be removed from the extensible model when processing constraints require that a point must be removed from the model in order to improve processing efficiency, or otherwise meet the processing limitations of the hardware device or systems implementing the abnormal situation prevention algorithm.

Figure 23:
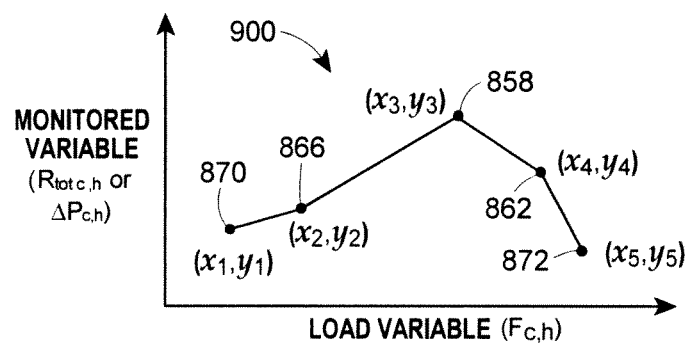
FIG. 23 is a plot of the function modeling a monitored variable as a function of a load variable shown in FIG. 21 with one of the data points removed.

Returning to the extensible model shown in FIG. 21, it can be seen that the point $(x_3, y_3)$ 856 is nearly co-linear with the two adjacent points $(x_2, y_2)$ 866 and $(x_4, y_4)$ 858. Clearly, the area of the triangle formed by these three points will be quite small. Removing the point $(x_3, y_3)$ 856 will have a very negligible effect on the overall shape of the extensible model 900, as can be verified by comparing the extensible model of FIG. 21 with the modified extensible model 900 shown in FIG. 23. The point $(x_3, y_3)$ 856 in the original extensible model of FIG. 21 has been removed from the modified extensible model 900 of FIG. 23. Even without the point $(x_3, y_3)$ 856, the modified extensible model 900 of FIG. 23 has substantially the same shape as the original extensible model of FIG. 21. (It should be noted that the index values of the points defining the modified extensible model 900 of FIG. 23 have been adjusted to reflect the removal of point $(x_3, y_3)$ 856 from the original extensible model of FIG. 21. The reference numbers identifying the points, however, have been left unchanged. Thus, points $(x_1, y_1)$ 870 and $(x_2, y_2)$ 866 in the modified extensible model 900 correspond to the same points $(x_1, y_1)$ 870 and $(x_2, y_2)$ 866 in the original extensible model of FIG. 21. Point $(x_3, y_3)$ 858 in the modified extensible model 900 of FIG. 23, however, corresponds to point $(x_4, y_4)$ 858 in the original extensible model of FIG. 21. Point $(x_4 y_4)$ 862 of the modified extensible model 900 of FIG. 23 corresponds to the point $(x_5, y_5)$ 862 in the original extensible model of FIG. 21, and the point $(x_5, y_5)$ 872 in the modified model 900 of FIG. 23 corresponds to the point $(x_6, y_6)$ 862 in the original extensible model of FIG. 21).

Figure 24:
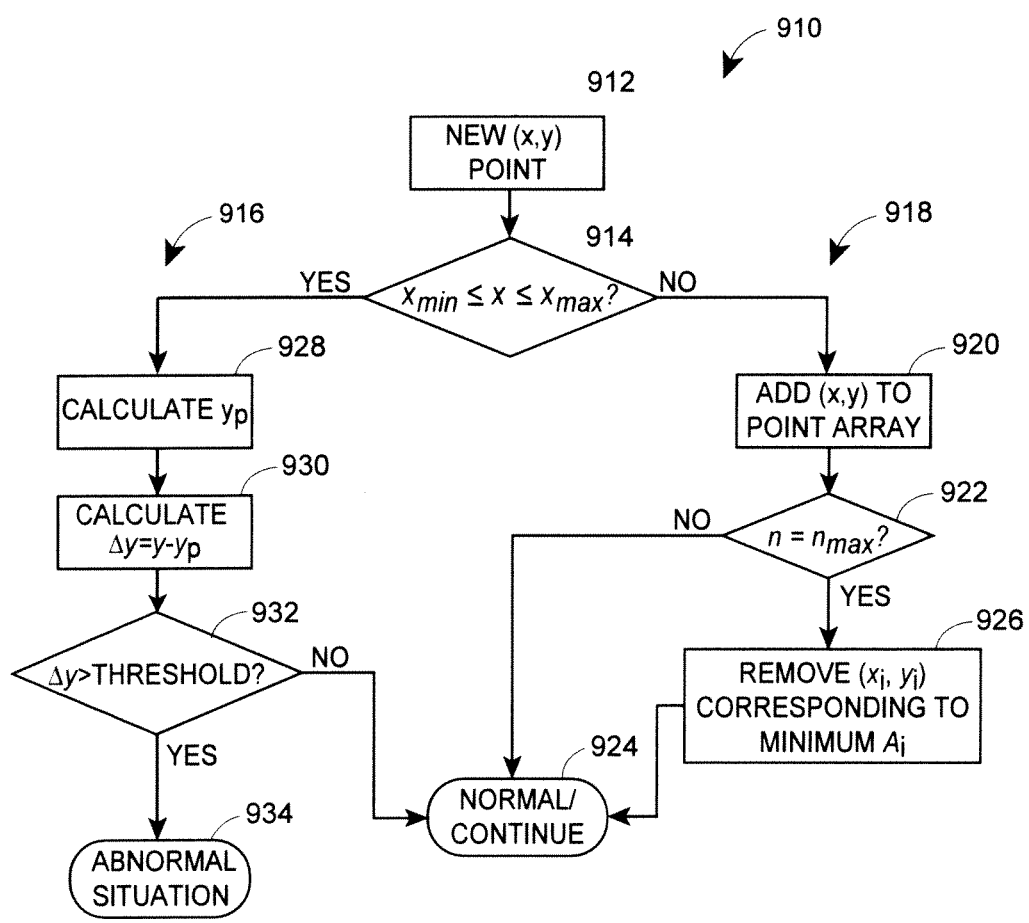
FIG. 24 is a flow chart of a method of modeling a monitored variable as a function of a load variable and detecting an abnormal condition.

Turning now to FIG. 24, a method 910 is shown for implementing an abnormal situation prevention system. According to the method, a new point (x, y) is received at 912. The independent variable x of the new point (x, y) may comprise a statistical signature (e.g., the mean, the standard deviation, or other statistical measure) of a first process variable over a predefined sample window. The dependent variable y of the new point (x, y) may comprise a statistical signature of a second process variable. In a heat exchanger, the alternative Heat Exchanger Abnormal Situation Prevention Module 800 may monitor the second variable (the monitored $R_{tot}$ and/or $\Delta P$ variable) as a function of the first variable (the load $F_{c, h}$ variable). The abnormal situation prevention system may detect an abnormal situation when the monitored variable does not behave in a predicted manner based on the behavior of the load variable. The value of the independent variable x is examined in decision block 914. The value of the independent variable x for the new point (x, y) is compared to the independent variable values of previously received points. If the value of the independent variable x for the received point is within the range of values for the independent variable x from previously received points, i.e., if $x_{min} \leq x \leq x_{max}$ where $x_{min}$ is the lowest value of x that has been received and $x_{max}$ is the highest value of x that has been received, then the monitoring function 916 is executed. If the received value of x is not within the range between $x_{min}$ and $x_{max}$, then the learning function 918 is performed.

If the value of x for the new point is not within the range of values that have already been received, the new point is added to the array of points defining an extensible model at 920. If the value of x is less than $x_{min}$, the new point is added to the front of the array and the index values of the other points already stored in the array are incremented by 1. If the value of x is greater than $x_{max}$, then the new point is added at the end of the array. At decision block 922, the number of points stored in the array is evaluated to determine whether the number of points already stored in the array is equal to the maximum number of points that may be stored in the array. If $n \neq n_{max}$, the abnormal situation prevention system continues at 924. However, if $n = n_{max}$, a point is removed from the array at 926. The point removed may be a point $(x_i, y_i)$ forming a triangle with its neighboring points having the smallest area $A_i$, as described above. Alternatively, an integral square error algorithm may be employed for identifying a point that, when removed from the array, will result in the least amount of error introduced into the corresponding extensible model.

Returning to decision block 914, if the value of the independent variable x is within the range of variable values already received, the monitoring function 916 proceeds by calculating a predicted value of the dependent variable $y_p$ at 928. The predicted value of the dependent variable is calculated based on the received value of the independent variable x and the extensible model embodied in the points stored in the array. Once the predicted value of the dependent variable $y_p$ has been calculated, the difference value $\Delta y$ is calculated by subtracting the predicted value of the dependent variable $y_p$ from the actual value of y in the new data point received at 930. The value $\Delta y$ is then compared to a user defined threshold at 932. If $\Delta y$ is greater than the threshold, an abnormal situation is detected at 934. If the value of $\Delta y$ is not greater than the threshold at 932, the status of the monitored process is considered normal and the abnormal situation prevention algorithm continues at 924.

One aspect of the Heat Exchanger Abnormal Situation Prevention Modules 150, 800 is the user interface routines which provide a graphical user interface (GUI) that is integrated with the Heat Exchanger Abnormal Situation Prevention Module described herein to facilitate a user's interaction with the various abnormal situation prevention capabilities provided by the Heat Exchanger Abnormal Situation Prevention Module. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the Heat Exchanger Abnormal Situation Prevention Module.

Preferably, but not necessarily, the GUI may be implemented using a familiar graphical, windows-based structure and appearance, in which a plurality of interlinked graphical views or pages include one or more pull-down menus that enable a user to navigate through the pages in a desired manner to view and/or retrieve a particular type of information. The features and/or capabilities of the Heat Exchanger Abnormal Situation Prevention Module described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the Heat Exchanger Abnormal Situation Prevention Module.

Generally speaking, the GUI described herein provides intuitive graphical depictions or displays of process control areas, units, loops, devices, etc. Each of these graphical displays may include status information and indications (some or all of which may be generated by the Heat Exchanger Abnormal Situation Prevention Module described above) that are associated with a particular view being displayed by the GUI. A user may use the indications shown within any view, page or display to quickly assess whether a problem exists within the heat exchanger 64 depicted within that display.

Additionally, the GUI may provide messages to the user in connection with a problem, such as an abnormal situation, that has occurred or which may be about to occur within the heat exchanger 64. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

Figure 25:
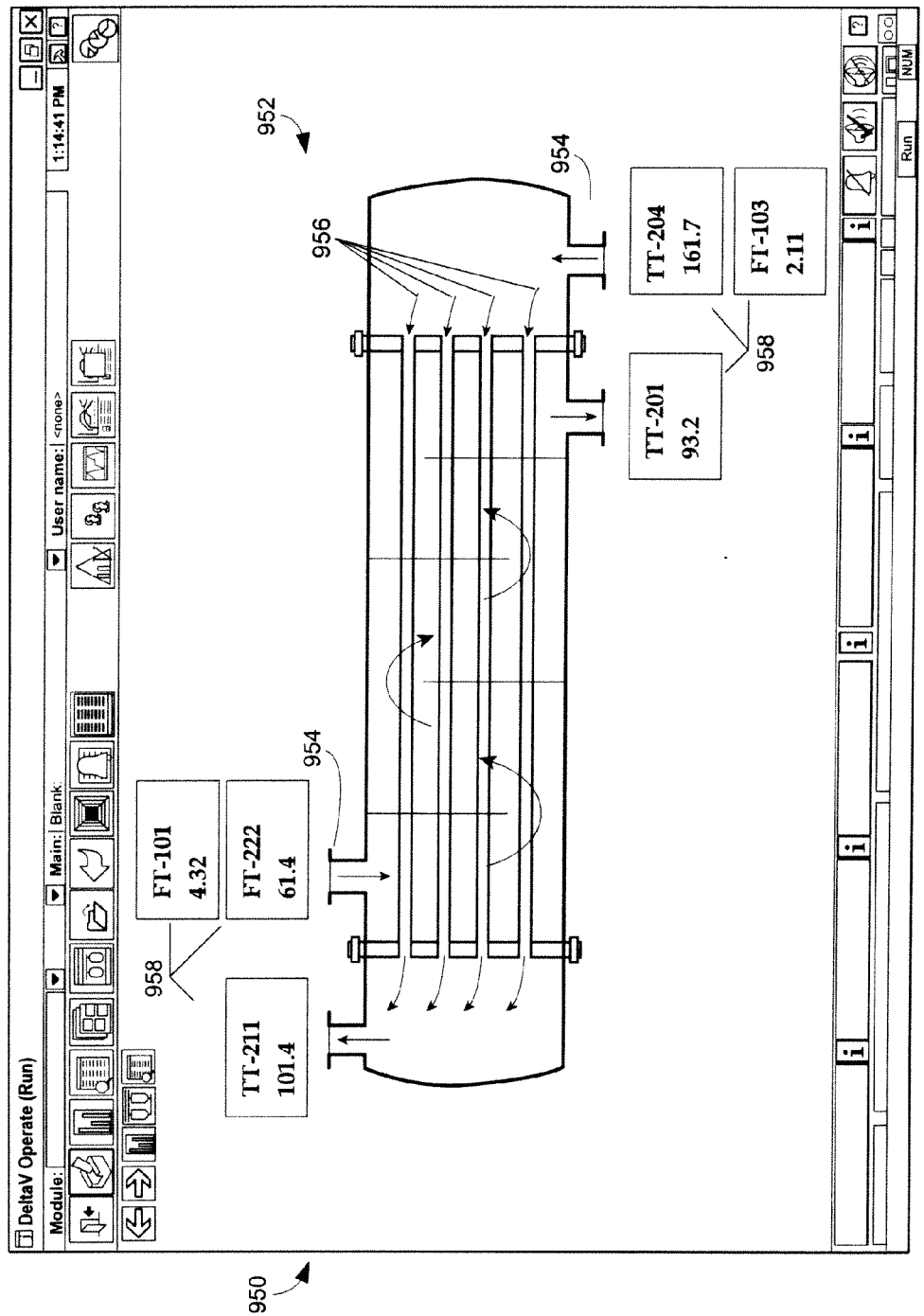
FIG. 25 is one example of an operator display for use with abnormal situation prevention in a heat exchanger.
Figure 26:
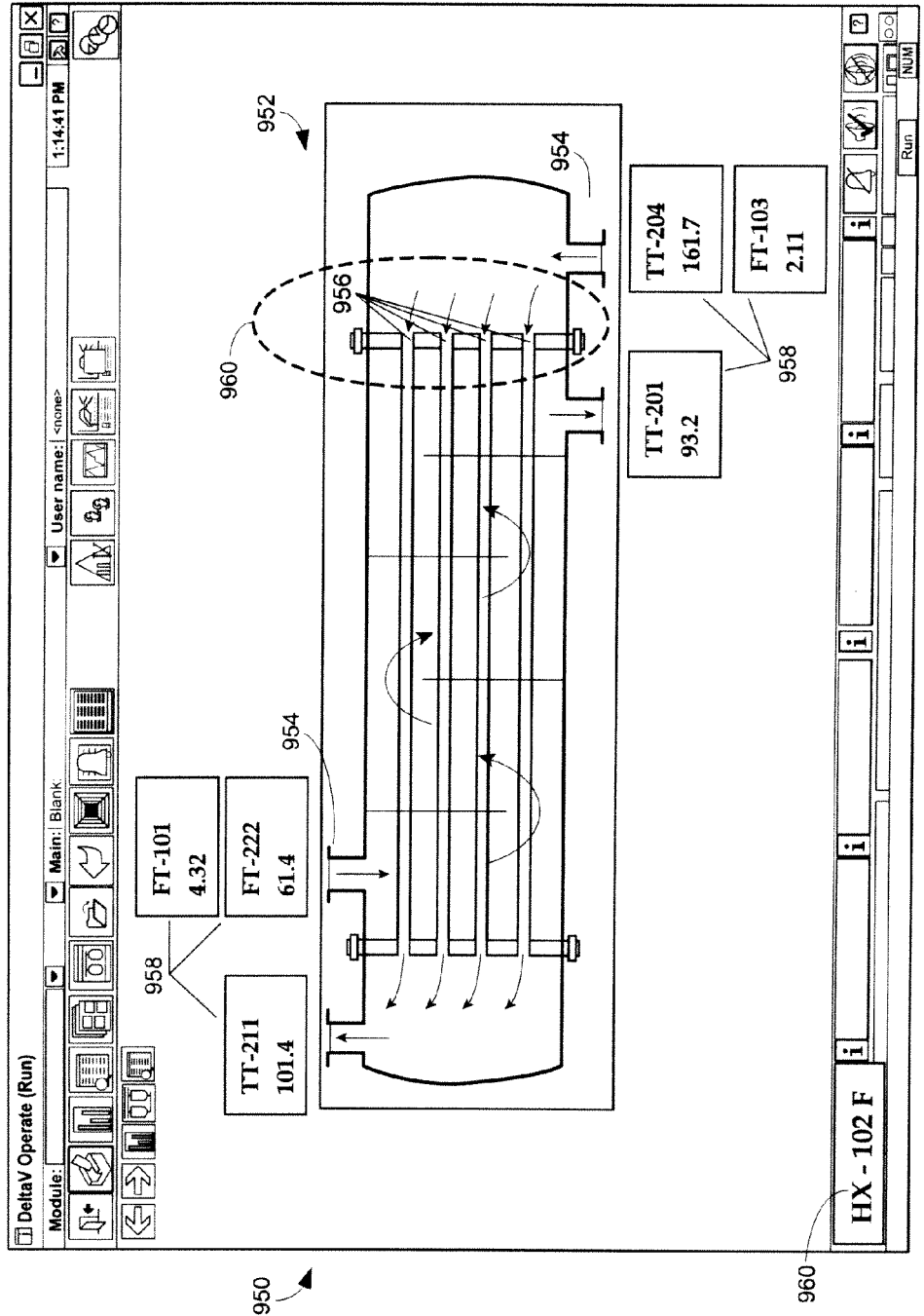
FIG. 26 is another example of an operator display for use with abnormal situation prevention in a heat exchanger.
Figure 27:
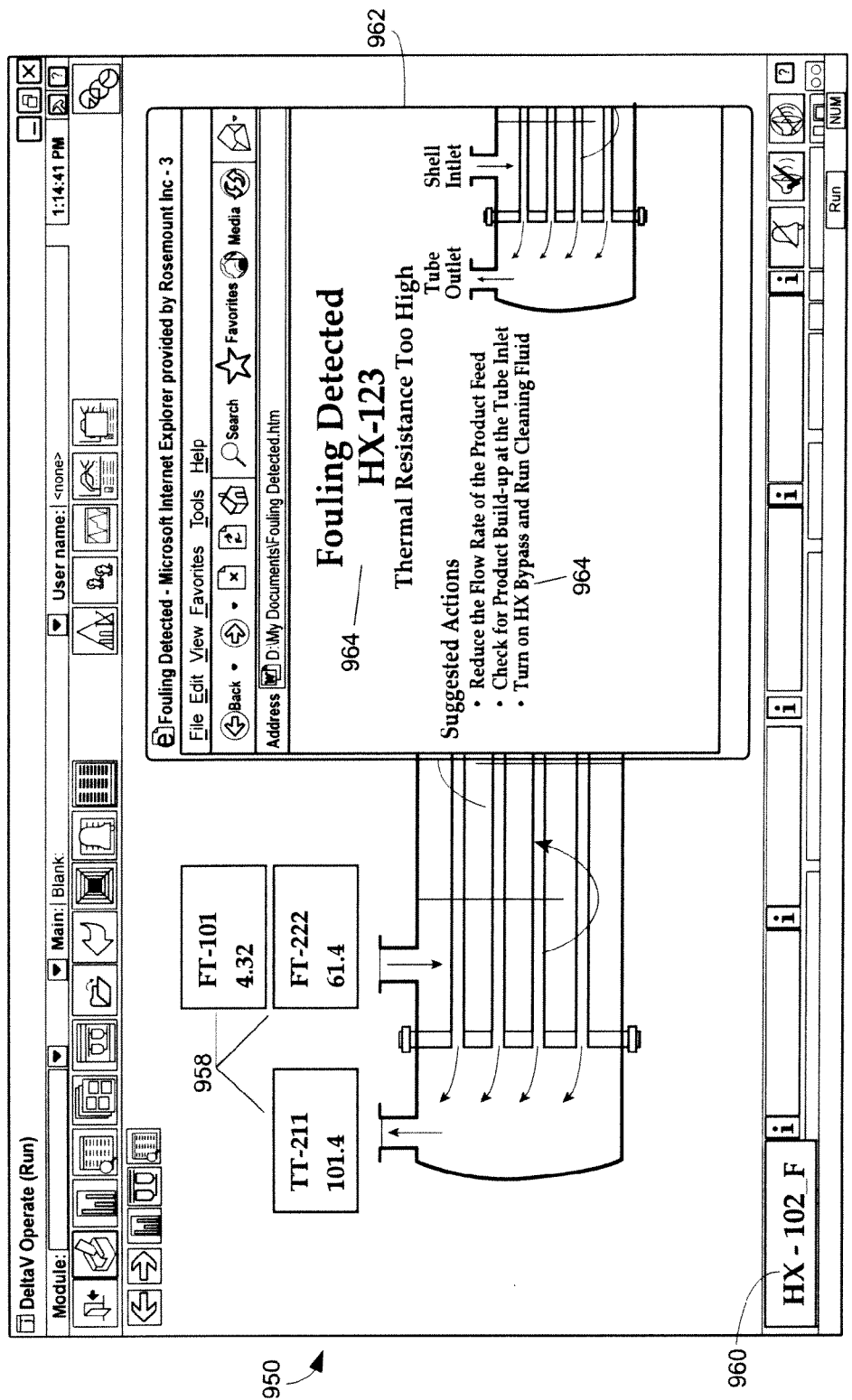
FIG. 27 is another example of an operator display for use with abnormal situation prevention in a heat exchanger.

The Heat Exchanger Abnormal Situation Prevention Modules 150, 800 may include one or more operator displays. FIGS. 25-27 illustrate an example of an operator display 950 for use with a Heat Exchanger Abnormal Situation Prevention Module 150, 800 for abnormal situation prevention in a heat exchanger 64 of a process plant 10. With reference to FIG. 25, an operator display 950 may show a heat exchanger 952 number of inlets 954, tubes 956, and other structures illustrative of the actual heat exchanger 952 that is being monitored. The display 950 may automatically adjust to illustrate an accurate number of tubes 956 for the physical system that the operator display 950 represents. A portion of the heat exchanger 952 may include a button or other selectable user interface structure that, when selected by a user, may display information 958 about the portion of the heat exchanger 952 associated with the button on the display 950.

With reference to FIG. 26, upon detection of an abnormal condition, the operator display 950 may produce a visual indication 960 of the condition or a location of the condition. In one embodiment, the indication may include a graphical display on the area of the affected unit or other monitored equipment of the process as represented in the operator display 800. For example, if the Heat Exchanger Abnormal Situation Prevention Module 150, 800 detects an abnormal situation occurring within one of the tubes 956, the affected tube may visually change to communicate the fault indication to an operator by changing color or any other visual characteristic within the display 950. Also, the detection of an abnormal situation may trigger any other visible or audible alarm and communicate the alarm to the operator.

With reference to FIG. 27, selection of the visual indication 960 may launch a faceplate 962 that may display information 964 about the heat exchanger 952 associated with the condition, or other information related to the operation of the heat exchanger 952. The faceplate 962 may include a mode, status, current or predicted differential pressure ($\Delta P$), a current or predicted thermal resistance ($R_{tot}$), any value associated with a process variable, current regression model(s), quality of regression fit, or any other information related to the process plant 10 and the heat exchanger. The faceplate 962 may also include user-adjustable controls to modify any configurable parameters of the heat exchanger 952. For example, through controls within the faceplate, an operator may configure any of a learning mode time period, a statistical calculation period, a regression order, or threshold limits. Further, the operator may take steps to alleviate a detected abnormal situation. For example, the operator may reduce the flow rate of the product feed, check for product fouling at the tube inlet or any other portion of the heat exchanger, or turn on a heat exchanger bypass to clean the heat exchanger. Of course, the operator may make many other adjustments to the heat exchanger 952 to prevent or alleviate an abnormal situation. Other information may also be displayed and other variables configured through the faceplate 962.

Based on the foregoing, a system and method to facilitate the monitoring and diagnosis of a process control system may be disclosed with a specific premise of abnormal situation prevention in a heat exchanger 64. Monitoring and diagnosis of faults in a heat exchanger may include statistical analysis techniques, such as regression. In particular, on-line process data is collected from an operating heat exchanger. The process data is representative of a normal operation of the process when it is on-line and operating normally. A statistical analysis is used to develop a model of the process based on the collected data. Alternatively, or in conjunction, monitoring of the process may be performed which uses a model of the process developed using statistical analysis to generate an output based on a parameter of the model. The output may include a statistical output based on the results of the model, and normalized process variables based on the training data. Each of the outputs may be used to generate visualizations for process monitoring and diagnostics and perform alarm diagnostics to detect abnormal situations in the process.

With this aspect of the disclosure, a heat exchanger Heat Exchanger Abnormal Situation Prevention Module 150, 800 may be defined and applied for on-line diagnostics, which may be useful in connection with heat exchangers and a variety of process equipment faults or abnormal situations within a process plant 10. The model may be derived using regression modeling. In some cases, the disclosed Heat Exchanger Abnormal Situation Prevention Module 150 may be used for observing long-term fouling within the heat exchanger. In other cases, the Heat Exchanger Abnormal Situation Prevention Module 800 may be used for observing short-term or instantaneous changes with the heat exchanger. For instance, the disclosed method may be used for on-line, long-term collaborative diagnostics, or relatively short-term diagnostics. Alternatively or additionally, the disclosed method may provide an alternative approach to regression analysis.

Figure 28:
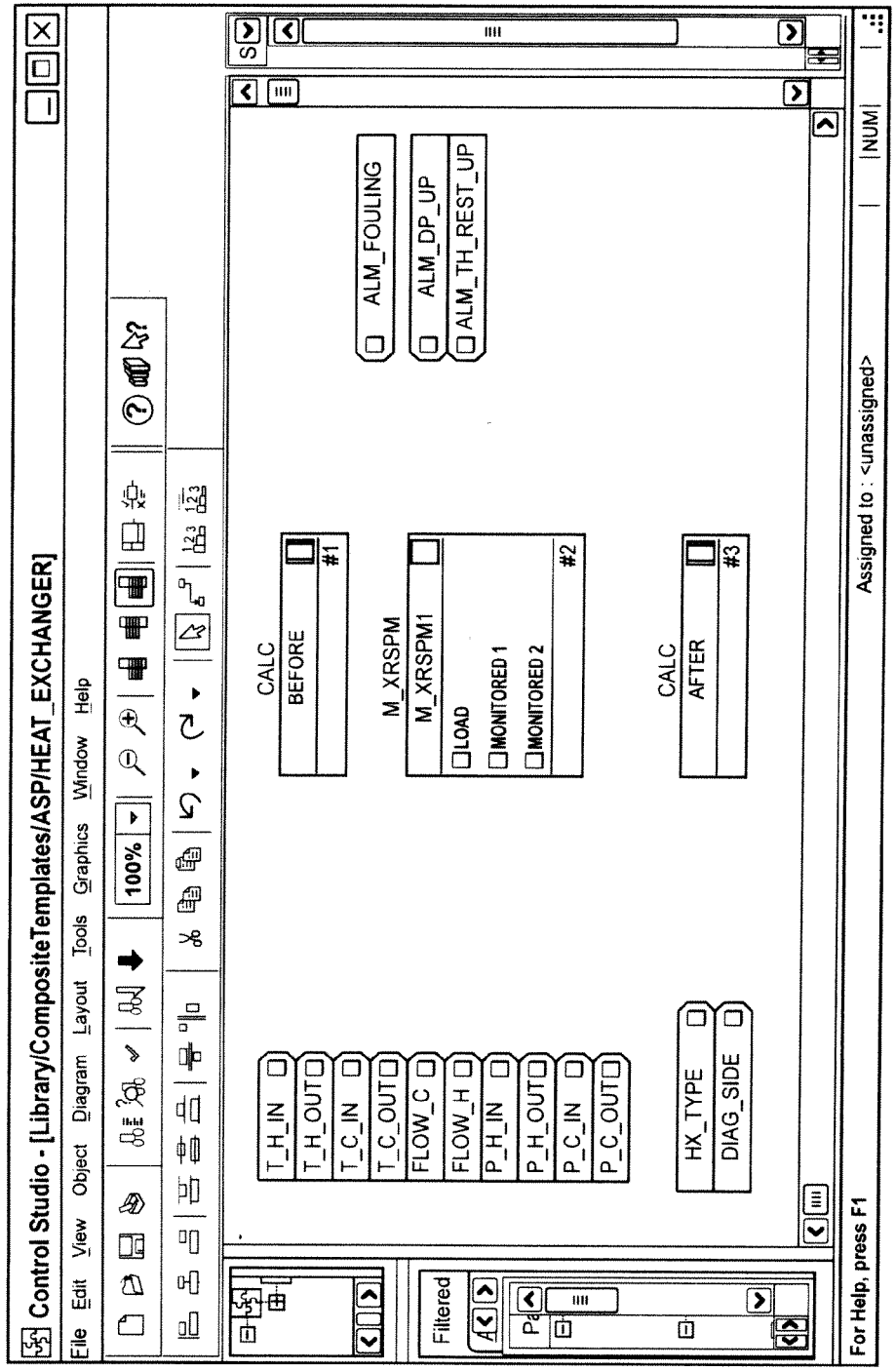
FIG. 28 is an example of a heat exchanger abnormal situation prevention system implemented a process control platform or system of a process plant.

The disclosed method may be implemented in connection with a number of control system platforms, including, for instance, as illustrated in FIG. 28, DeltaV™ 970 and Ovation®, and with a variety of process equipment and devices, such as the Rosemount 3420 FF Interface Module, Foundation Fieldbus Function or Transducer Block, Field Device Interface Module, or Handheld Communicator. Alternatively, the disclosed method and system may be implemented as a stand alone abnormal situation prevention application. In either case, the disclosed method and system may be configured to generate alerts and otherwise support the regulation of fouling levels in heat exchangers.

The above-described examples involving abnormal situation prevention in a heat exchanger are disclosed with the understanding that practice of the disclosed systems, methods, and techniques is not limited to such contexts. Rather, the disclosed systems, methods, and techniques are well-suited for use with any diagnostics system, application, routine, technique or procedure, including those having a different organizational structure, component arrangement, or other collection of discrete parts, units, components or items, capable of selection for monitoring data collection, etc. Other diagnostics systems, applications, etc., that specify the process parameters being utilized in the diagnostics may also be developed or otherwise benefit from the systems, methods, and techniques described herein. Such individual specification of the parameters may then be utilized to locate, monitor, and store the process data associated therewith. Furthermore, the disclosed systems, methods, and techniques need not be utilized solely in connection with diagnostic aspects of a process control system, particularly when such aspects have yet to be developed or are in the early stages of development. Rather, the disclosed systems, methods, and techniques are well suited for use with any elements or aspects of a process control system, process plant, or process control network, etc.

The methods, processes, procedures and techniques described herein may be implemented using any combination of hardware, firmware, and software. Thus, systems and techniques described herein may be implemented in a standard multi-purpose processor or using specifically designed hardware or firmware as desired. When implemented in software, the software may be stored in any computer readable memory such as on a magnetic disk, a laser disk, or other storage medium, in a RAM or ROM or flash memory of a computer, processor, I/O device, field device, interface device, etc. Likewise, the software may be delivered to a user or a process control system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a process control system via a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A non-transitory computer-readable storage medium comprising computer-executable instructions for detecting an abnormal situation during operation of a heat exchanger within a process in a process plant, the instructions comprising:

collecting a plurality of first data sets for the heat exchanger while the process is producing a product by processing physical materials using one or more field devices communicatively coupled to one or more process controllers and while the heat exchanger within the process is in a first normal operating region during a first period of heat exchanger operation, the plurality of first data sets generated from a fluid flow rate variable indicating a flow rate of the fluid and a single process value, the single process value including either: a) a thermal resistance variable or b) a differential pressure variable;

generating a first regression model of the heat exchanger in the first normal operating region from the plurality of first data sets, wherein the first regression model is a function of the flow rate;

determining a first range for the flow rate in which the first regression model is valid;

generating a model of heat exchanger operation, the model of heat exchanger operation including the first regression model, wherein the model of heat exchanger operation is a function of the flow rate;

collecting a plurality of second data sets for the heat exchanger while the heat exchanger is in a second normal operating region, the plurality of second data sets generated from the fluid flow rate variable and the single process value while the heat exchanger operates in the second normal operating region;

generating a second regression model of the heat exchanger in the second normal operating region using the plurality of second data sets, wherein the second regression model is a function of the flow rate;

determining a second range for the flow rate in which the second regression model is valid;

updating the model of heat exchanger operation to include simultaneously the first regression model for the first range of the flow rate and the second regression model for the second range of the flow rate; and detecting an abnormal situation using the updated model of heat exchanger operation;

wherein the abnormal situation is indicated based on one or more difference values and each difference value is the difference between a monitored value of the single process value at a corresponding value of the flow rate and a modeled value of the single process value at the corresponding value of the flow rate.

2. The non-transitory computer-readable storage medium of claim 1, wherein the plurality of first data sets and the plurality of second data sets are generated from one or more of a cold fluid flow rate, a cold fluid inlet temperature, a cold fluid outlet temperature, a cold fluid inlet pressure, a cold fluid outlet pressure, the hot fluid flow rate, a hot fluid inlet temperature, a hot fluid outlet temperature, a hot fluid inlet pressure, and a hot fluid outlet pressure.

3. The non-transitory computer-readable storage medium of claim 2, wherein, if the single process value includes the differential pressure variable, the differential pressure variable comprises either a difference between the cold fluid inlet pressure and the cold fluid outlet pressure or a difference between the hot fluid inlet pressure and the hot fluid outlet pressure.

4. The non-transitory computer-readable storage medium of claim 1, wherein the plurality of first data sets comprises one or more of raw process variable data and a statistical variation of the raw process variable data.

5. The non-transitory computer-readable storage medium of claim 4, wherein, if the plurality of first and second data sets comprises, at least in part, collecting the statistical variation of the raw process variable data, the statistical variation of the raw process variable data comprises one or more of a mean, a median, or a standard deviation.

6. The non-transitory computer-readable storage medium of claim 5, further comprising computer executable instructions for modeling the standard deviation of the statistical variation of the raw process variable data as a function of a load variable, if the statistical variation of the raw process variable data comprises, at least in part, the standard deviation.

7. The non-transitory computer-readable storage medium of claim 1, further comprising computer executable instructions for modifying one or more of a cold fluid flow rate, a cold fluid inlet temperature, a cold fluid outlet temperature, a cold fluid inlet pressure, a cold fluid outlet pressure, a hot fluid flow rate, a hot fluid inlet temperature, a hot fluid outlet temperature, a hot fluid inlet pressure, and a hot fluid outlet pressure upon detecting an abnormal situation in the heat exchanger.

8. The non-transitory computer-readable storage medium of claim 1, wherein if the single process value includes the thermal resistance variable, the thermal resistance variable is a function of one or more of the group consisting of a cold fluid flow rate and a hot fluid flow rate, a cold fluid inlet temperature, a cold fluid outlet temperature, a hot fluid inlet temperature, and a hot fluid outlet temperature.

9. A system for detecting an abnormal situation during operation of a heat exchanger within a process in a process plant, comprising:

a configurable process model of the process in the process plant, the configurable process model a function of an independent process variable of the heat exchanger during operation within the process and including a first regression model in a first range of the independent variable corresponding to a first normal operating region of the process, the first regression model a function of the independent process variable, the configurable process model capable of being subsequently configured to include simultaneously with the first regression model a second regression model in a second range of the independent variable corresponding to a second normal operating region different than the first normal operating region, the second regression model a function of the independent process variable;

wherein, after the configurable process model is configured to include the second regression model simultaneously with the first regression model, the configurable process model is capable of modeling the process in the first normal operating region using the first regression model, and modeling the process in the second normal operating region using the second regression model; and the system further comprising a deviation detector coupled to the configurable process model, the deviation detector configured to determine if the process significantly deviates from an output of the process model by comparing one or more measured values of a dependent process variable of the heat exchanger during operation within the process at a corresponding value of the independent process variable to one or more modeled values of the dependent process variable at the corresponding value of the independent process variable;

wherein the independent process variable includes either a thermal resistance variable or a differential pressure variable of the heat exchanger and the dependent process variable includes a flow rate of the heat exchanger.

10. A system according to claim 9, wherein the configurable process model is capable of being configured, after being configured to include the second regression model simultaneously with the first regression model, to include simultaneously with the first and second regression models at least a third regression model in at least a third range of the independent process variable corresponding to at least a third normal operating region different than the first normal operating region and the second normal operating region;

wherein, after the configurable process model is configured to include the third regression model simultaneously with the first and second regression models, the configurable process model is capable of modeling operation of the heat exchanger within the process in the first normal operating region using the first regression model, modeling operation of the heat exchanger within the process in the second normal operating region using the second regression model, and modeling operation of the heat exchanger within the process in the third normal operating region using the third regression model.

11. A system according to claim 9, wherein the configurable process model is capable of generating an interpolated model for a third range of the independent process variable between the first range of the independent process variable and the second range of the independent process variable.

12. A system according to claim 11, wherein the configurable process model is capable of generating a prediction of a Y value as a function of an X value, wherein the Y value is generated from a dependent process variable and the X value is generated from an independent process variable;

wherein, after the configurable process model is configured to include the second regression model simultaneously with the first regression model and after generating the interpolated model, the configurable process model is capable of:

generating the prediction of the Y value using the first regression model if the X value is in the first range of the independent process variable, generating the prediction of the Y value using the second regression model if the X value is in the second range of the independent process variable, generating the prediction of the Y value using the interpolated model if the X value is in the third range of the independent process variable between the first range of the independent process variable and the second range of the independent process variable.

13. A system according to claim 12, wherein the deviation detector is configured to determine if the Y value significantly differs from the predicted Y value.

14. A system according to claim 13, wherein the deviation detector is configured to determine if the Y value significantly differs from the predicted Y value by comparing a difference between the Y value and the predicted Y value to a threshold.

15. A system according to claim 14, wherein the threshold varies as a function of the X value.

16. A system according to claim 13, further comprising:

a first statistical generator coupled to the configurable process model, the first statistical generator to generate the X values as a mean of the independent process variable; and a second statistical generator coupled to the configurable process model, the second statistical generator to generate the Y values as a mean of the dependent process variable.

17. A system according to claim 16, wherein the second statistical generator additionally generates a standard deviation values of the dependent process variable;

the system further comprising an additional model coupled to the first statistical generator, the second statistical generator, and the deviation detector, the additional model to generate a prediction of the standard deviation of the dependent process variable as a function of the mean of the independent process variable;

wherein the deviation detector is configured to determine if the Y value significantly differs from the predicted Y value by comparing a difference between the Y value and the predicted Y value to a threshold, wherein the threshold is a function of the prediction of the standard deviation.

* * * * *